United States Patent
Hyma et al.

(10) Patent No.: US 10,150,225 B2
(45) Date of Patent: Dec. 11, 2018

(54) TUBING CUTTER

(71) Applicant: Milwaukee Electric Tool Corporation, Brookfield, WI (US)

(72) Inventors: Steven W. Hyma, Milwaukee, WI (US); Matthew W. Naiva, Wauwatosa, WI (US); Chen Jian Fan, Tai Shan (CN)

(73) Assignee: Milwaukee Electric Tool Corporation, Brookfiled, WI (US)

( * ) Notice: Subject to any disclaimer, the term of this patent is extended or adjusted under 35 U.S.C. 154(b) by 95 days.

(21) Appl. No.: 15/183,567

(22) Filed: Jun. 15, 2016

(65) Prior Publication Data

US 2016/0361829 A1    Dec. 15, 2016

Related U.S. Application Data

(60) Provisional application No. 62/175,846, filed on Jun. 15, 2015.

(30) Foreign Application Priority Data

Jun. 15, 2015 (CN) .................... 2015 2 0411748 U

(51) Int. Cl.
*B23D 21/08* (2006.01)
*B26D 3/16* (2006.01)
*B26B 25/00* (2006.01)

(52) U.S. Cl.
CPC ............. *B26D 3/169* (2013.01); *B23D 21/08* (2013.01); *B26B 25/005* (2013.01)

(58) Field of Classification Search
CPC ........ B26B 25/005; B26D 3/169; B23D 21/08
(Continued)

(56) References Cited

U.S. PATENT DOCUMENTS

| 801,866 A | 10/1905 | Headson |
| 1,374,663 A | 4/1921 | Joyce et al. |
| 1,393,156 A | 10/1921 | Nonneman |
| 1,681,807 A | 8/1928 | Kenerson |

(Continued)

FOREIGN PATENT DOCUMENTS

| CA | 2751682 | 10/2010 |
| CN | 102369076 | 3/2012 |

(Continued)

OTHER PUBLICATIONS

Maxclaw, "Telescopic Tube Cutter," <http://en.maxclaw.com.tw/product_detail.php?xid=1&id=235> webpage accessed Jun. 2, 2015.

*Primary Examiner* — Kenneth E. Peterson
*Assistant Examiner* — Nhat Chieu Do
(74) *Attorney, Agent, or Firm* — Reinhart Boerner Van Deuren s.c.

(57) ABSTRACT

A cutter, such as a tubing cutter or a swing cutter. The cutter may include a cutting wheel; a roller; a housing assembly including a first housing portion supporting the cutting wheel and a second housing portion supporting the roller; a shaft connecting the housing portions, rotation of the shaft causing relative movement of the housing portions along a shaft axis; and a knob connected to the shaft and engageable by a user to rotate the shaft, the knob having, in a plane perpendicular to the shaft axis, a non-symmetrical shape defined by opposite circular sector portions and opposite lever portions, each lever portion being engageable by a user to apply a force to the knob in a direction of rotation. The cutter may include a shaft with a radial shoulder preventing movement of the shaft from the cavity through an opening in the housing portion.

4 Claims, 46 Drawing Sheets

(58) Field of Classification Search
USPC .................................. 30/98, 101–102; D8/60
See application file for complete search history.

(56) References Cited

U.S. PATENT DOCUMENTS

| | | | |
|---|---|---|---|
| 1,833,980 A | 12/1931 | Thewes | |
| 1,866,095 A | 7/1932 | Foley | |
| 1,968,857 A | 8/1934 | Shafer | |
| 2,071,756 A | 2/1937 | Manville | |
| 2,165,209 A | 7/1939 | Baldanza | |
| 2,325,353 A | 7/1943 | Wright | |
| 2,379,177 A | 6/1945 | Pavey | |
| 2,454,528 A | 11/1948 | Temple | |
| 2,539,124 A | 1/1951 | Findlay | |
| 2,697,875 A | 12/1952 | McIver | |
| 2,629,926 A | 3/1953 | Franck | |
| 2,630,028 A | 3/1953 | McIntosh | |
| 2,630,029 A | 3/1953 | Franck | |
| 2,739,381 A | 3/1956 | Petersen | |
| 2,739,382 A | 3/1956 | Petersen | |
| 2,747,275 A | 5/1956 | Jonasson | |
| 2,759,242 A | 8/1956 | Goldman | |
| 2,796,663 A | 6/1957 | Karnes | |
| 2,921,369 A | 1/1960 | Stanley | |
| 2,956,339 A | 10/1960 | Jonasson | |
| 2,993,274 A | 7/1961 | Dirks | |
| 3,013,335 A | 12/1961 | Kowal | |
| 3,022,575 A | 2/1962 | Wright | |
| 3,031,237 A | 4/1962 | Weibel | |
| 3,043,004 A | 7/1962 | Walter | |
| 3,070,885 A | 1/1963 | Musy et al. | |
| 3,117,375 A | 1/1964 | Meese | |
| 3,135,050 A * | 6/1964 | Franck | B23D 21/08 30/102 |
| 3,171,199 A | 3/1965 | Meese | |
| 3,196,652 A | 7/1965 | Meese | |
| 3,237,301 A | 3/1966 | Wilson | |
| 3,240,088 A | 3/1966 | Samuels et al. | |
| 3,335,492 A | 8/1967 | Spiro | |
| 3,347,118 A | 10/1967 | Gore et al. | |
| D209,144 S | 11/1967 | Hampel | |
| 3,355,972 A | 12/1967 | Janik | |
| 3,376,638 A | 4/1968 | Bjalme et al. | |
| 3,403,442 A | 10/1968 | Reese et al. | |
| 3,520,057 A * | 7/1970 | Gore | B23D 21/08 30/102 |
| 3,522,617 A | 8/1970 | Kowal | |
| 3,526,960 A | 9/1970 | Gore et al. | |
| 3,545,081 A | 12/1970 | Butler | |
| 3,601,892 A | 8/1971 | Heinrich | |
| 3,608,194 A | 9/1971 | Miller | |
| 3,613,236 A | 10/1971 | Lauck | |
| 3,624,682 A | 11/1971 | Kowal | |
| 3,665,604 A | 5/1972 | Kowal | |
| 3,885,261 A | 5/1975 | Skvarenina | |
| 3,932,937 A | 1/1976 | Bastiansen | |
| 3,965,572 A * | 6/1976 | Strybel | B23D 21/08 269/181 |
| D249,015 S | 8/1978 | Matthews et al. | |
| 4,133,105 A | 1/1979 | Mittendorf et al. | |
| 4,285,576 A | 8/1981 | Garland et al. | |
| D263,111 S | 2/1982 | Besenbruch | |
| 4,368,577 A | 1/1983 | Babb | |
| D270,808 S | 10/1983 | Wolcott | |
| 4,493,150 A | 1/1985 | Garcia et al. | |
| 4,560,098 A | 12/1985 | Tupper | |
| H45 H | 4/1986 | Gilmore | |
| 4,611,358 A | 9/1986 | Mills et al. | |
| 4,625,464 A | 12/1986 | Kubo | |
| 4,831,732 A | 5/1989 | Garton | |
| 4,845,849 A | 7/1989 | Aubriot | |
| 4,845,850 A | 7/1989 | Rothenberger | |
| D306,392 S | 3/1990 | Honeycutt | |
| D309,563 S | 7/1990 | Astle | |
| D312,953 S | 12/1990 | Vanderpol et al. | |
| 5,067,240 A | 11/1991 | You | |
| 5,099,577 A | 3/1992 | Hutt | |
| 5,203,083 A | 4/1993 | Domonoske | |
| D338,517 S | 8/1993 | Formgren | |
| 5,243,760 A | 9/1993 | May, Jr. | |
| 5,261,301 A | 11/1993 | Babb et al. | |
| 5,269,340 A | 12/1993 | Drzewiecki | |
| 5,285,576 A | 2/1994 | Taylor | |
| 5,315,759 A | 5/1994 | Mashata | |
| 5,345,682 A | 9/1994 | Dubinsky et al. | |
| 5,349,751 A | 9/1994 | Fahr | |
| 5,381,601 A | 1/1995 | Danter et al. | |
| 5,414,932 A | 5/1995 | Azkona | |
| D367,213 S | 2/1996 | Azkona | |
| 5,515,609 A | 5/1996 | Sperti | |
| D378,340 S | 3/1997 | Harter | |
| 5,611,146 A | 3/1997 | Ducret | |
| 5,806,187 A | 9/1998 | Ducret | |
| D399,399 S | 10/1998 | Huang | |
| 5,903,980 A | 5/1999 | Collier et al. | |
| 5,907,906 A | 6/1999 | Sweeney | |
| 6,055,732 A | 5/2000 | Hu | |
| D431,765 S | 10/2000 | Huang | |
| 6,134,997 A | 10/2000 | Rosanova | |
| 6,141,876 A | 11/2000 | Hamm | |
| 6,154,963 A | 12/2000 | Kooiman | |
| 6,189,216 B1 | 2/2001 | Dureiko | |
| 6,226,823 B1 | 5/2001 | Ma Gee | |
| 6,336,270 B1 | 1/2002 | Dureiko | |
| 6,345,444 B1 | 2/2002 | Gillet et al. | |
| 6,393,700 B1 * | 5/2002 | Babb | B23D 21/08 30/101 |
| 6,401,340 B1 | 6/2002 | King | |
| 6,430,815 B1 | 8/2002 | Wickline | |
| 6,637,115 B2 | 10/2003 | Walsh et al. | |
| 6,666,062 B2 | 12/2003 | Dole et al. | |
| D485,150 S | 1/2004 | Loparo | |
| 6,739,055 B2 | 5/2004 | Lee | |
| 6,918,278 B2 | 7/2005 | Dole et al. | |
| 7,007,391 B2 | 3/2006 | Stoick et al. | |
| 7,013,567 B2 | 3/2006 | Myers | |
| 7,204,021 B2 | 4/2007 | Houseman et al. | |
| 7,257,895 B2 | 8/2007 | Makkonen et al. | |
| 7,275,320 B2 | 10/2007 | Lee | |
| D556,528 S | 12/2007 | Huang | |
| D569,702 S | 5/2008 | Groten | |
| RE40,461 E | 8/2008 | Hu | |
| 7,464,472 B2 | 12/2008 | Kangas et al. | |
| D591,125 S | 4/2009 | Groten | |
| D591,126 S | 4/2009 | Groten | |
| D607,324 S | 1/2010 | Cho et al. | |
| D612,698 S | 3/2010 | Huang | |
| D612,699 S | 3/2010 | Groten et al. | |
| 7,716,840 B2 | 5/2010 | Nandkumar et al. | |
| 7,743,509 B2 | 6/2010 | Macsay et al. | |
| 7,743,510 B2 | 6/2010 | Lazarevic | |
| D626,812 S | 11/2010 | Macsay et al. | |
| 7,845,080 B2 | 12/2010 | Nasiell | |
| 7,934,317 B2 | 5/2011 | Chiu | |
| D639,628 S | 6/2011 | Zhou et al. | |
| D640,520 S | 6/2011 | Rampling | |
| D646,950 S * | 10/2011 | Going | D8/307 |
| 8,033,024 B2 | 10/2011 | Goop | |
| D660,116 S | 5/2012 | Owen et al. | |
| 8,225,511 B2 | 7/2012 | Miller et al. | |
| 8,261,410 B2 | 9/2012 | Sze | |
| D675,499 S | 2/2013 | Faucher | |
| D679,564 S | 4/2013 | Hong | |
| 8,413,336 B2 | 4/2013 | Chiu et al. | |
| D693,662 S | 11/2013 | Groten et al. | |
| D693,663 S | 11/2013 | Groten et al. | |
| 8,573,099 B2 | 11/2013 | Huang | |
| D696,566 S | 12/2013 | Mao | |
| 8,601,697 B2 | 12/2013 | Whittaker | |
| D696,915 S | 1/2014 | Lee | |
| D697,773 S | 1/2014 | Groten et al. | |
| D711,205 S | 8/2014 | Groten et al. | |
| 8,800,151 B2 | 8/2014 | Lee | |
| 2004/0025351 A1 | 2/2004 | Lee | |

(56) References Cited

U.S. PATENT DOCUMENTS

| | | |
|---|---|---|
| 2006/0085987 A1 | 4/2006 | Gordon |
| 2006/0092674 A1 | 5/2006 | Belton et al. |
| 2006/0254057 A1 | 11/2006 | Houseman et al. |
| 2007/0180701 A1 | 8/2007 | Hutt |
| 2007/0240311 A1 | 10/2007 | Kangas et al. |
| 2008/0060203 A1 | 3/2008 | Metcalf |
| 2008/0141538 A1 | 6/2008 | Nandkumar et al. |
| 2008/0307657 A1 | 12/2008 | Macsay et al. |
| 2009/0049697 A1 | 2/2009 | Williams |
| 2010/0199499 A1 | 8/2010 | Dibble |
| 2011/0005084 A1 | 1/2011 | Thorson et al. |
| 2011/0056081 A1 | 3/2011 | Miller et al. |
| 2011/0078905 A1 | 4/2011 | Macsay et al. |
| 2011/0179649 A1 | 7/2011 | Park |
| 2012/0023752 A1 | 2/2012 | Rampling et al. |
| 2012/0042759 A1 | 2/2012 | Mitchell |
| 2012/0247288 A1 | 10/2012 | Hamm et al. |
| 2013/0055862 A1 | 3/2013 | Kundracik et al. |

FOREIGN PATENT DOCUMENTS

| | | |
|---|---|---|
| EP | 589824 | 3/1994 |
| EP | 955118 | 5/1998 |
| EP | 1195216 | 5/2004 |
| TW | M265193 | 5/2005 |
| WO | WO 0202264 | 1/2002 |
| WO | WO 2008/073526 | 6/2008 |
| WO | WO 2008/154109 | 12/2008 |
| WO | WO 2010/114642 | 10/2010 |
| WO | WO 2011/044081 | 6/2011 |
| WO | WO 2012/024231 | 2/2012 |
| WO | WO 2013/036476 | 3/2013 |

\* cited by examiner

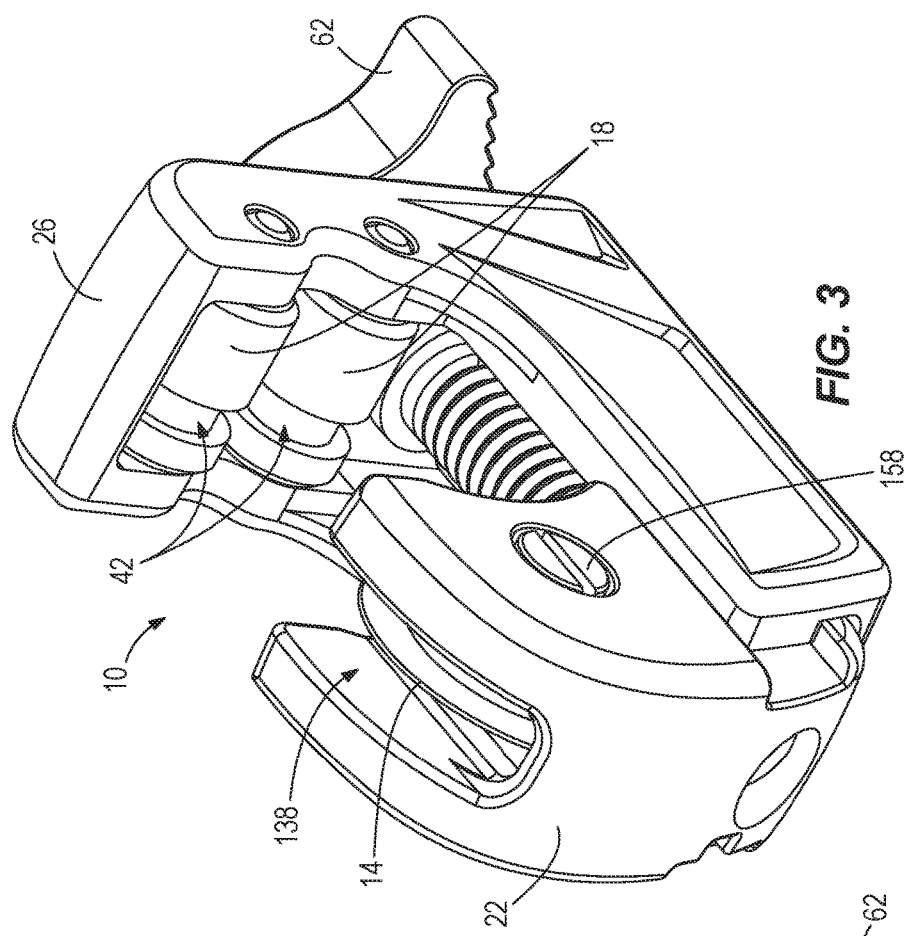
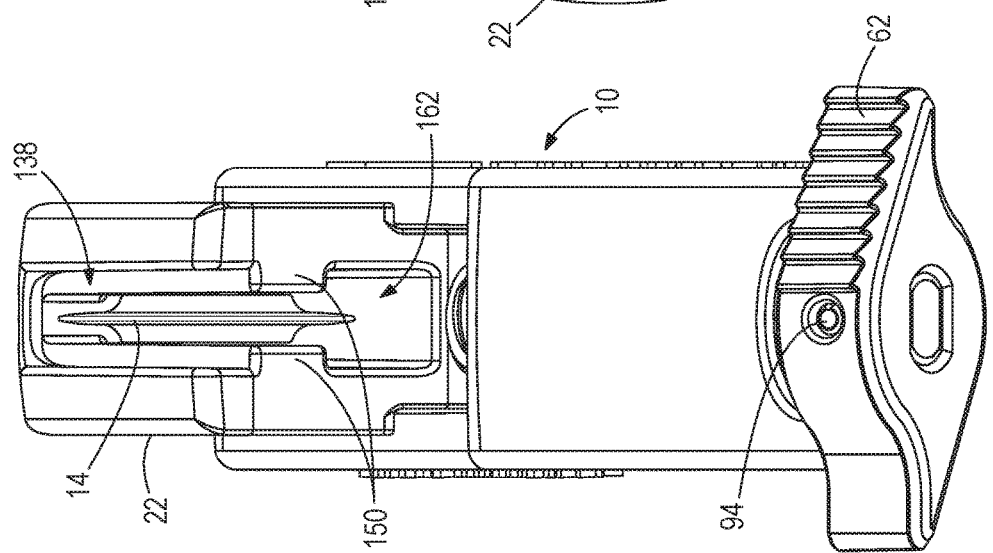

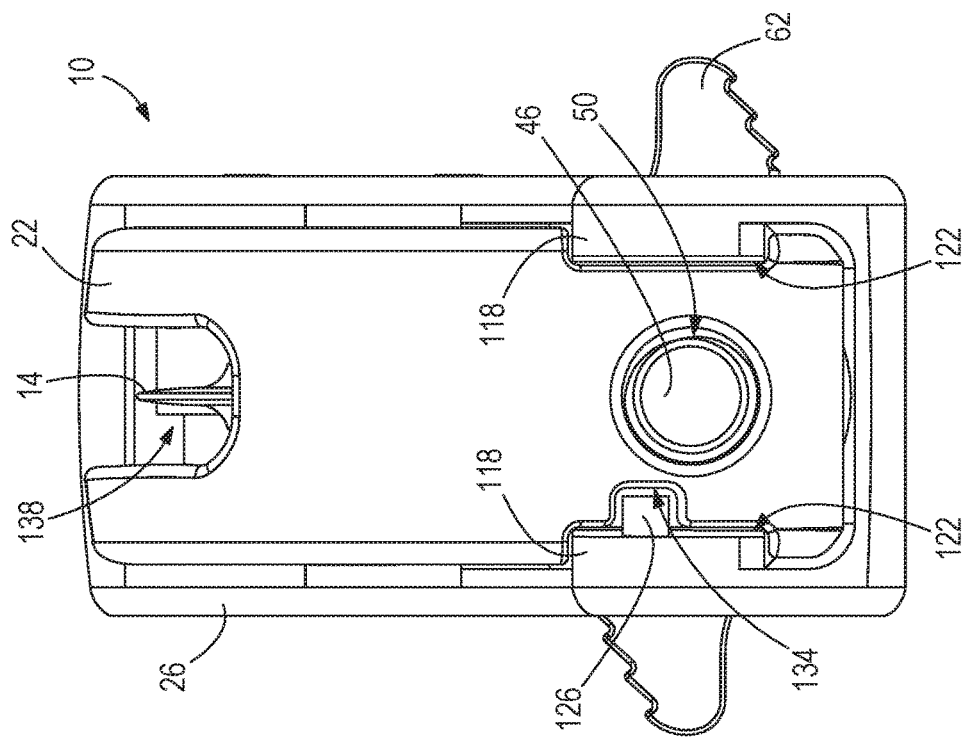
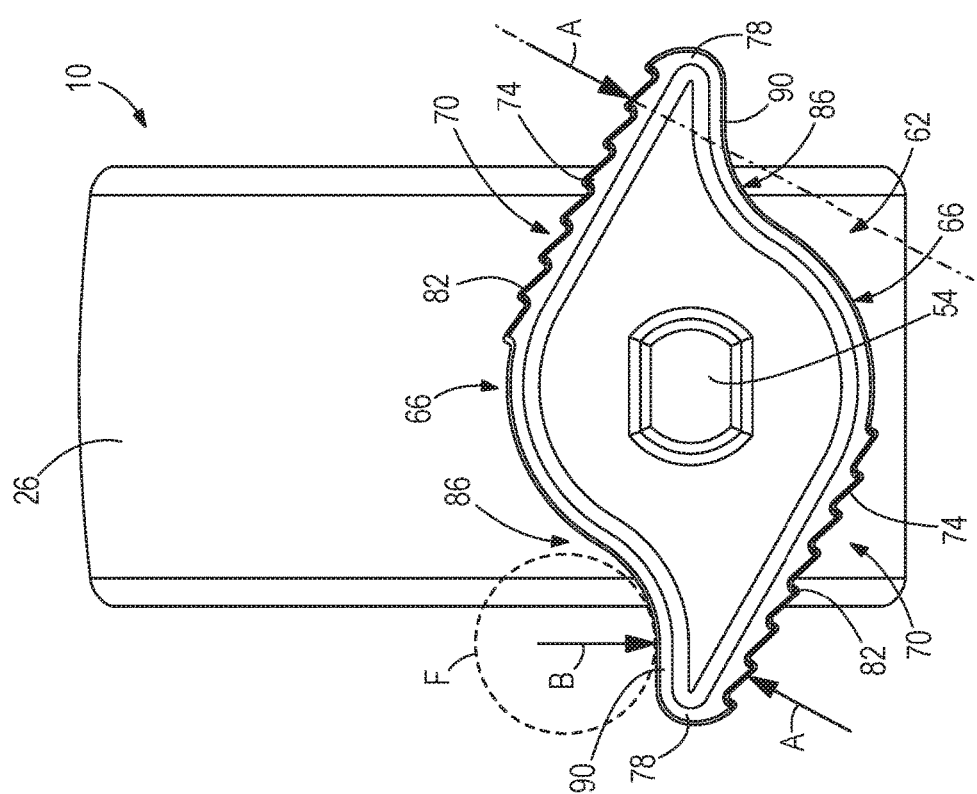

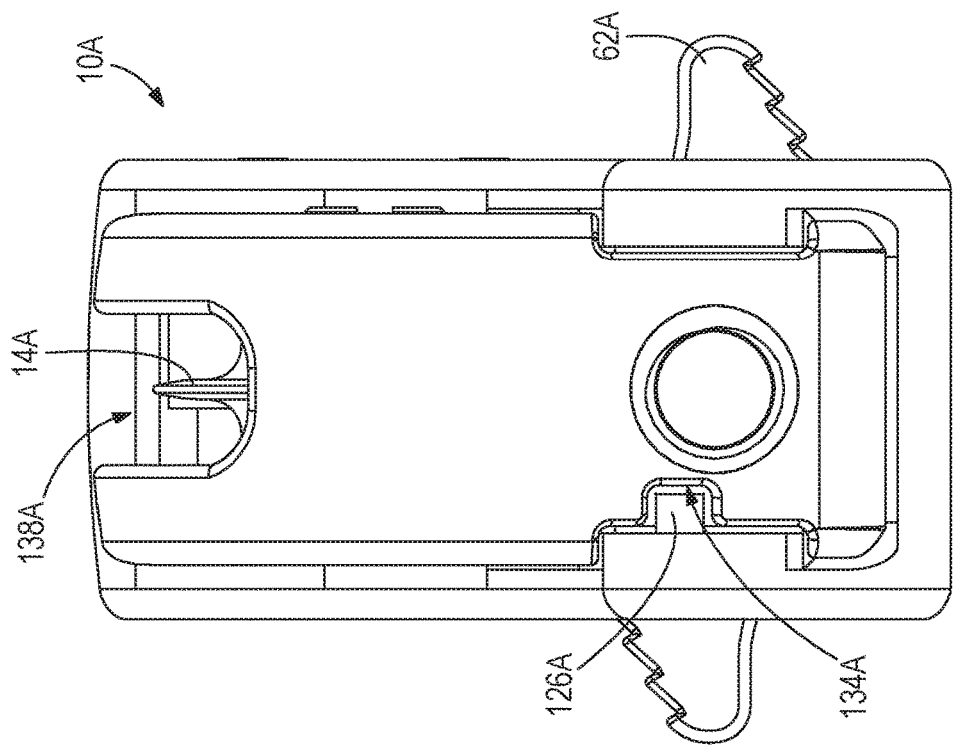
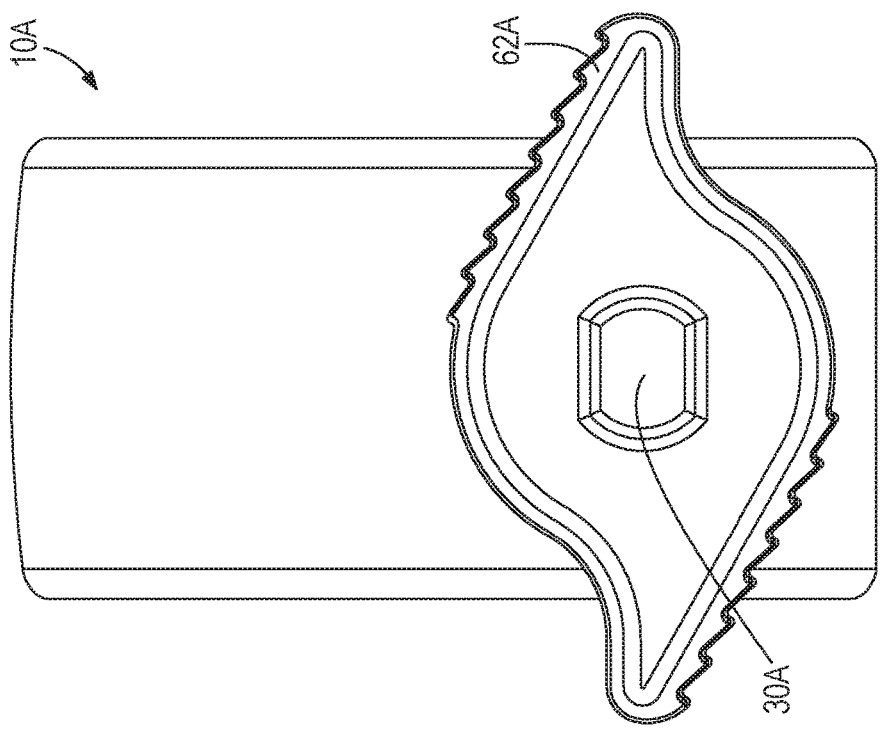

TUBING CUTTER

RELATED APPLICATIONS

The present application claims priority to U.S. Provisional Patent Application No. 62/175,846, filed Jun. 15, 2015, and to Chinese Utility Model Application No. 201520411748.0, filed Jun. 15, 2015, the entire contents of both of which are hereby incorporated by reference.

FIELD

The present invention generally relates to cutters and, more specifically, to a tubing cutter including a rotatable shaft configured to move a cutting wheel housing portion relative to a roller housing portion.

SUMMARY

In one independent aspect, a cutter, such as a tubing cutter or swing cutter, may generally include a cutting wheel; a roller; a housing assembly including a first housing portion supporting the cutting wheel and a second housing portion supporting the roller, a shaft connecting the first housing portion and the second housing portion, rotation of the shaft causing relative movement of the first housing portion and the second housing portion along a shaft axis, and a knob connected to the shaft and engageable by a user to rotate the shaft, the knob having, in a plane perpendicular to the shaft axis, a non-symmetrical shape defined by opposite circular sector portions and opposite lever portions, each lever portion being engageable by a user to apply a force to the knob in a direction of rotation.

In another independent aspect, a cutter may generally include a cutting wheel; a roller; a housing assembly including a first housing portion supporting the cutting wheel and a second housing portion supporting the roller, a shaft connecting the first housing portion and the second housing portion, rotation of the shaft causing relative movement of the first housing portion and the second housing portion along a shaft axis, and a pin supported on one of the first housing portion and the second housing portion and engageable with a surface on the other of the first housing portion and the second housing portion to inhibit movement beyond a relative position.

In yet another independent aspect, a cutter may generally include a cutting wheel having a cutting portion with a circumference and an axle defining a cutting wheel axis; a roller; a housing assembly including a first housing portion supporting the cutting wheel and a second housing portion supporting the roller, the first housing portion having a first side wall and an opposite second side wall, each side wall covering a substantial portion of the circumference of the cutting wheel (e.g., at least about 270°), each side wall having a support portion defining an opening for receiving the axle, a space between the support portions closely accommodating the cutting wheel when supported, a slot being defined between the first wall and the second wall, the slot having a width greater than the space (e.g., at least about 50% greater); and a shaft connecting the first housing portion and the second housing portion, rotation of the shaft causing relative movement of the first housing portion and the second housing portion along a shaft axis generally perpendicular to the cutting wheel axis, the slot being oriented to receive the cutting wheel in a direction transverse to the cutting wheel axis and transverse to the shaft axis.

In a further independent aspect, a cutter may generally include a cutting wheel; a roller; a housing assembly including a first housing portion and a second housing portion supported for relative movement, the first housing portion defining a cavity and an opening communicating between the cavity and an exterior of the first housing portion, one of the first housing portion and the second housing portion supporting the cutting wheel, the other of the first housing portion and the second housing portion supporting the roller; and a shaft connecting the first housing portion and the second housing portion for movement along a shaft axis, the shaft being formed to include a radial shoulder preventing movement of the shaft from the cavity through the opening.

In another independent aspect, a cutter may generally include a cutting wheel; a roller; a housing assembly including a first housing portion supporting the cutting wheel and a second housing portion supporting the roller, the first housing portion and the second housing portion being supported for relative movement, the first housing portion having a wall at least partially defining a cavity and defining an opening communicating between the cavity and an exterior of the first housing portion, the second housing portion defining a threaded opening; and a shaft connecting the first housing portion and the second housing portion for movement along a shaft axis, the shaft having a first end and an opposite second end, the first end extending through the opening to the exterior of the first housing portion, the second end being threaded and received in the threaded opening, rotation of the shaft causing relative movement of the first housing portion and the second housing portion along the shaft axis, the shaft being formed to include an annular radial shoulder between the first end and the second end and having a shoulder surface engageable with a wall surface to inhibit movement of the shaft from the cavity through the opening.

In yet another independent aspect, a cutter may generally include a cutting wheel; a roller; a housing assembly including a first housing portion supporting the cutting wheel and a second housing portion supporting the roller, the first housing portion and the second housing portion being supported for relative movement, the first housing portion having a wall at least partially defining a cavity and defining an opening communicating between the cavity and an exterior of the first housing portion, the second housing portion defining a threaded opening; a shaft connecting the first housing portion and the second housing portion for movement along a shaft axis, the shaft having a first end and an opposite second end, the first end extending through the opening to the exterior of the first housing portion, the second end being threaded and received in the threaded opening, rotation of the shaft causing relative movement of the first housing portion and the second housing portion along the shaft axis, the shaft being formed to include an annular radial shoulder between the first end and the second end and having a shoulder surface engageable with a wall surface to inhibit movement of the shaft from the cavity through the opening; and structure separate from the shaft engageable to inhibit movement of the first end through the opening into the cavity.

In a further independent aspect, a method of assembling a tubing cutter may be provided. The method may generally include providing a cutting wheel; providing a roller; providing a housing assembly including a first housing portion and a second housing portion, the first housing portion having a wall at least partially defining a cavity and defining an opening communicating between the cavity and an exterior of the first housing portion; providing a shaft extending along a shaft axis, having a first end and an opposite second end and formed to include a radial shoulder therebetween; supporting the cutting wheel on the first housing portion; supporting the roller on the second housing portion; inserting the first end of shaft into the cavity and through the opening to the exterior of the first housing, the shoulder inhibiting further movement of the shaft through the opening; engaging structure separate from the shaft to inhibit movement of the first end through the opening into the cavity; and connecting the second housing portion to the second end of the shaft such that the first housing portion and the second housing portion are movable along a shaft axis.

Other independent features and independent aspects of the invention will become apparent by consideration of the following detailed description and accompanying drawings.

BRIEF DESCRIPTION OF THE DRAWINGS

FIG. 2 is another perspective view of the cutter of FIG. 1.
FIG. 3 is another perspective view of the cutter of FIG. 1.
FIG. 5 is a rear view of the cutter of FIG. 1.
FIG. 6 is a front view of the cutter of FIG. 1.
FIG. 18 is a rear view of the cutter of FIG. 16.
FIG. 19 is a front view of the cutter of FIG. 16.

DETAILED DESCRIPTION

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

FIGS. 1-10 illustrate one construction of a cutter 10, such as a swing cutter or a tubing cutter. FIGS. 16-23, 27-34 and 43-50 illustrate alternative constructions of a cutter 10A, 10B and 10C, and common elements have the same reference number "A", "B" and "C", respectively.

Figure 1:
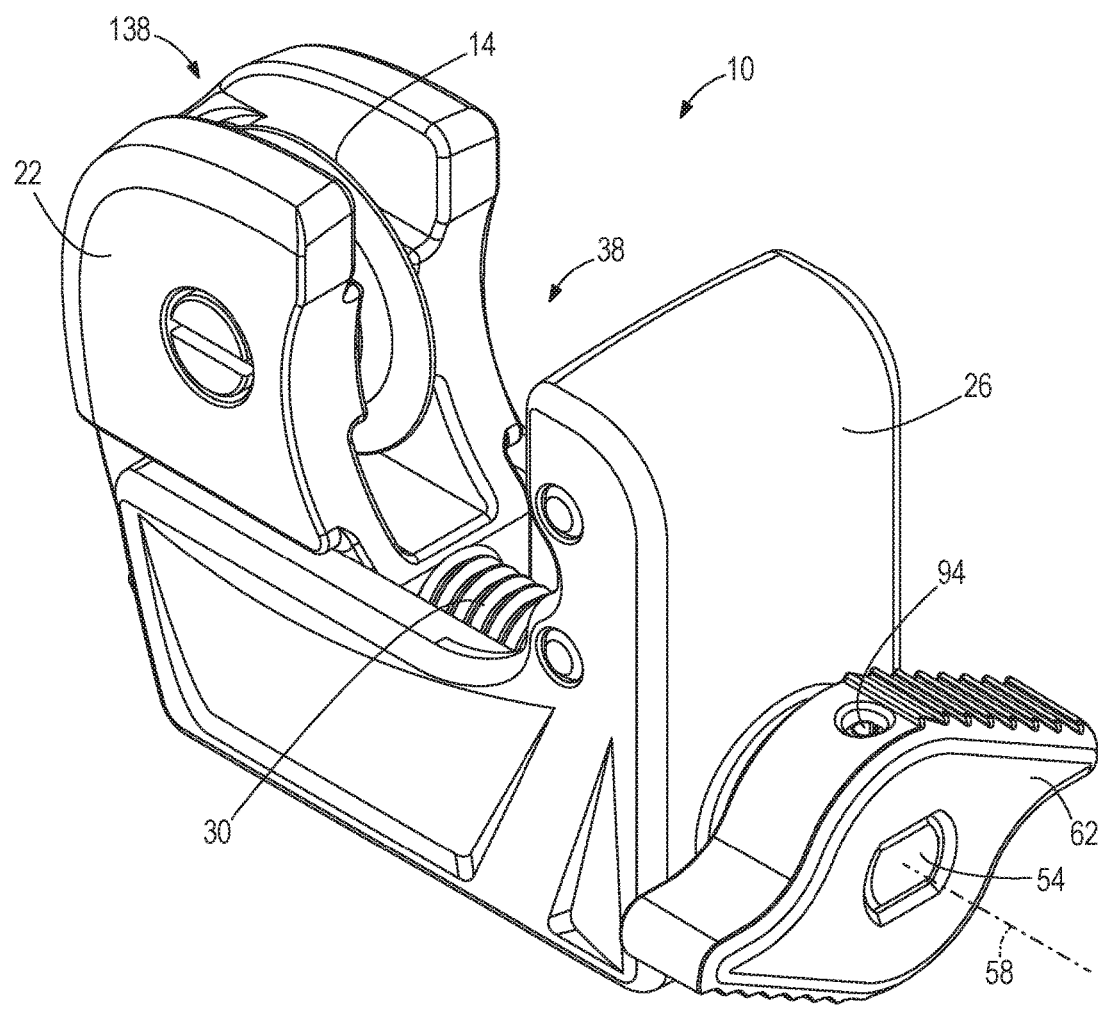
FIG. 1 is a perspective view of a cutter, such as a tubing cutter.
Figure 4:
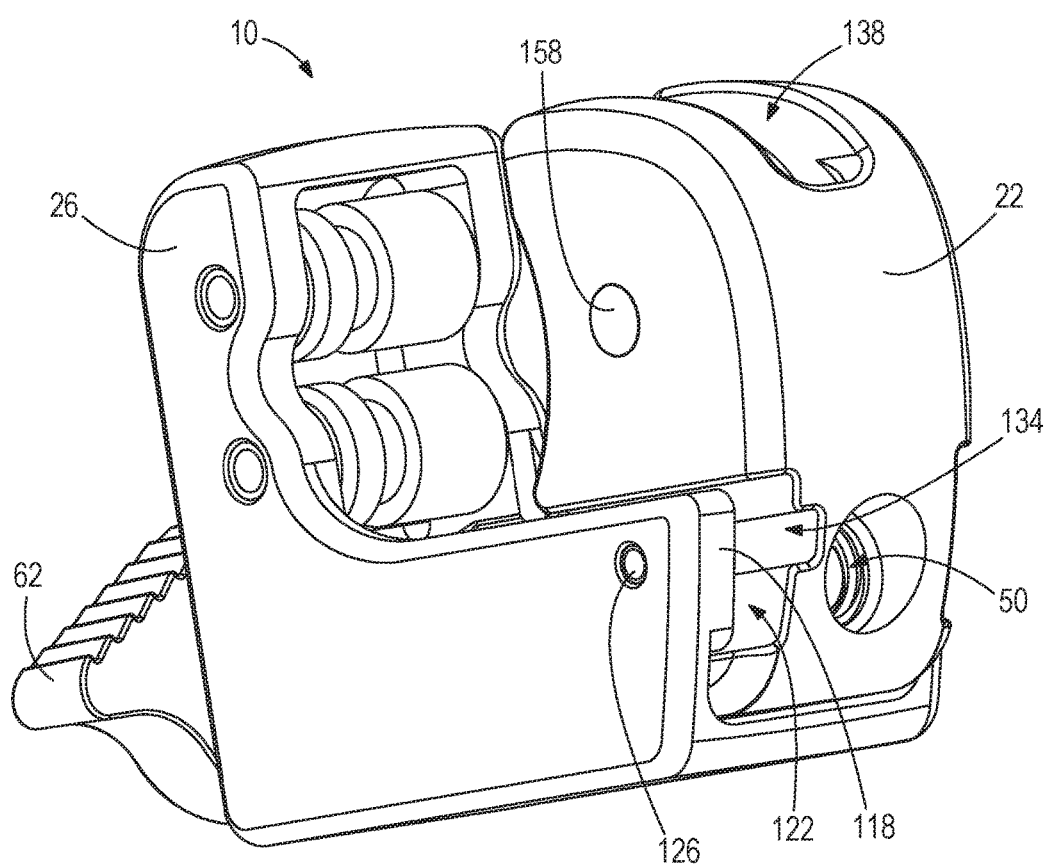
FIG. 4 is another perspective view of the cutter of FIG. 1.

As shown in FIGS. 1-2, the cutter 10 includes a cutting wheel 14, one or more rollers 18, and a housing assembly including a cutting wheel housing portion 22 supporting the cutting wheel 14 and a roller housing portion 26 supporting the roller(s) 18. A shaft 30 movably connects the housing portions 22, 26. The cutter 10 defines (see FIG. 9) an adjustable C-shaped recess 38 to receive a tube, pipe, other substantially cylindrical work piece W to be cut by the cutting wheel 14. Each roller 18 defines a groove 42 for receiving a flange or flare (not shown) on a work piece W to be cut.

The shaft 30 has (see FIG. 3) a threaded end 46 engaging a threaded bore 50 in the housing portion 22 and (see FIG. 7) a free end 54 protruding from the housing portion 26. The shaft 30 is rotatably coupled to the housing portion 26. Rotation of the shaft 30 causes relative movement of the housing portions 22, 26 along the shaft axis 58 through engagement of the threaded portions 46, 50.

A thumb wheel or adjustment knob 62 is connected to the end 54 of the shaft 30 and is engageable by a user to rotate the knob 62 to adjust the relative position of the housing portions 22, 26. The knob 62 is drivingly connected to the shaft 30 (e.g., by inter-engaging structure (the shape of the shaft 30 and an opening in the knob 62 (non-circular, non-coaxial, flat (see FIGS. 5, 18, 37 and 52)), friction, etc.). As the knob 62 is rotated, engagement of the treaded portions 46, 50 causes relative axial movement of the housing portions 22, 26. Depending on the direction of rotation of the knob 62 and the shaft 30, the housing portions 22, 26 move together or apart.

In illustrated constructions (see FIGS. 5, 18, 29, 36, 45 and 51), the knob 62 has, in a plane perpendicular to the shaft axis 58, a non-symmetrical shape. The illustrated shape is defined by opposite circular sector portions 66 and opposite lever portions 70. Each lever portion 70 is engageable by the user to apply a force (illustrated by arrow A) to the knob 62 in a direction of rotation. In the illustrated construction, the user applies a force to the lever portion(s) 70 to move the housing portions 22, 26 (and the supported cutting wheel 14 and roller(s) 18, respectively) together to cut the work piece W.

Each lever portion 70 has a generally tangent surface 74 extending from the adjacent sector portion 66 to an end 78. Ridges 82 are provided on the surface 74 to, for example, increase friction, improve gripping of the knob 62, etc. The ridges 82 are formed by a rear surface generally perpendicular to the surface 74 and an angled forward surface.

On the opposite side, a concave portion 86 is between the end 78 and the other sector portion 66 to form an S-shape. The concave portion 86 has an at least approximately radial portion 90 that merges with the sector portion 66. A user's finger F can be "cupped" in the concave portion 86 to apply a force (illustrated by arrow B) to rotate the knob 62 in the opposite direction (e.g., to move the housing portions 22, 26 (and the supported cutting wheel 14 and roller(s) 18, respectively) apart to open the recess 38). The user can quickly open the cutter 10 with a single finger F revolving about the shaft axis 58 while being maintained in the concavity.

The shape of the illustrated knob 62 indicates a direction of rotation of the knob 62 and the shaft 30 and the resulting movement of the housing portions 22, 26. As described above, the tangent surface 74 of each lever portion 70 is engageable to rotate the knob 62 and the shaft 30 in one direction (e.g., to move the housing portions 22, 26 (and the supported cutting wheel 14 and roller(s) 18, respectively) together to cut the work piece V. The illustrated ridges 82 also point in this direction to provide an indication of the cutting direction. As also described above, the concave surface 86 is engageable to rotate the knob 62 and the shaft 30 in the opposite direction (e.g., to move the housing portions 22, 26 (and the supported cutting wheel 14 and roller(s) 18, respectively) apart to open the recess 38). These shapes (tangent and concave) thus indicate a direction of rotation and resulting operation of the cutter 10.

Figure 15A:
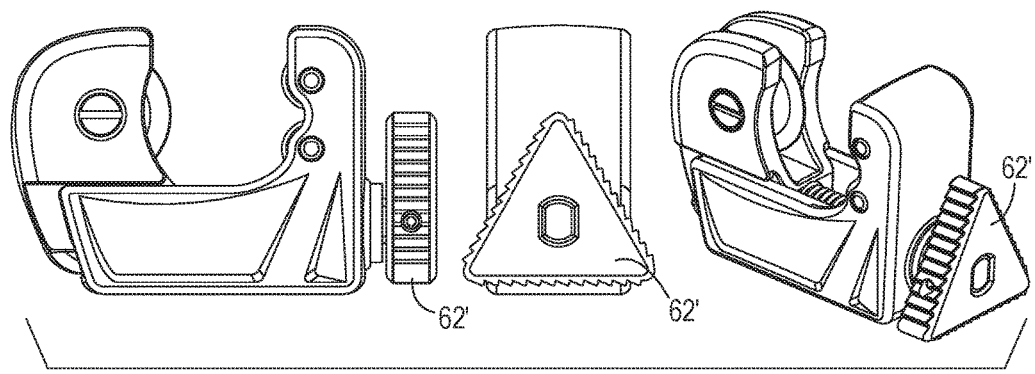
FIGS. 15A-15C are views of cutters similar to the cutter shown in FIGS. 1-10 and illustrating alternative constructions of the knob of the cutter.
Figure 15B:
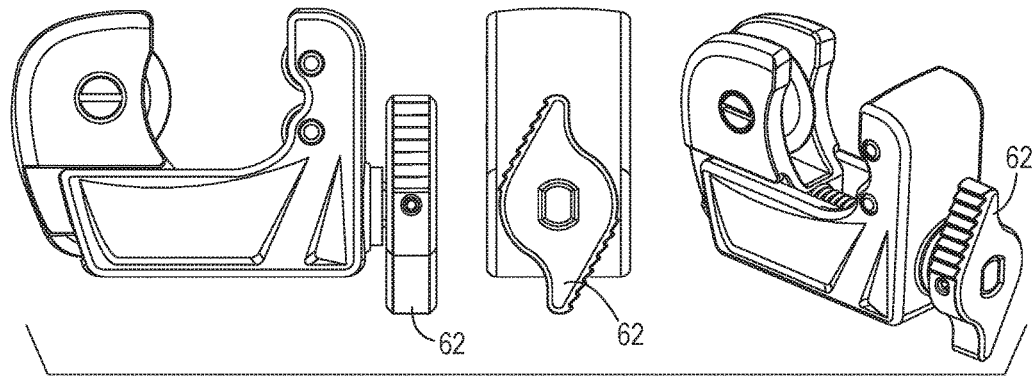
Figure 15C:
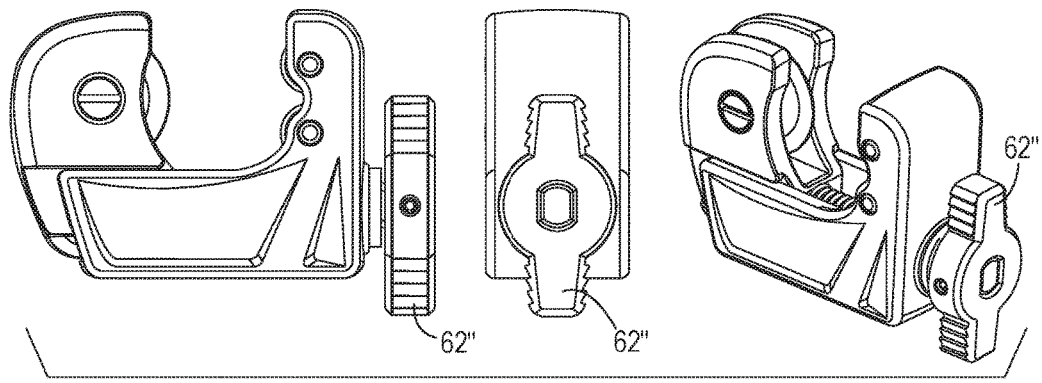
Figure 16:
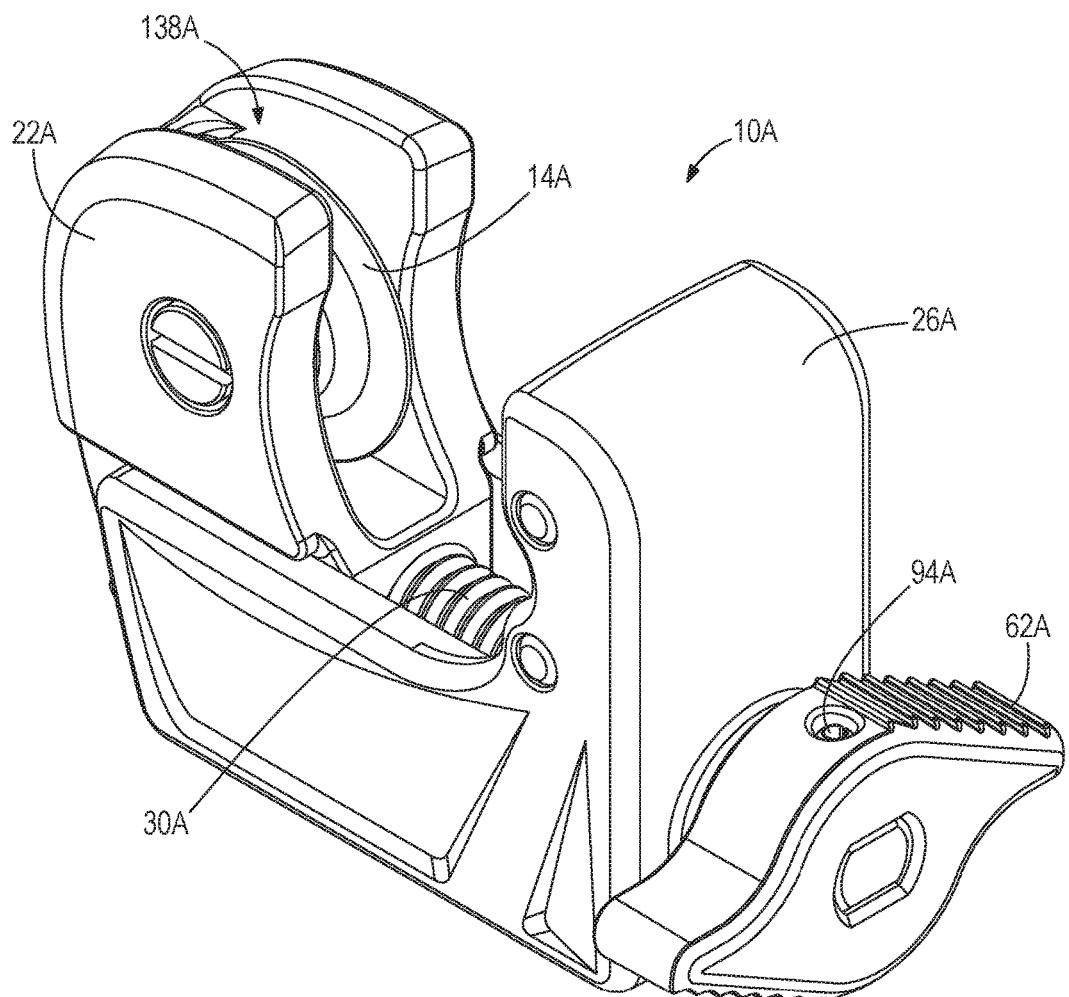
FIG. 16 is a perspective view of an alternative construction of a cutter, such as a tubing cutter.
Figure 17:
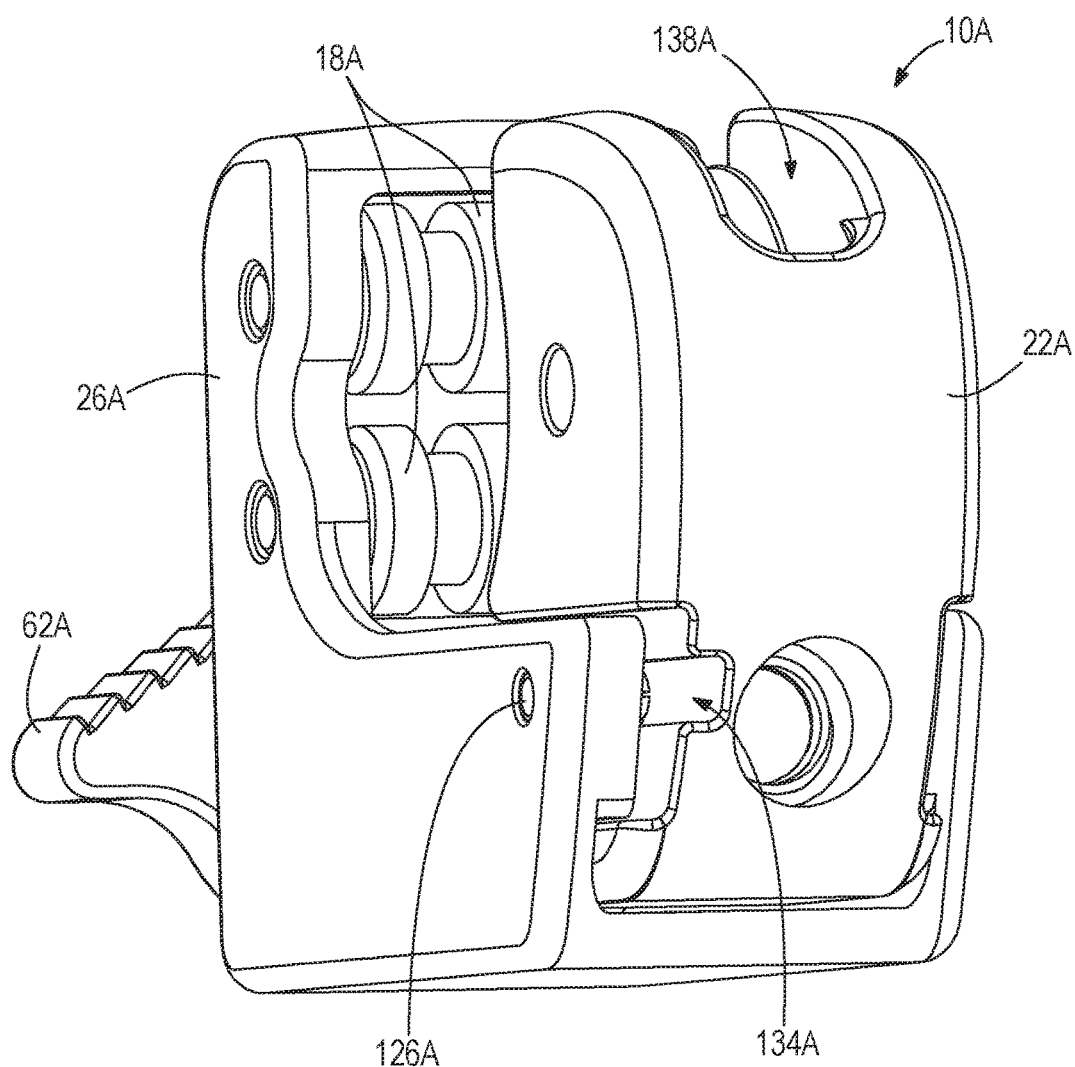
FIG. 17 is another perspective view of the cutter of FIG. 16.
Figure 20:
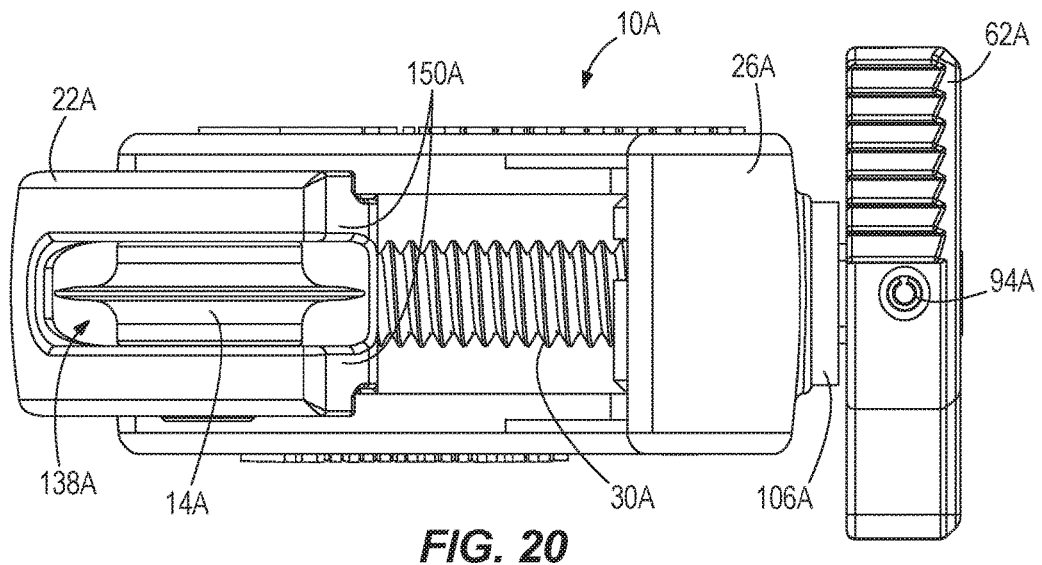
FIG. 20 is a top view of the cutter of FIG. 16.
Figure 21:
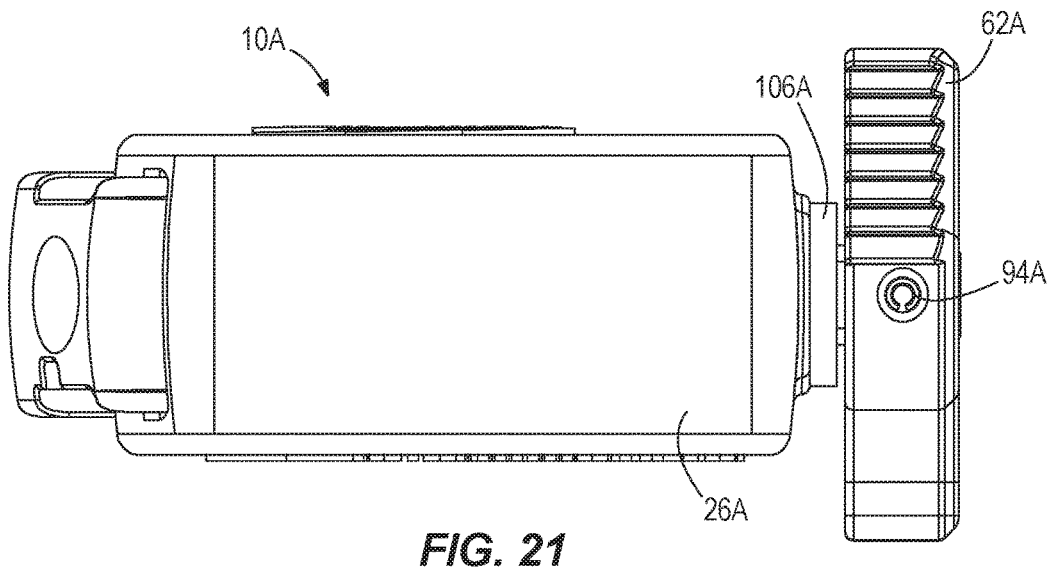
FIG. 21 is a bottom view of the cutter of FIG. 16.
Figure 22:
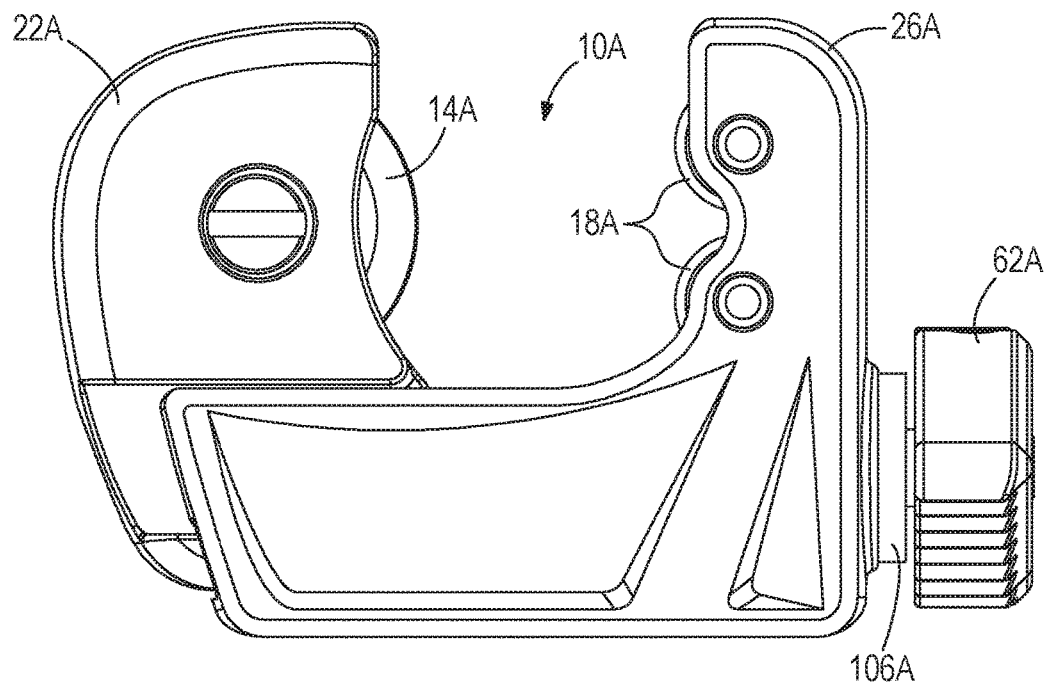
FIG. 22 is a side view of the cutter of FIG. 16.
Figure 23:
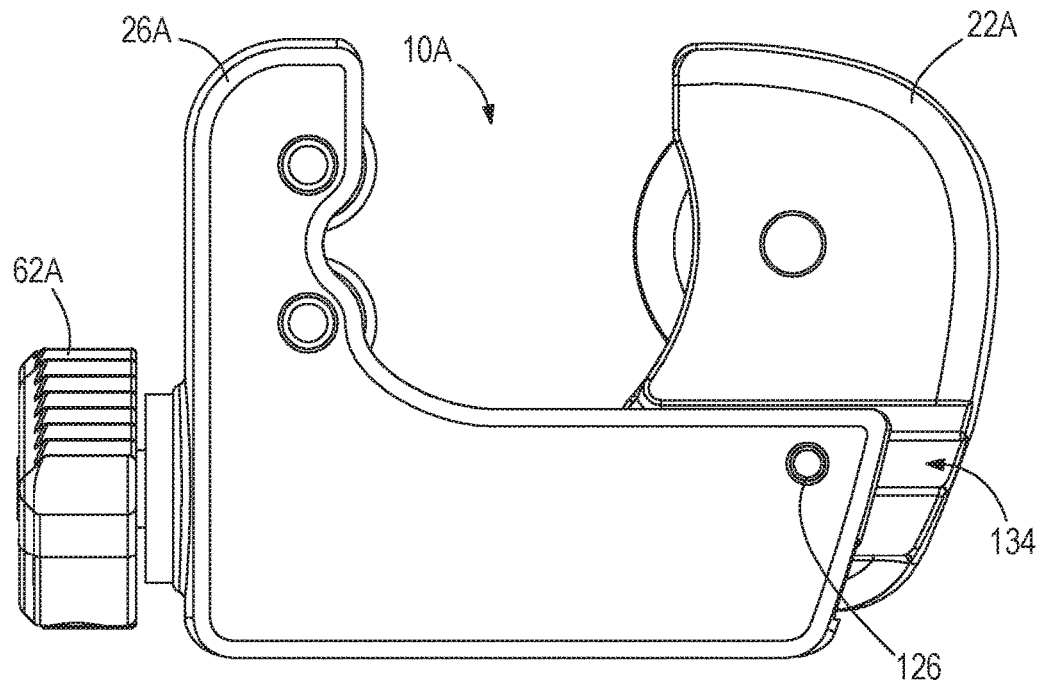
FIG. 23 is another side view of the cutter of FIG. 16.
Figure 24:
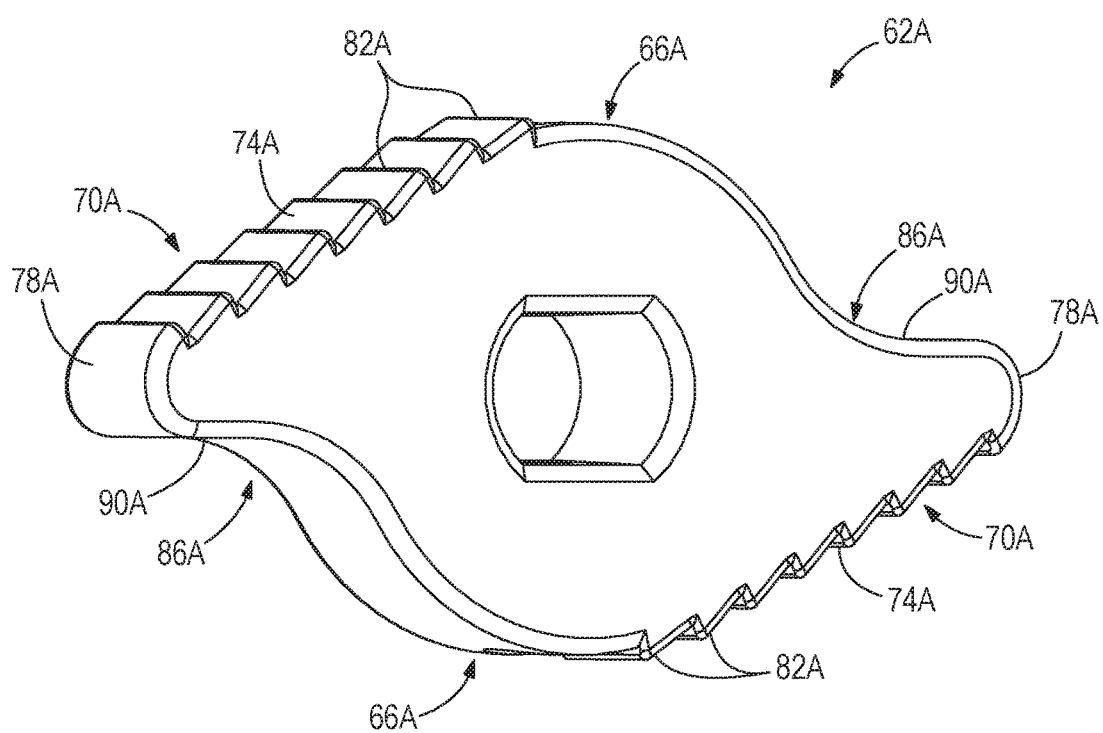
FIG. 24 is a perspective view of a knob of the cutter of FIG. 16.
Figure 26:
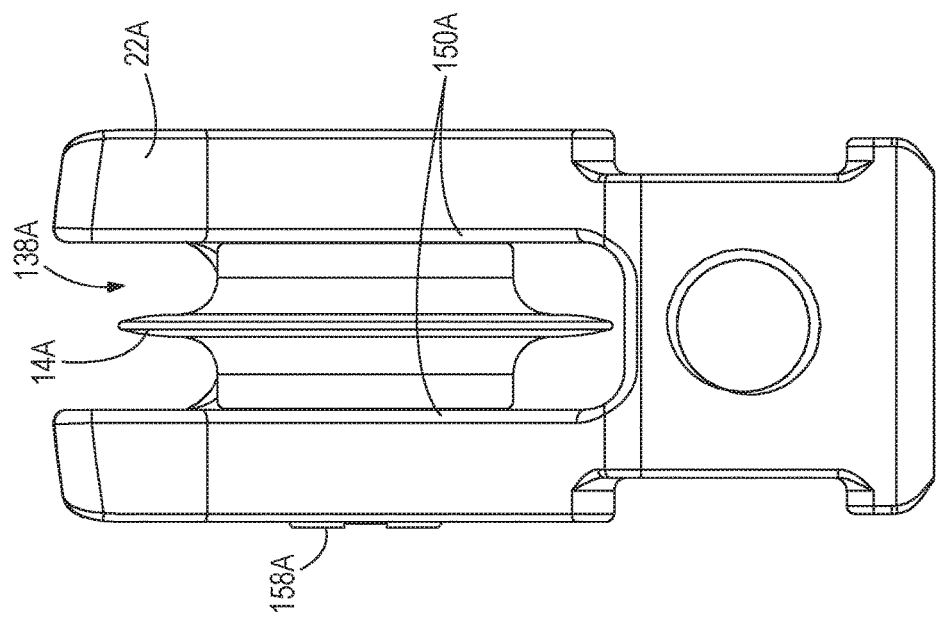
FIG. 26 is a perspective view of the cutting wheel housing portion and the cutting wheel of the cutter of FIG. 16.
Figure 25:
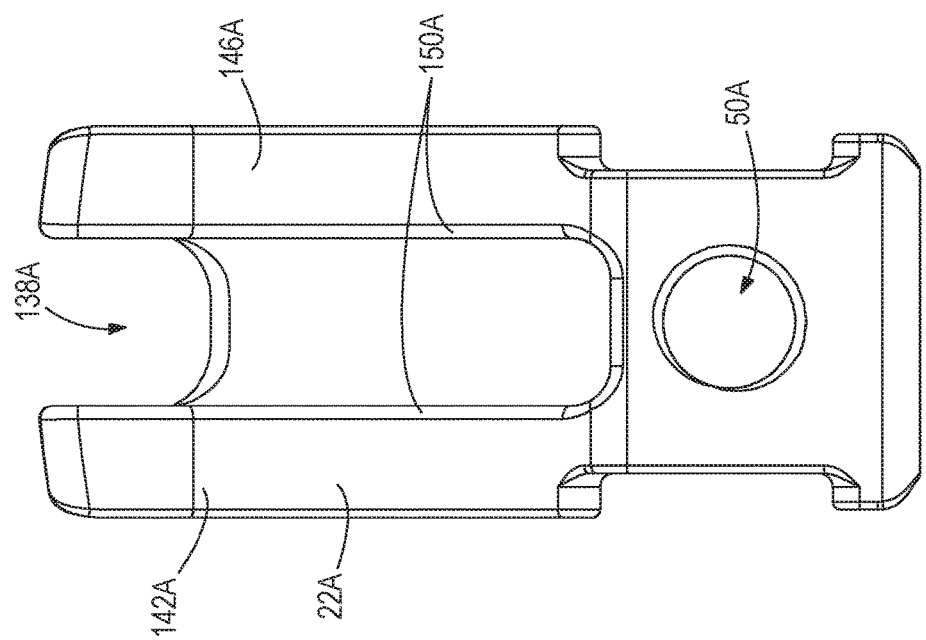
FIG. 25 is a view of a cutting wheel housing portion of the cutter of FIG. 16.
Figure 27:
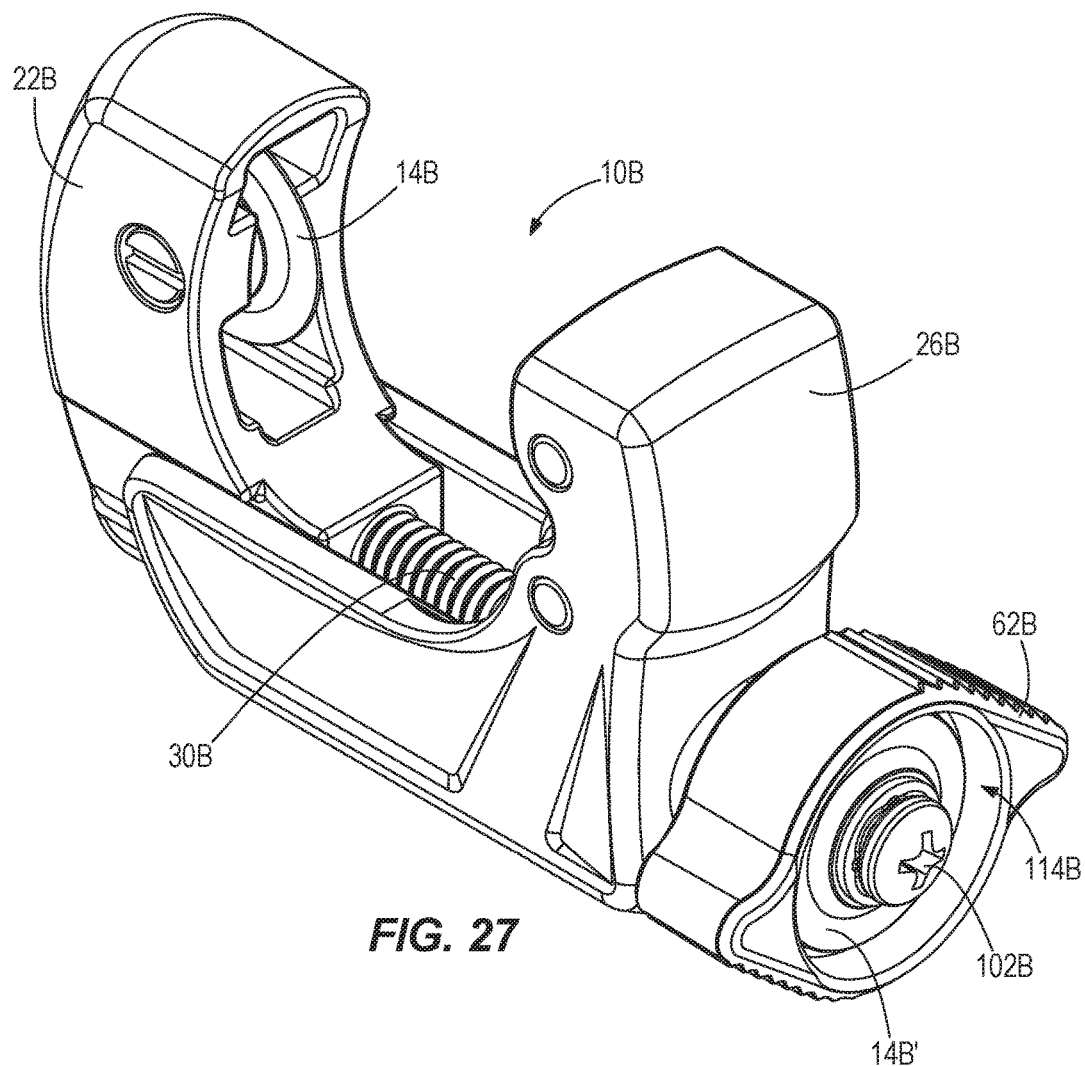
FIG. 27 is a perspective view of another alternative construction of a cutter, such as a tubing cutter.
Figure 28:
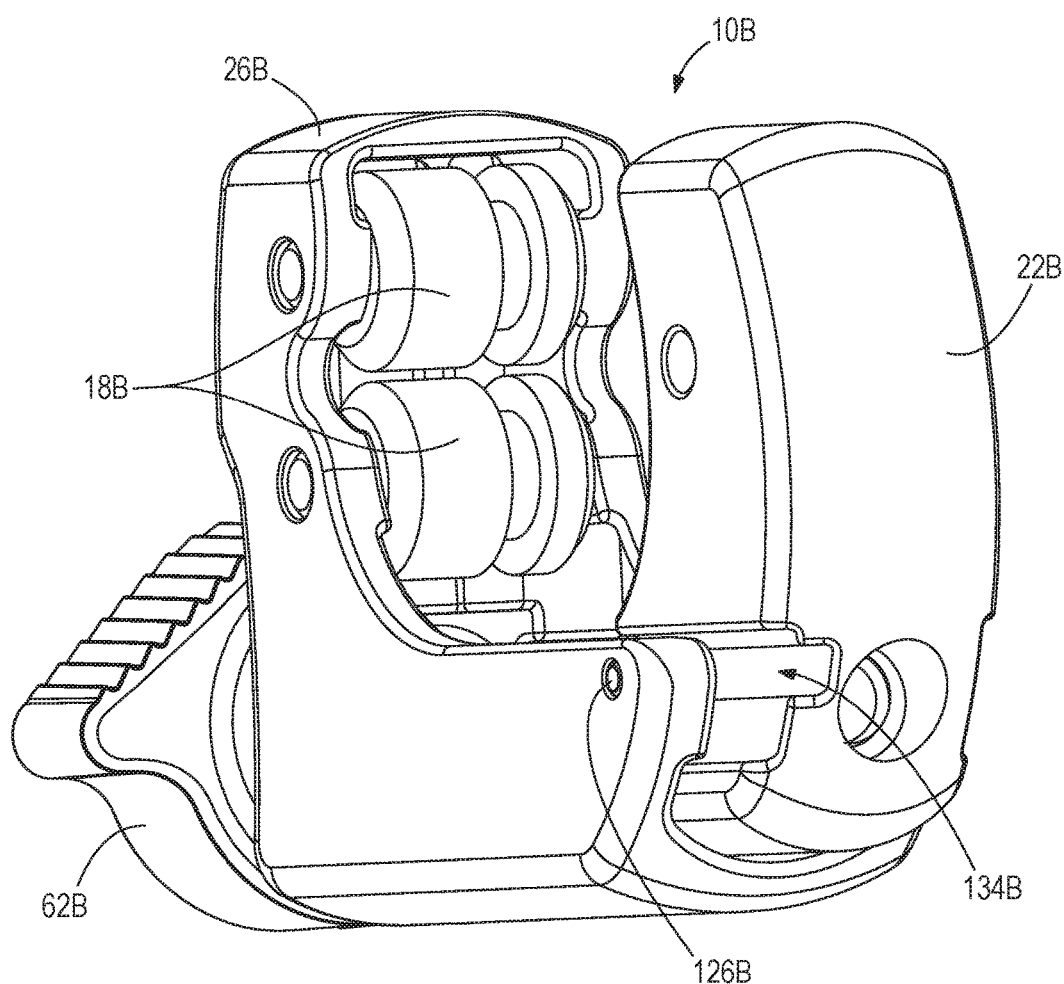
FIG. 28 is another perspective view of the cutter of FIG. 27.
Figure 30:
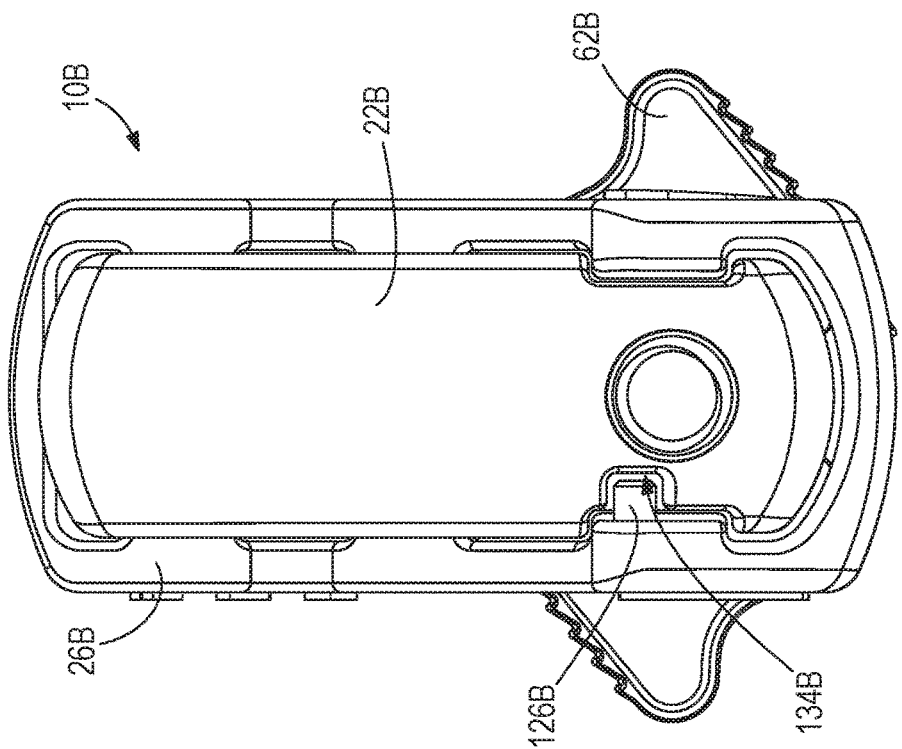
FIG. 30 is a front view of the cutter of FIG. 27.
Figure 29:
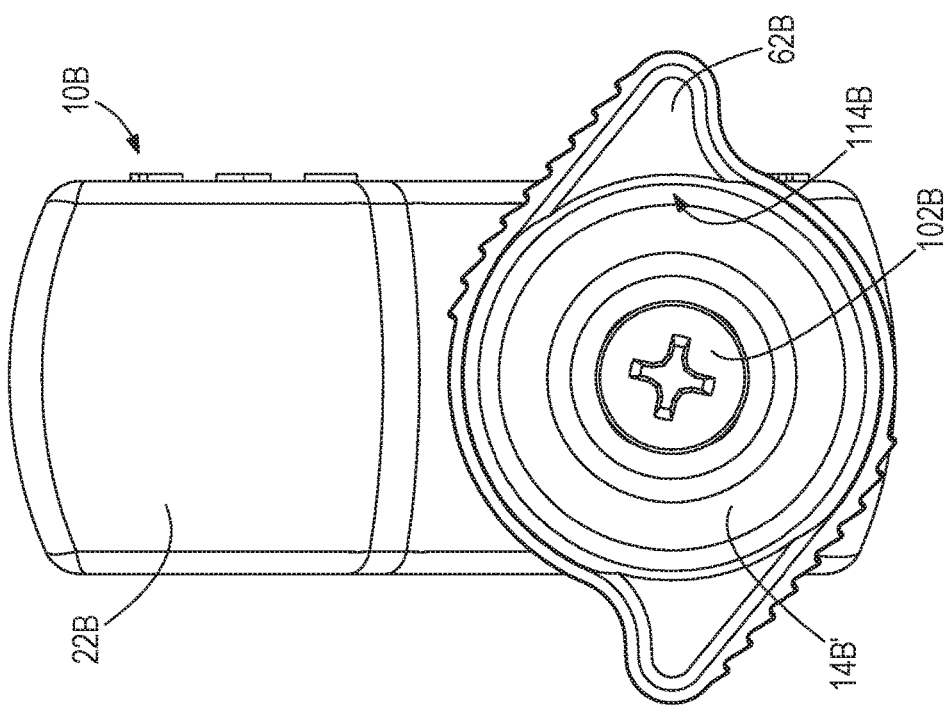
FIG. 29 is a rear view of the cutter of FIG. 27.
Figure 31:
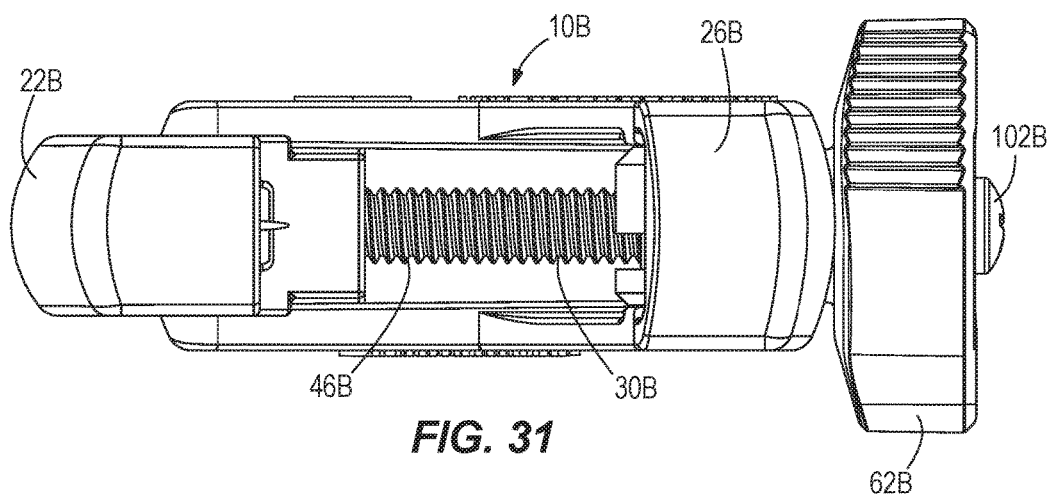
FIG. 31 is a top view of the cutter of FIG. 27.
Figure 32:
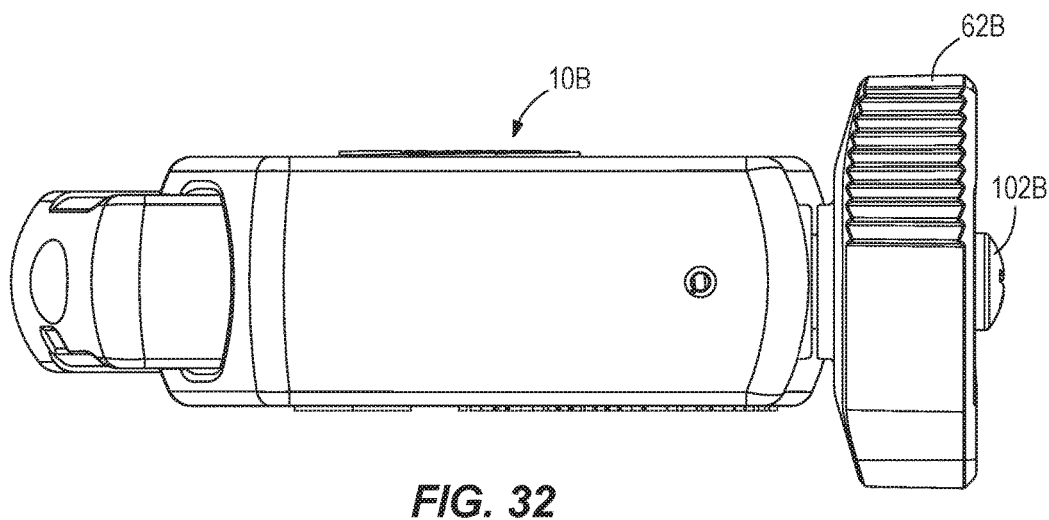
FIG. 32 is a bottom view of the cutter of FIG. 27.
Figure 33:
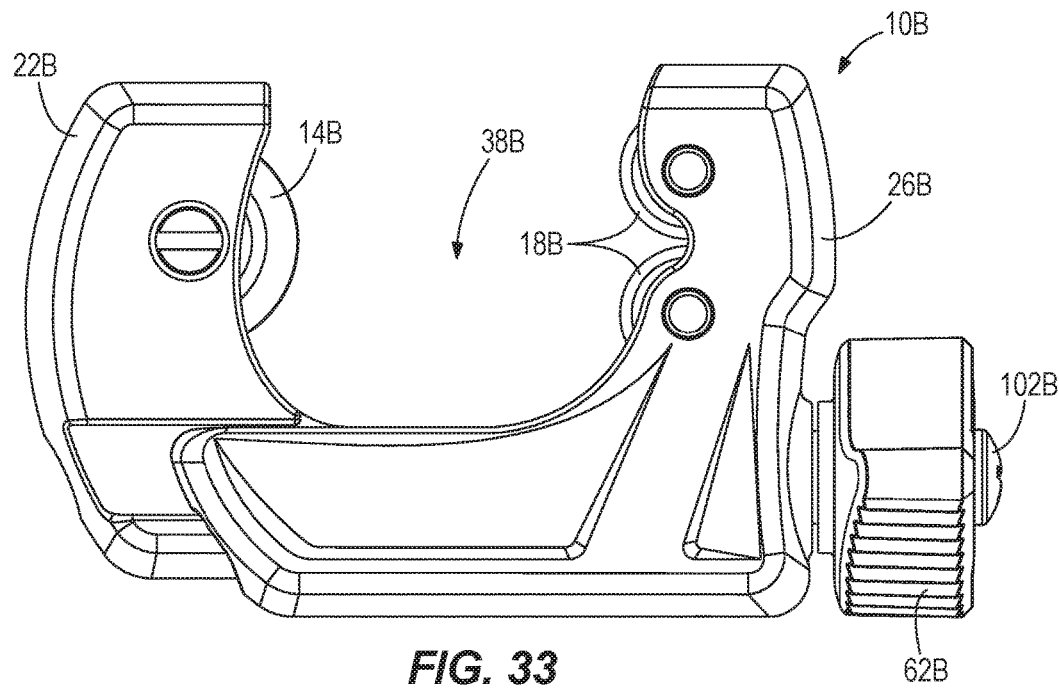
FIG. 33 is a side view of the cutter of FIG. 27.
Figure 34:
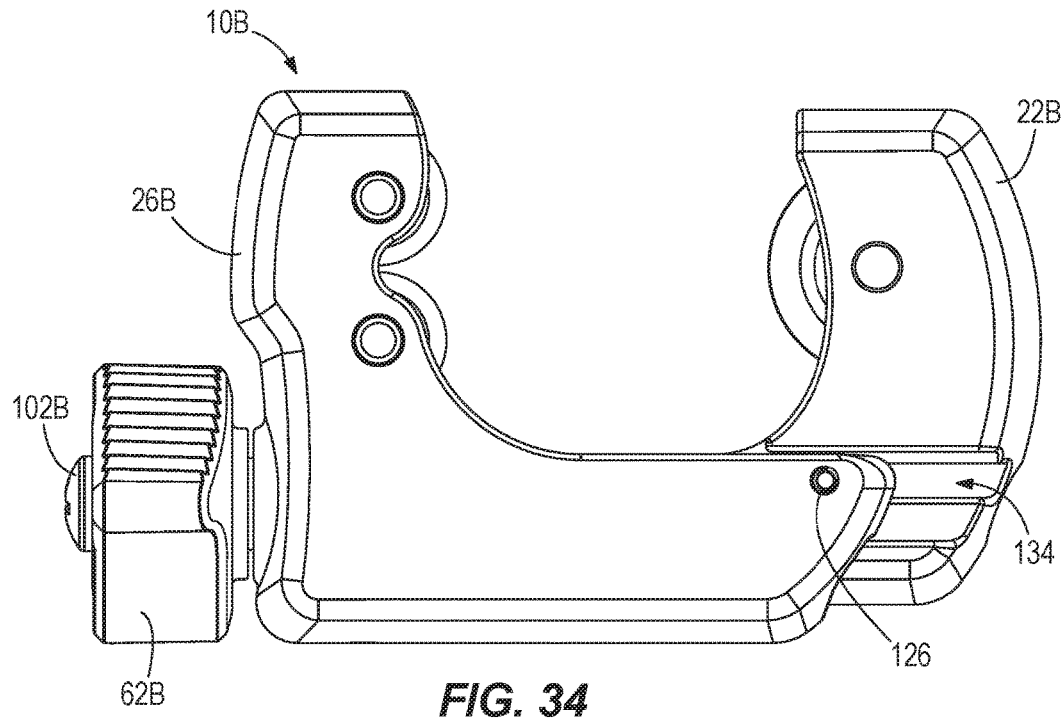
FIG. 34 is another side view of the cutter of FIG. 27.
Figure 35:
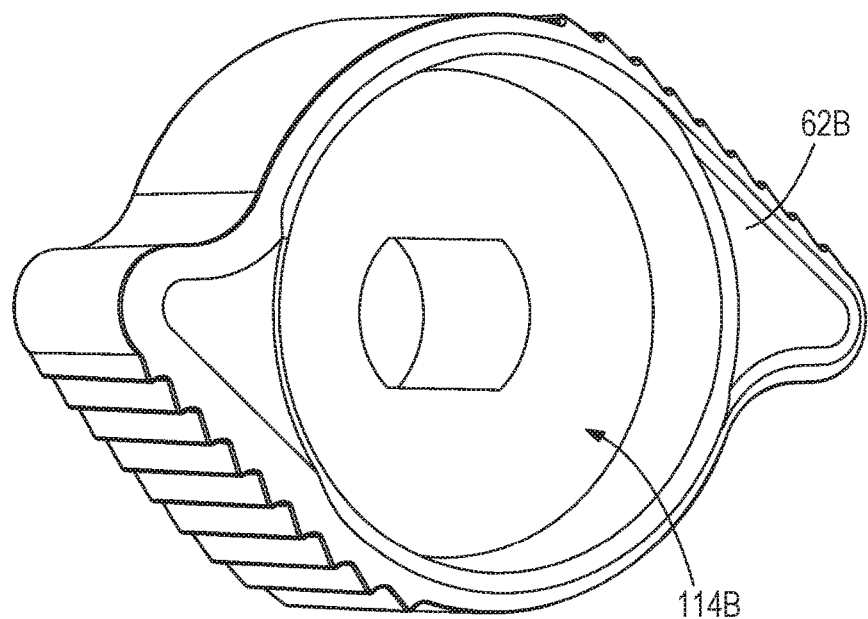
FIG. 35 is a perspective view of a knob of the cutter of FIG. 27.
Figure 36:
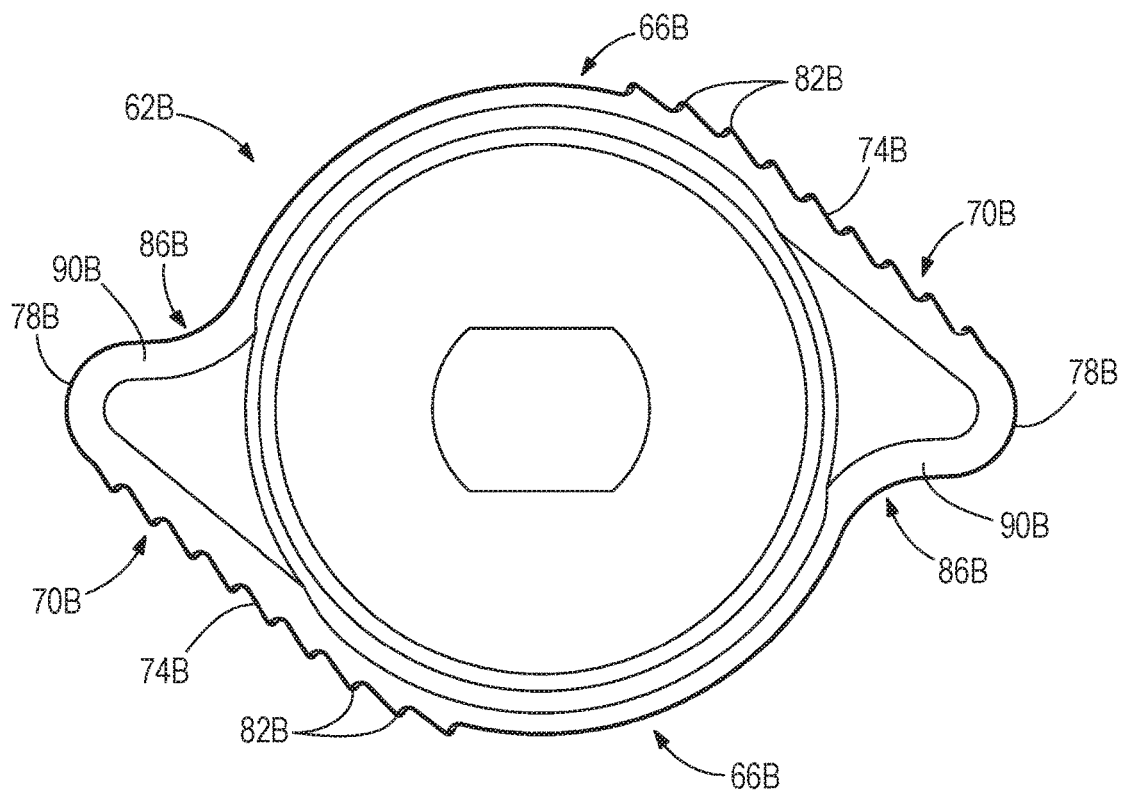
FIG. 36 is a view of the surface of the knob shown in FIG. 35.
Figure 37:
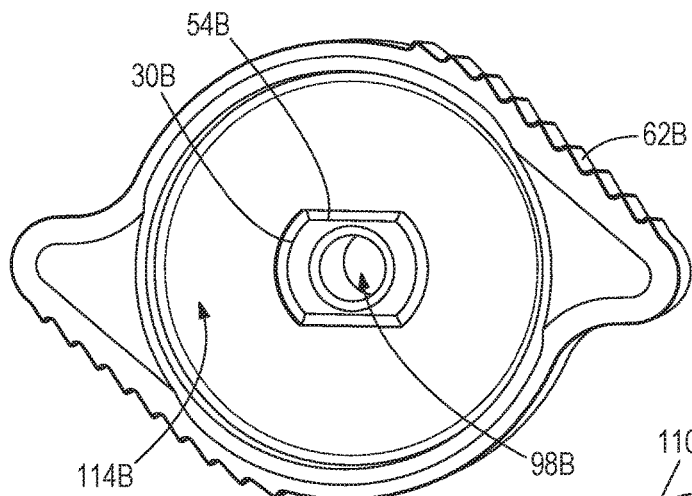
FIG. 37 is a perspective view of the knob and an end of a shaft of the cutter of FIG. 27.
Figure 38:
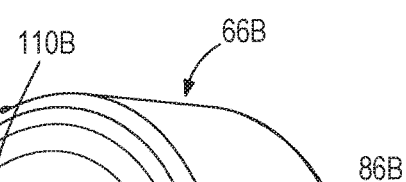
FIG. 38 is another perspective view of the knob shown in FIG. 35.
Figure 39:
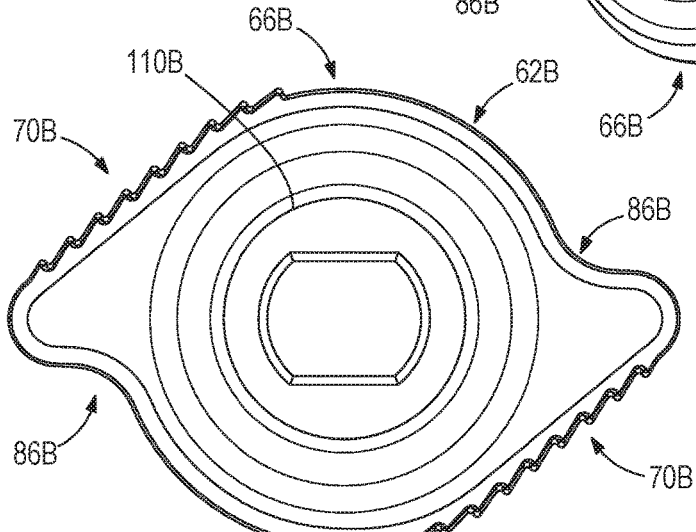
FIG. 39 is a view of the surface of the knob shown in FIG. 38.

Alternative constructions of the knob 62', 62" are illustrated in FIGS. 15A and 15C. In the alternative constructions, each knob 62', 62" has a lever portion 70', 70" engageable by the user to apply a force to the knob 62', 62". Also, in FIGS. 15A and 15C, each illustrated knob 62', 62" is symmetrical across one or more radial lines.

In FIG. 15A, the knob 62' has a generally triangular shape. The illustrated ridges 82' on surface point in one direction of rotation (e.g., the direction to move the housing portions 22, 26 (and the supported cutting wheel 14 and roller(s) 18, respectively) together to cut the work piece W).

In FIG. 15C, the knob 62" has lever portions 70" projecting generally radially from a circular portion. Concave portions 86" are provided at the junction between the lever portions 70" and the circular portion. A user's finger F can be "cupped" in a concavity to quickly rotate the knob 62" in given direction. The user can quickly open or close the cutter 10 with a single finger F revolving about the shaft axis 58 while being maintained in the concave portion 86".

The knob 62 may be connected to the shaft 30 in any suitable manner. In some constructions (see FIGS. 1-2, 7-8, 15A-15C, 16 and 20-21), a pin 94 (e.g., a rolled pin, as illustrated, a threaded pin, etc.) is connected between the knob 62 and the shaft 30. The pin 94 extends radially through the shaft 30 and the knob 62.

In some constructions, a fastener is connected to the end 54 to retain the knob 62 on the shaft 30. In one construction (see FIGS. 27, 29, 43 and 45), the end 54 defines (see FIGS. 37 and 52) a threaded bore 98, and a threaded member 102 threadedly engages the threaded bore 98. In another construction (see FIG. 55A), the end 54 is threaded, and a nut 104 threadedly engages the threaded end 54.

In other constructions (not shown), the knob 62 may be press fit to the end 54; however, replacing the press-fit with a threaded connection or pinned connection may reduce the frequency or likelihood of the knob 62 separating from the shaft 30 if the cutter 10 is dropped, impacted, strained, etc.

In some constructions (see FIGS. 20-23), a washer 106 (or a circlip (not shown)) is positioned on the shaft 30 between the knob 62 and the housing portion 26 and is engageable with the housing portion 26. In other constructions (see FIGS. 7-10, 32-34 and 48-50), the knob 62 has an annular surface engageable with the housing portion 26. In such constructions, the knob 62 may have a projection 110 toward the housing portion 26.

The cutter 10 may provide storage for a spare or replacement cutting wheel 14'. In such constructions (see, e.g., FIGS. 27, 29, 43 and 45), the knob 62 defines (see FIGS. 35-37 and 51-52 and a receptacle 114 receiving the spare cutting wheel 14', and a fastener (e.g., the threaded member 102) retains the spare cutting wheel 14' in the receptacle 114.

As shown in FIGS. 3-4, 6, 17, 19, 28, 30, 41-42, 44 and 46, structure of the housing portions 22, 26 (e.g., one or more inter-engaging projections and recesses) limits relative pivoting movement of the housing portions 22, 26. In the illustrated construction, rail(s) 118 provided on one housing portion (e.g., the housing portion 26) engage in track(s) 122 defined by the other housing portion (e.g., the housing portion 22). The rail(s) 118 and the track(s) 122 extend parallel to the shaft axis 58 to guide relative movement of the housing portions 22, 26.

Figure 40:
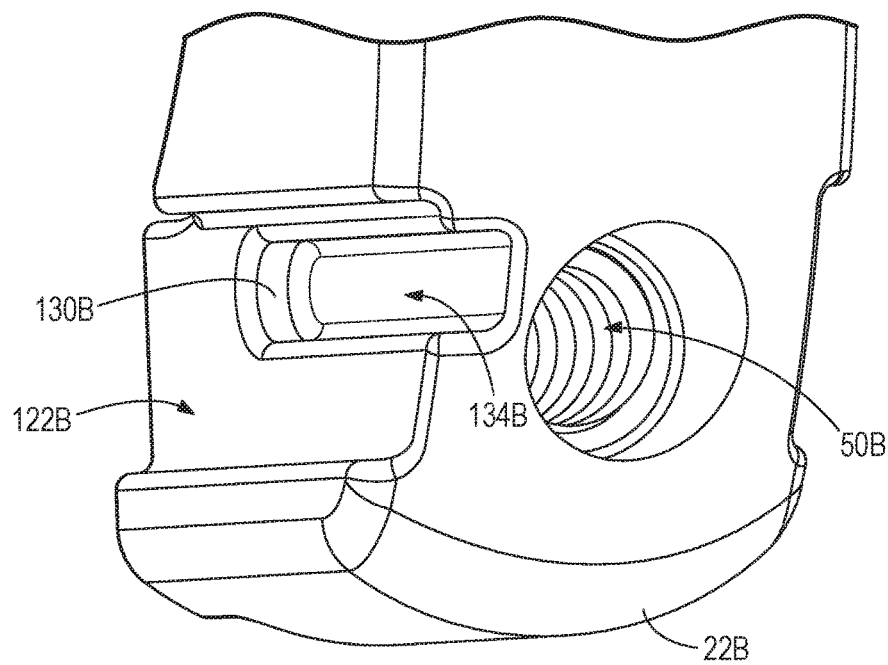
FIG. 40 is a perspective view of a portion of a cutting wheel housing portion of the cutter of FIG. 27.
Figure 41:
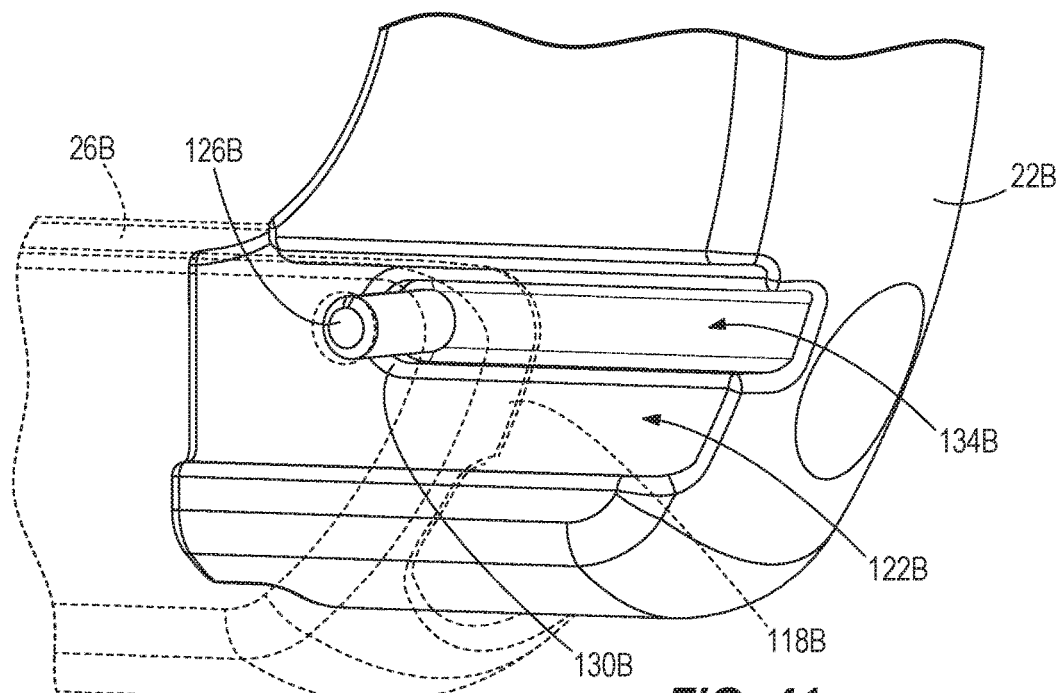
FIG. 41 is a perspective view of the portion of the cutting wheel housing portion, a portion of the roller housing portion, and a pin of the cutter of FIG. 27.

In the illustrated construction (see FIGS. 4, 6, 17, 19, 28, 30, 41-42, 44 and 46), structure is provided to limit axial movement of the housing portions 22, 26 beyond a defined range or relative position (e.g., a maximum opening size of the recess 38). In the illustrated construction, the structure includes a pin 126 (a rolled pin, as illustrated, a threaded pin, etc.) mounted on one housing portion (e.g., the housing portion 26) and engageable with (see FIGS. 40-42) a stop surface 130 provided on the other housing portion (e.g., the housing portion 22).

Figure 42:
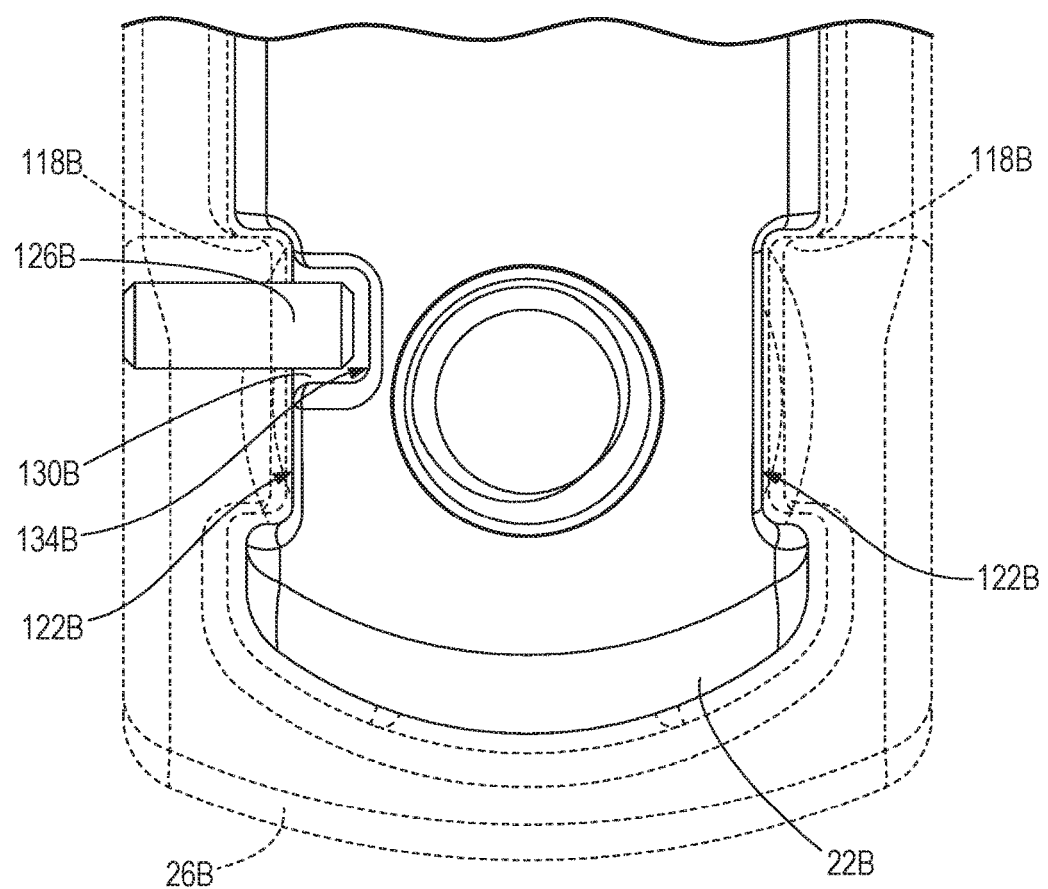
FIG. 42 is a front view of the portion of the cutting wheel housing portion, the portion of the roller housing portion, and the pin shown in FIG. 41.
Figure 43:
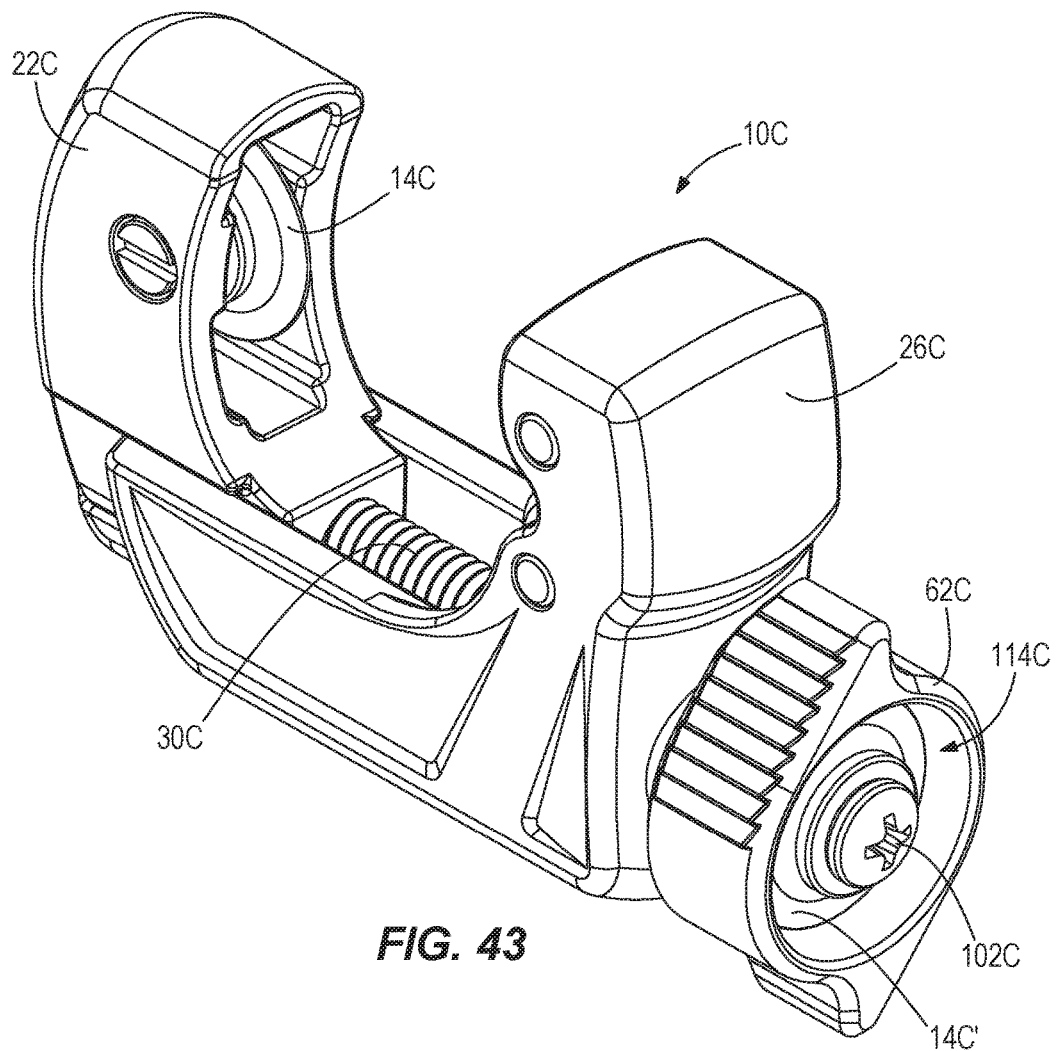
FIG. 43 is a perspective view of yet another alternative construction of a cutter, such as a tubing cutter.
Figure 44:
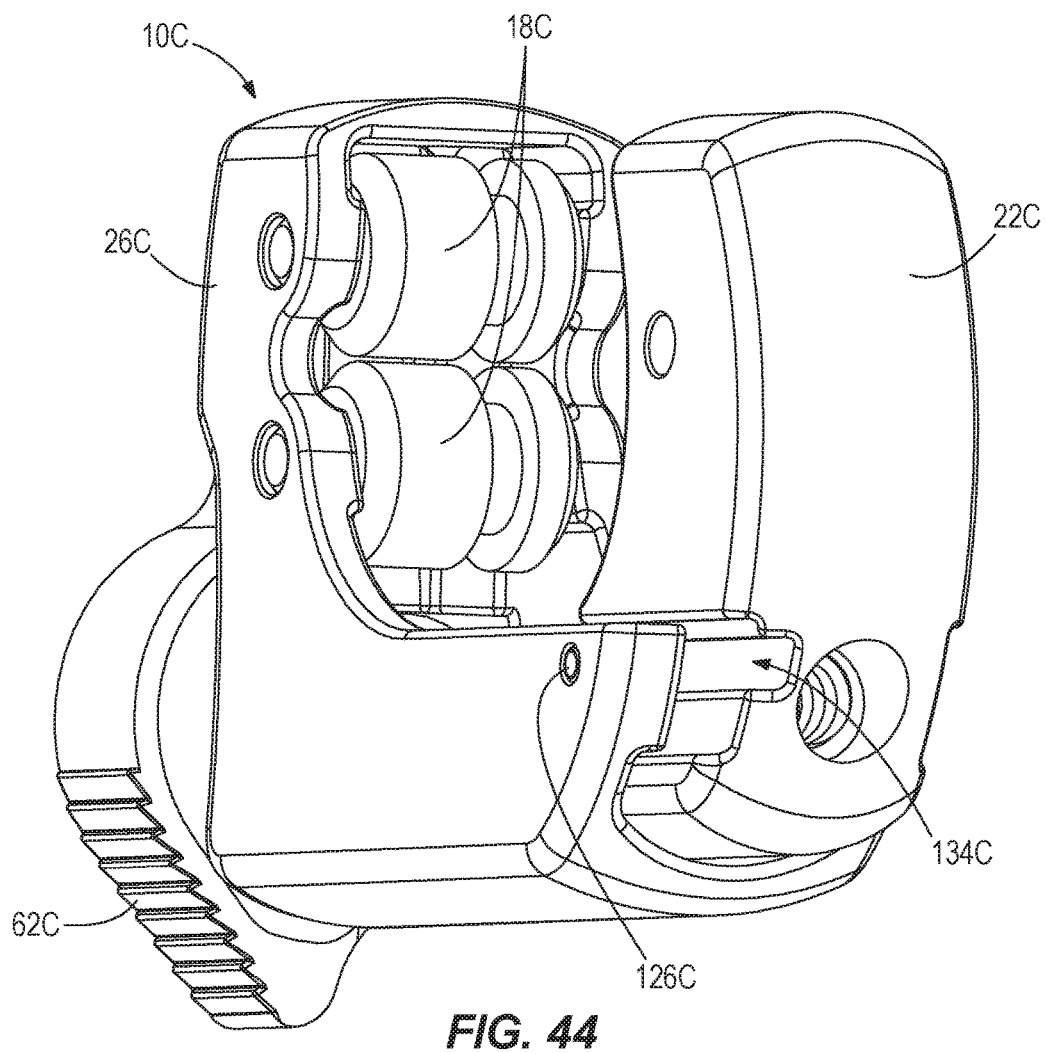
FIG. 44 is another perspective view of the cutter of FIG. 43.
Figure 46:
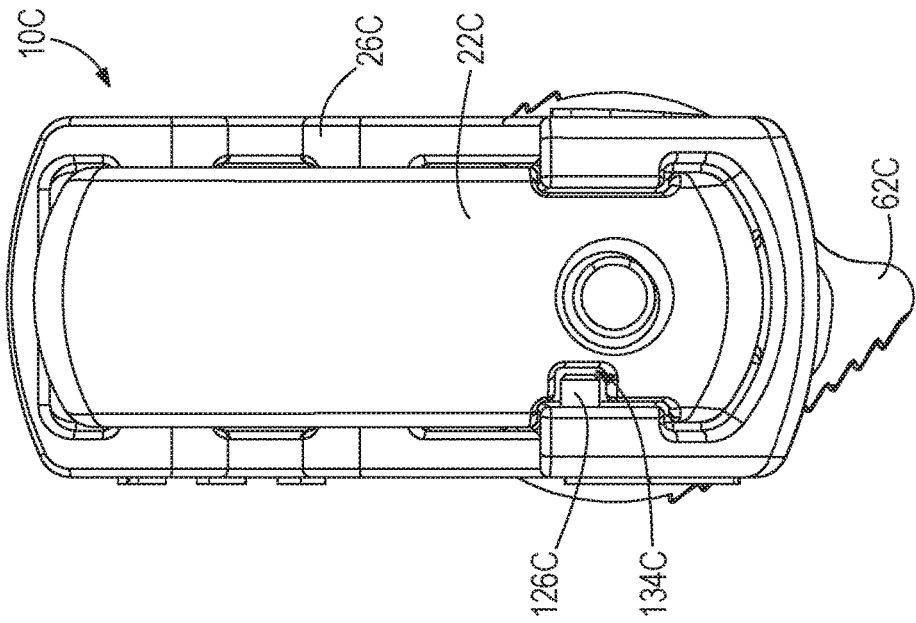
FIG. 46 is a front view of the cutter of FIG. 43.
Figure 45:
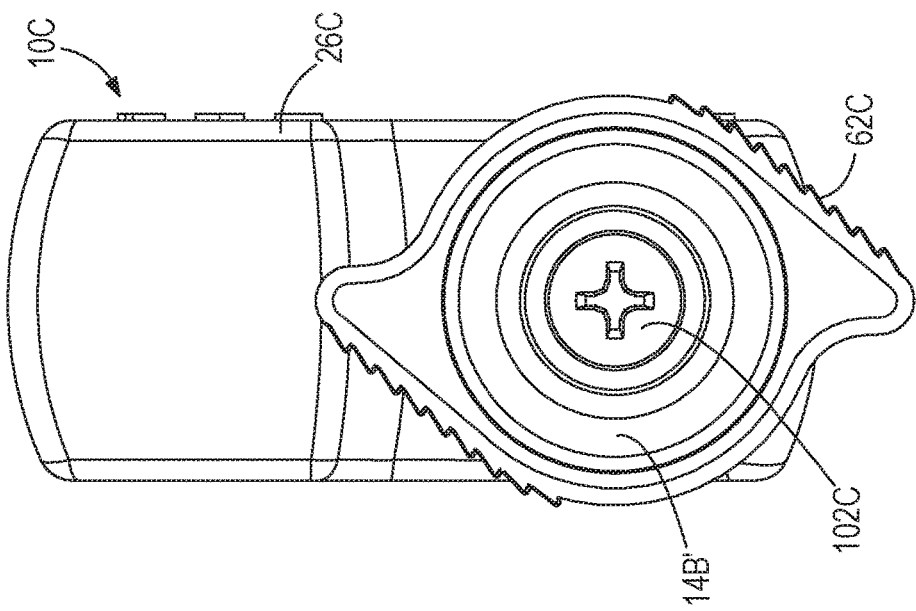
FIG. 45 is a rear view of the cutter of FIG. 43.
Figure 47:
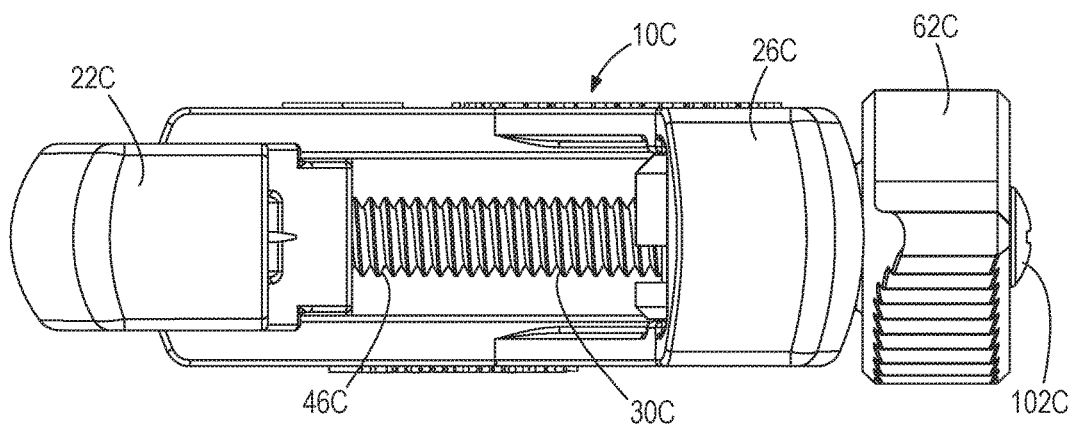
FIG. 47 is a top view of the cutter of FIG. 43.
Figure 48:
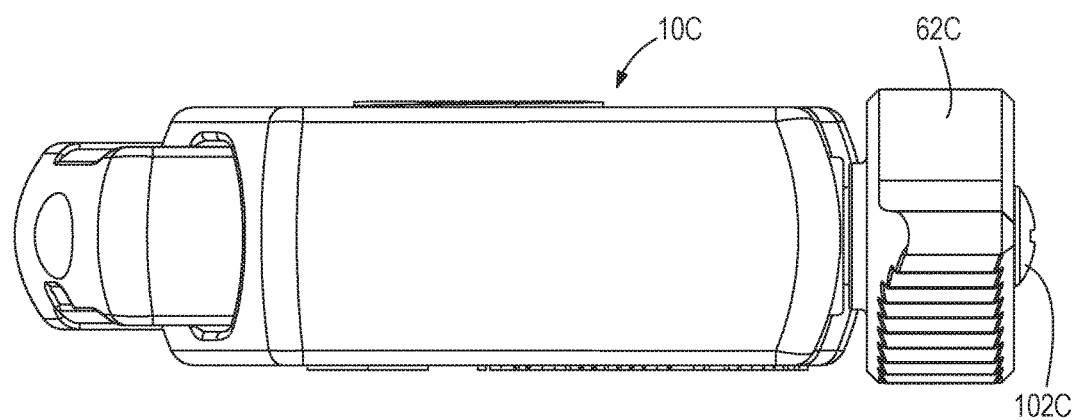
FIG. 48 is a bottom view of the cutter of FIG. 43.
Figure 49:
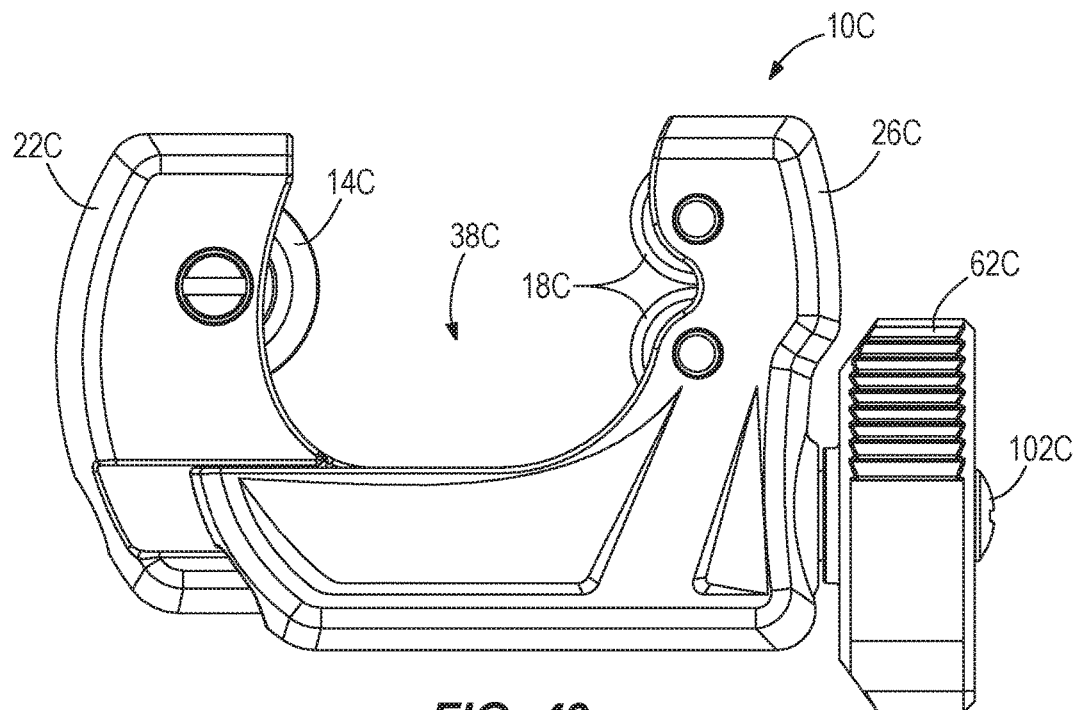
FIG. 49 is a side view of the cutter of FIG. 43.
Figure 50:
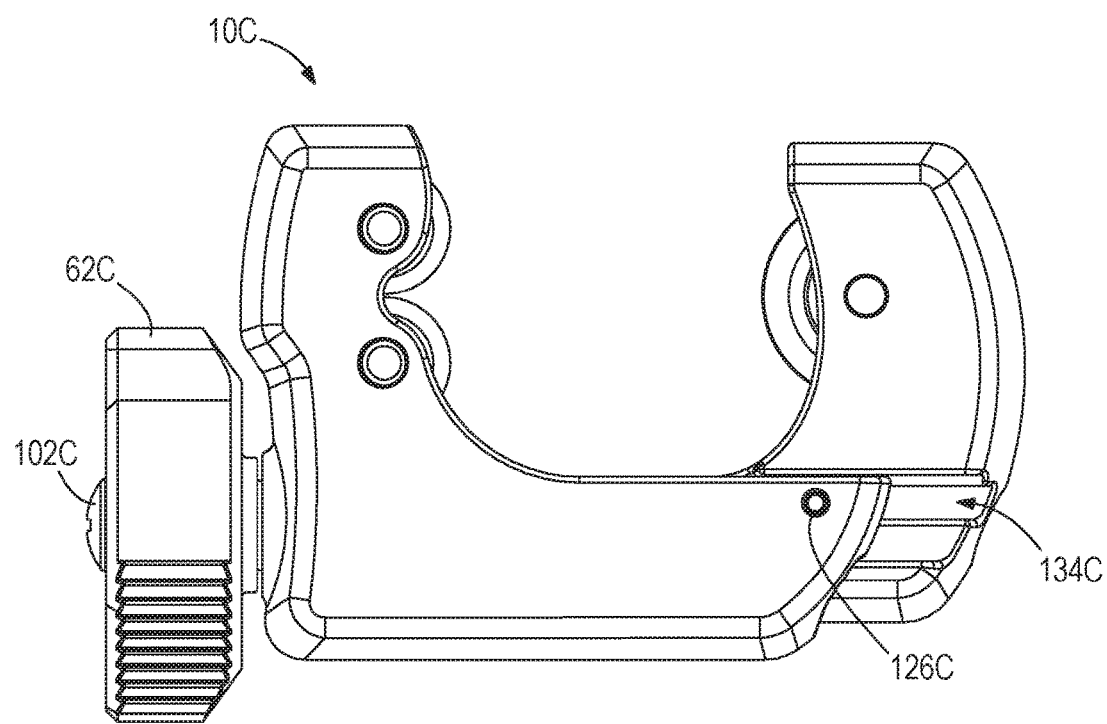
FIG. 50 is another side view of the cutter of FIG. 43.
Figure 51:
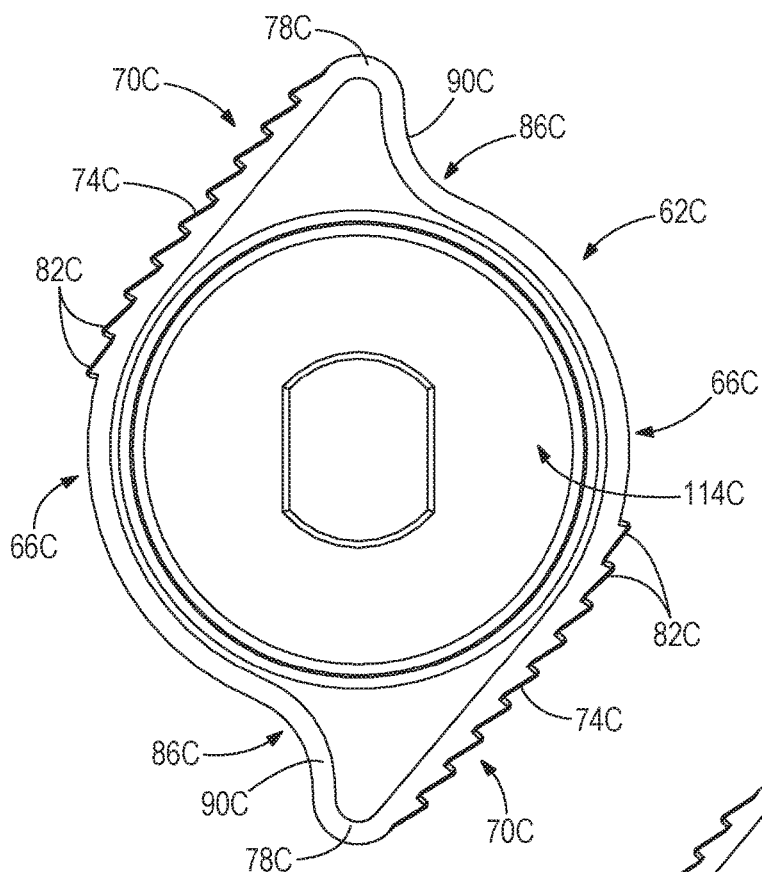
FIG. 51 is a view of a knob of the cutter of FIG. 43.
Figure 52:
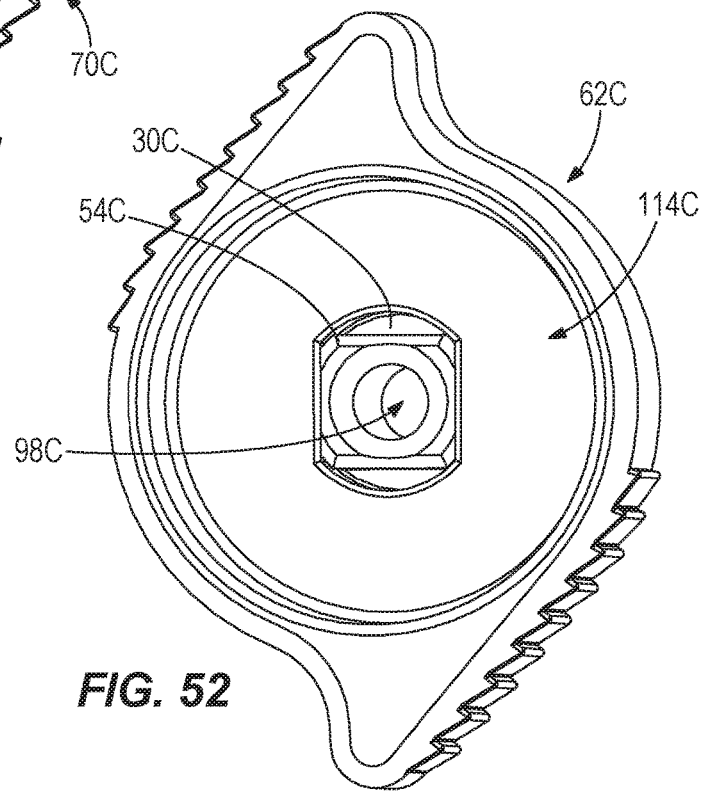
FIG. 52 is a perspective view of the knob and an end of a shaft of the cutter of FIG. 43.
Figure 53:
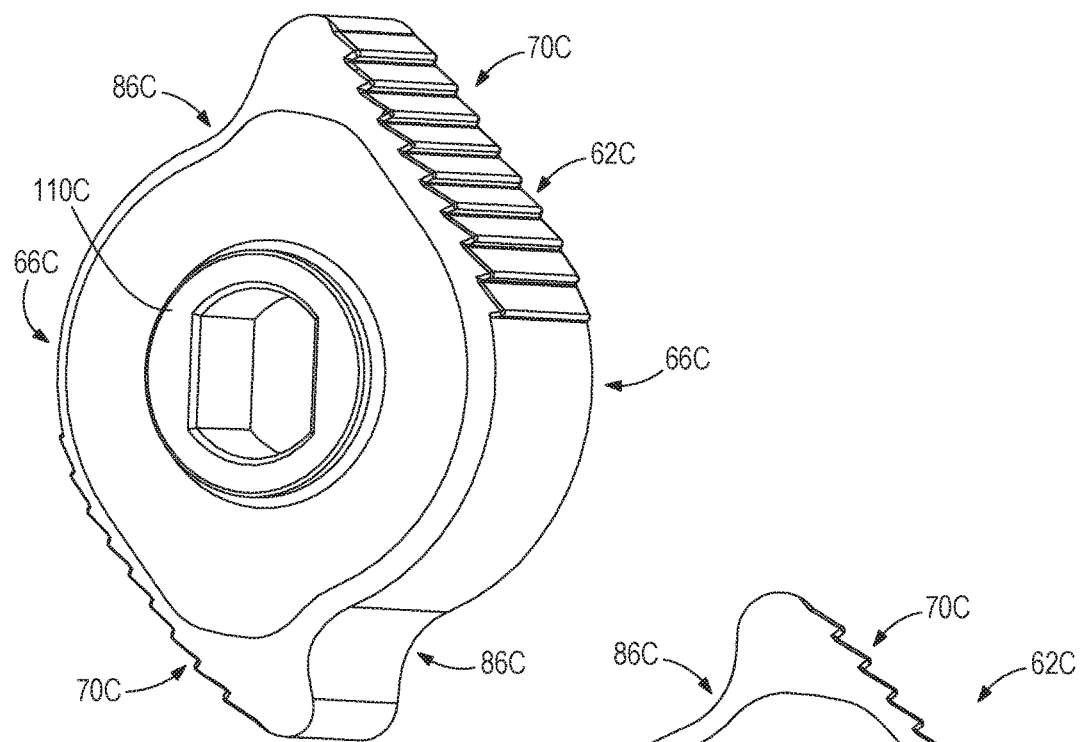
FIG. 53 is another perspective view of the knob shown in FIG. 51.
Figure 54:
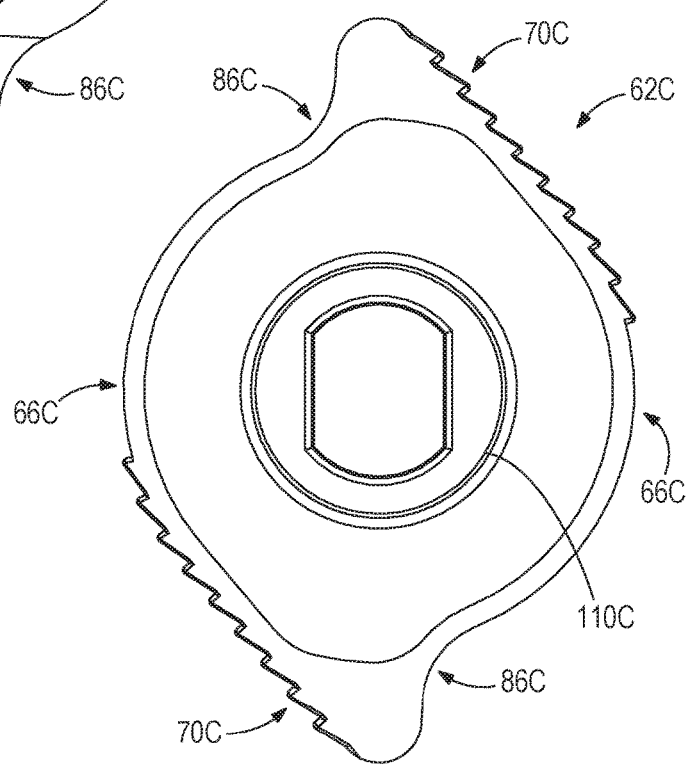
FIG. 54 is a view of the surface of the knob shown in FIG. 53.

In the illustrated construction (see FIGS. 40-42), the stop surface 130 is provided at the end of a slot 134 defined in the housing portion 22. The illustrated slot 134 is provided in one of the tracks 122 and, with the track 122, extends parallel to the shaft axis 58. The pin 126 is supported on the associated rail 118 and extends transverse to the shaft axis 58 into the slot 134. As shown in FIG. 42, the slot 134 has a transverse width to allow unimpeded movement of the pin 126 along the slot 134 during relative movement of the housing portions 22, 26. When the housing portions 22, 26 reach a relative position (e.g., a maximum opening size of the recess 38), the pin 126 engages the stop surface 130 to prevent further movement in this direction. The pin 126 and the stop surface 130 ensure that the housing portions 22, 26 do not inadvertently separate during opening of the cutter 10.

To cut a work piece, the housing portions 22, 26 are moved by rotation of the knob 62 so that the cutting wheel 14 and the roller(s) 18 engage the work piece. Further rotation of the knob 62 increases the force applied by the cutting wheel 14 to the work piece. The lever portions 70 facilitate application of force when cutting. Rotation of the cutter 10 about the work piece causes the cutting wheel 14 to cut the work piece. Until the work piece is cut, the knob 62 is rotated to increase force applied by the cutting wheel 14, and the cutter 10 is rotated about the work piece. When cutting is completed, the concavities facilitate opening the recess 38. The pin 126 and stop surface 130 prevent inadvertent separation of the housing portions 22, 26 as the cutter 10 is opened.

Figure 55A:
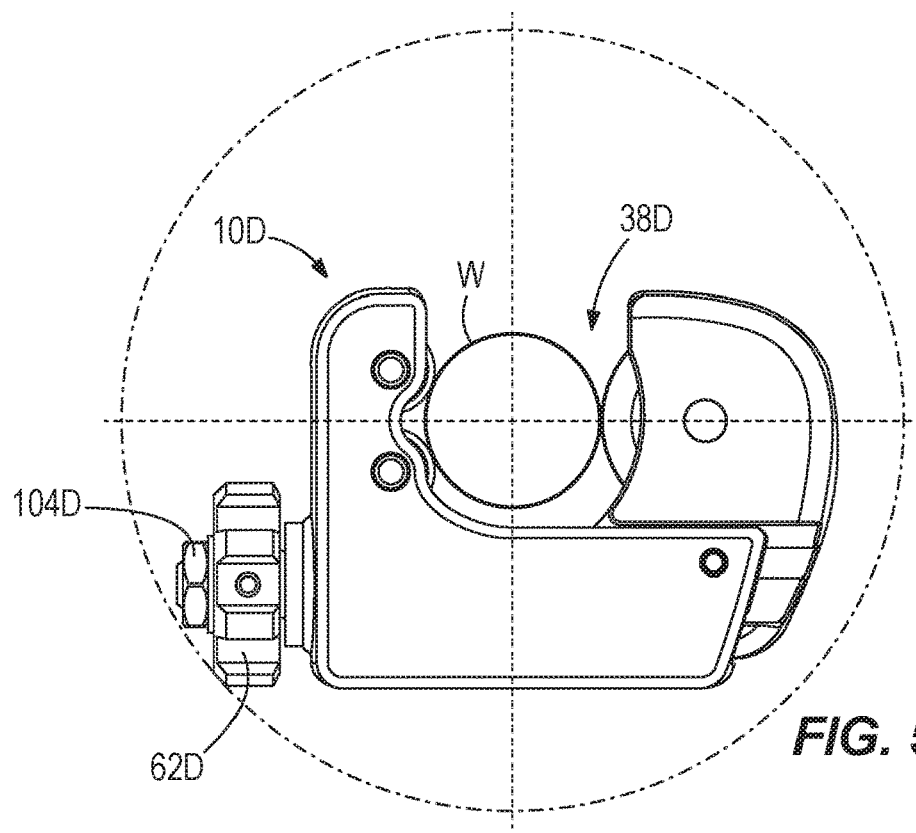
FIGS. 55A-55B illustrate a swing radius of a cutter.
Figure 55B:
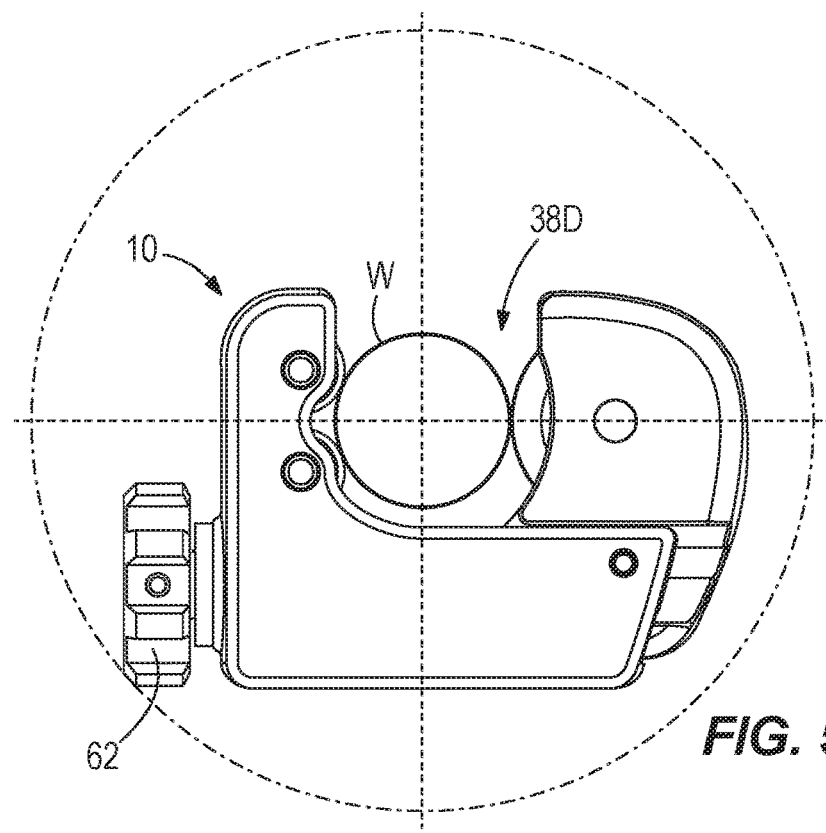

FIG. 55A illustrates a swing radius of the cutter 10 when the fastener (e.g., the nut 104) is used to connect the shaft 30 and the knob 62. FIG. 55B illustrates a swing radius of the cutter 10 when the pin 94 is used.

In some constructions (see FIGS. 1-4, 6-7, 13-14, 15A-15C, 16-17, 19-20 and 25-26), the housing portion 22 defines a slot 138 to facilitate replacement, removal, installation, adjustment, etc. of the cutting wheel 14. However, the slot 138 is sufficiently narrow to inhibit a user's finger or other structure from engaging the cutting wheel 14 therethrough. The cutters 10B, 100 are larger than the cutters 10, 10A, and a slot 138 is not provided in those cutters 10B, 10C.

The housing portion 22 has opposite side walls 142, 146, each covering a substantial portion of the circumference of the cutting wheel 14 (e.g., at least about 270°). Each side wall 142, 146 has a support portion 150 defining an opening 154 for receiving the axle 158 for the cutting wheel 14. As shown in FIGS. 2, 7, 14, 20 and 26, the space between the support portions 150 closely accommodates the cutting wheel 14 when supported. The support portions 150 serve to maintain alignment of the cutting wheel 14 in a plane transverse to the shaft axis 58.

Figure 7:
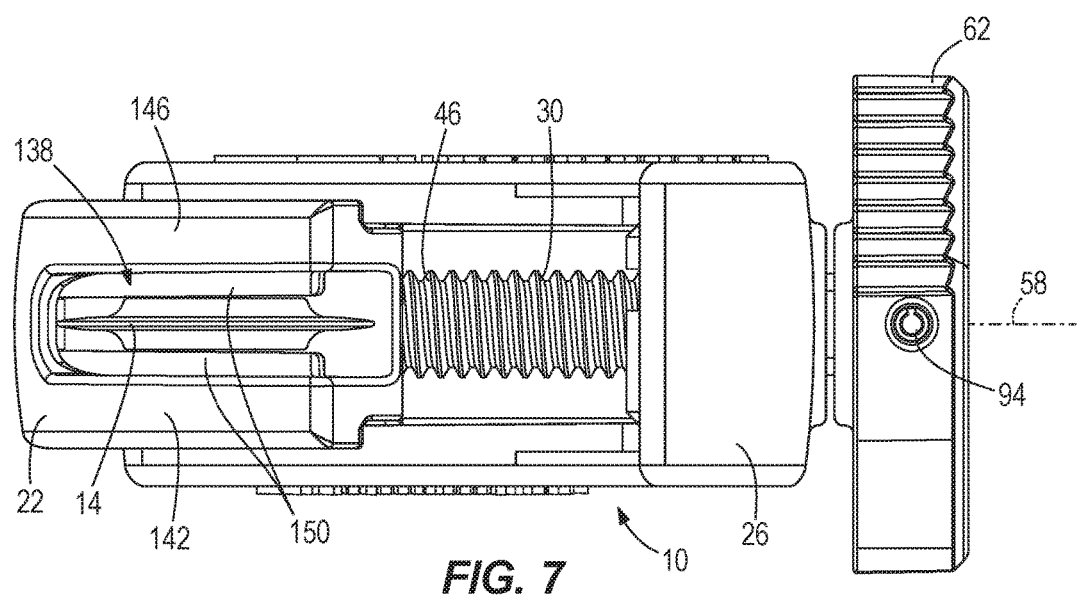
FIG. 7 is a top view of the cutter of FIG. 1.
Figure 8:
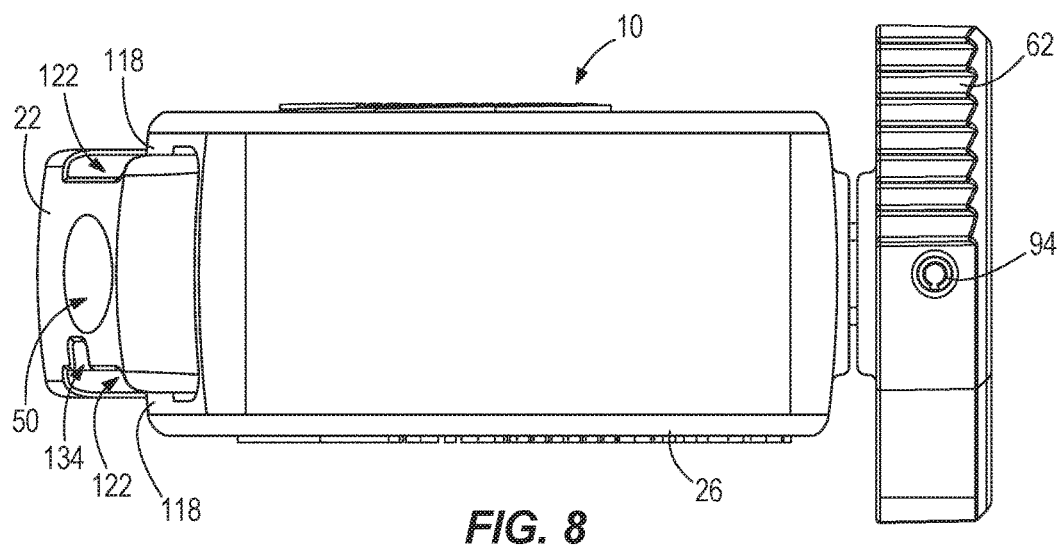
FIG. 8 is a bottom view of the cutter of FIG. 1.
Figure 9:
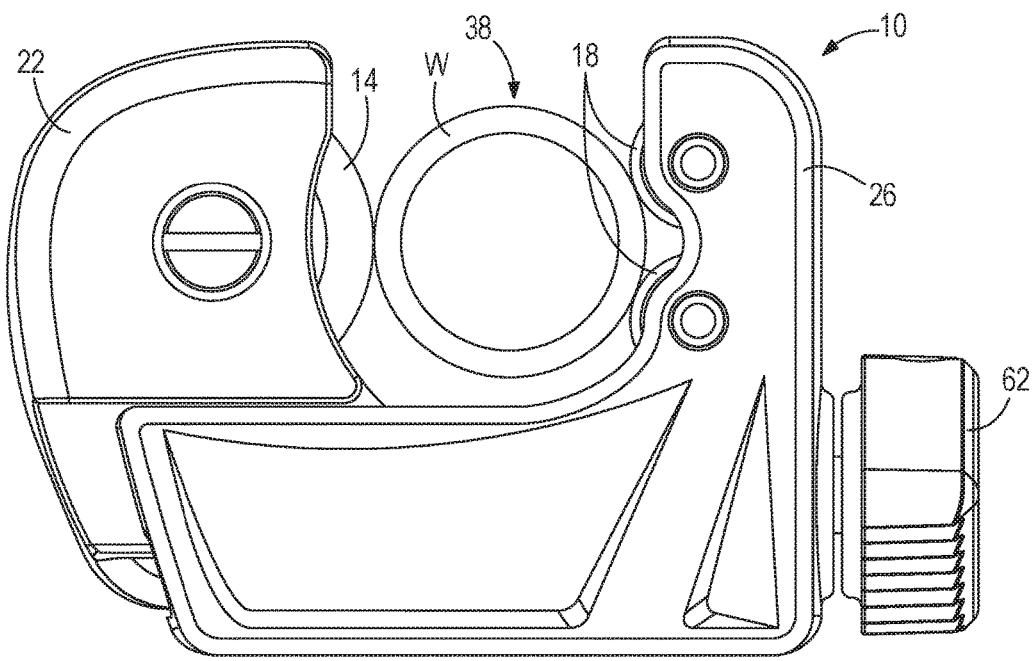
FIG. 9 is a side view of the cutter of FIG. 1.
Figure 10:
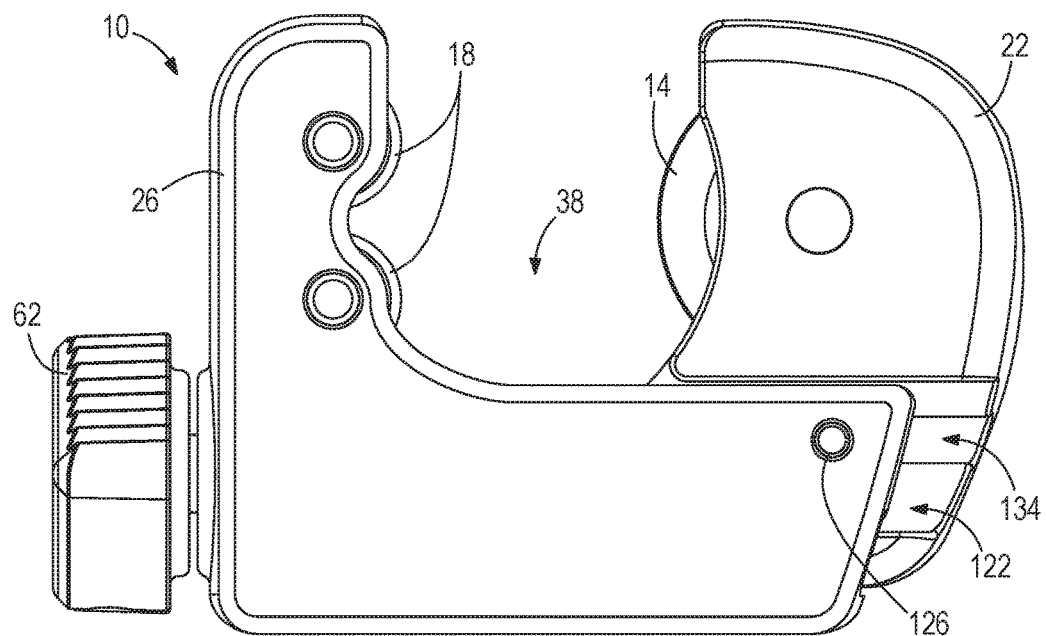
FIG. 10 is another side view of the cutter of FIG. 1.
Figure 11:
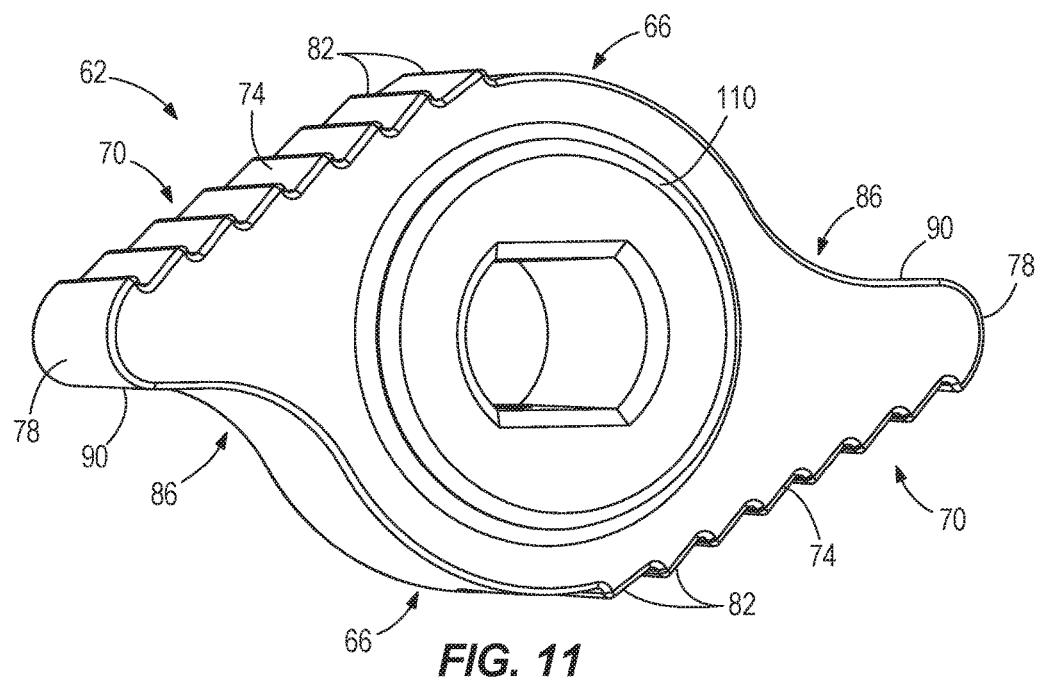
FIG. 11 is a perspective view of a knob of the cutter of FIG. 1.
Figure 12:
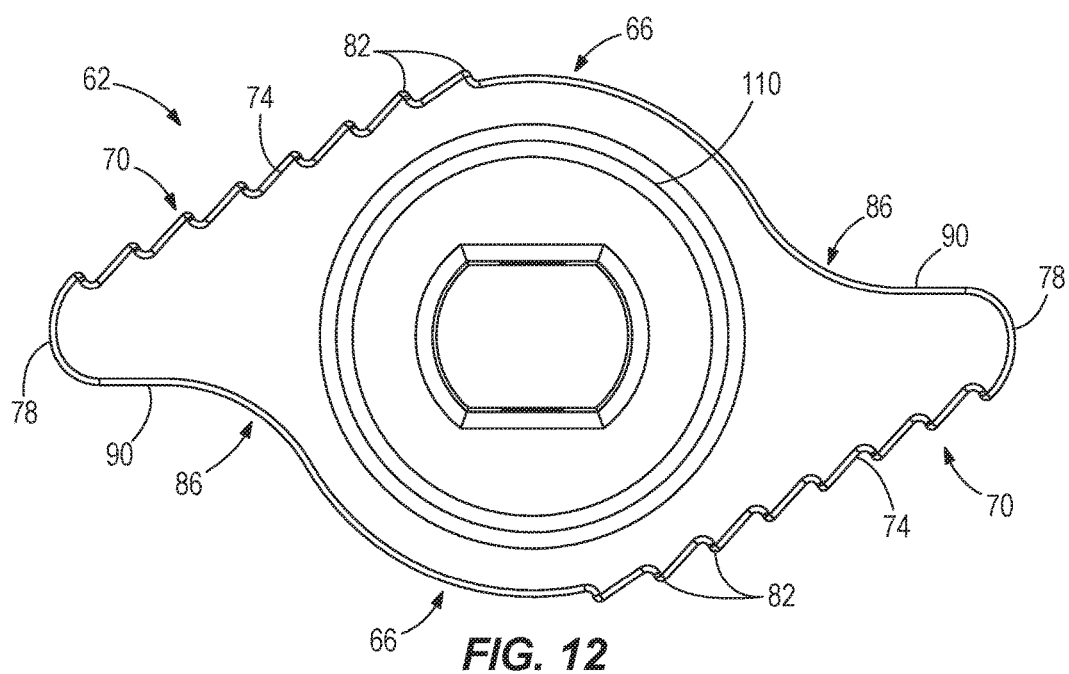
FIG. 12 is a view of the surface of the knob shown in FIG. 11.
Figure 14:
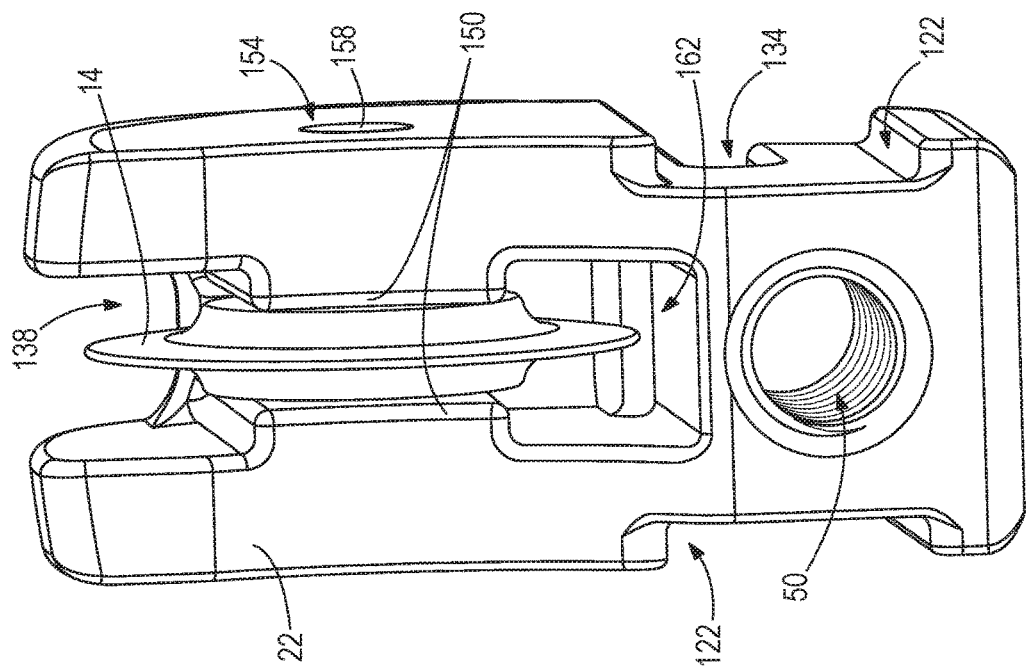
FIG. 14 is a perspective view of the cutting wheel housing portion and the cutting wheel of the cutter of FIG. 1.
Figure 13:
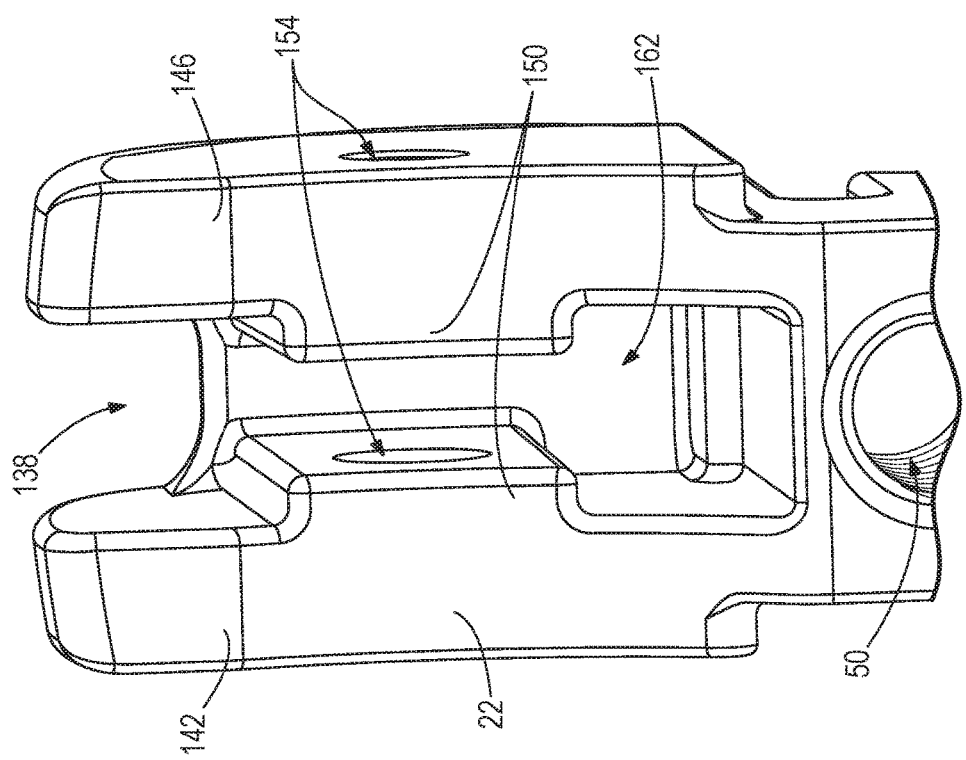
FIG. 13 is a perspective view of a portion of a cutting wheel housing portion of the cutter of FIG. 1.

In some constructions (see FIGS. 2, 7 and 14), the slot 138 has a width greater than the space between the support portions 150 (e.g., at least about 50% greater and up to 100% greater). As shown in FIGS. 7 and 14, the slot 138 has about the same width as the shaft 30. The slot is oriented to receive the cutting wheel 14 in a direction transverse to the cutting wheel axis (defined by the axle 158) and transverse to the shaft axis 58. As shown in FIGS. 13-14, a cavity 162 of approximately the same width as the slot 138 is defined in the housing portion 22 between the support portions 150 and the threaded bore 50. In other constructions (see FIGS. 20 and 25-26), the slot 138 has the same width as the space between the support portions 150.

To remove a cutting wheel 14, the axle 158 is removed from at least one opening 154 and from the cutting wheel 14. The cutting wheel 14 may be removed through the slot 138 and/or in the direction of the recess 38. To install a cutting wheel (such as the replacement cutting wheel 14'), the cutting wheel 14, 14' is inserted through the slot 138 and aligned with the openings 154 in the support portions 150. The axle 158 is inserted through the cutting wheel 14, 14' and the opening(s) 154.

Figure 56:
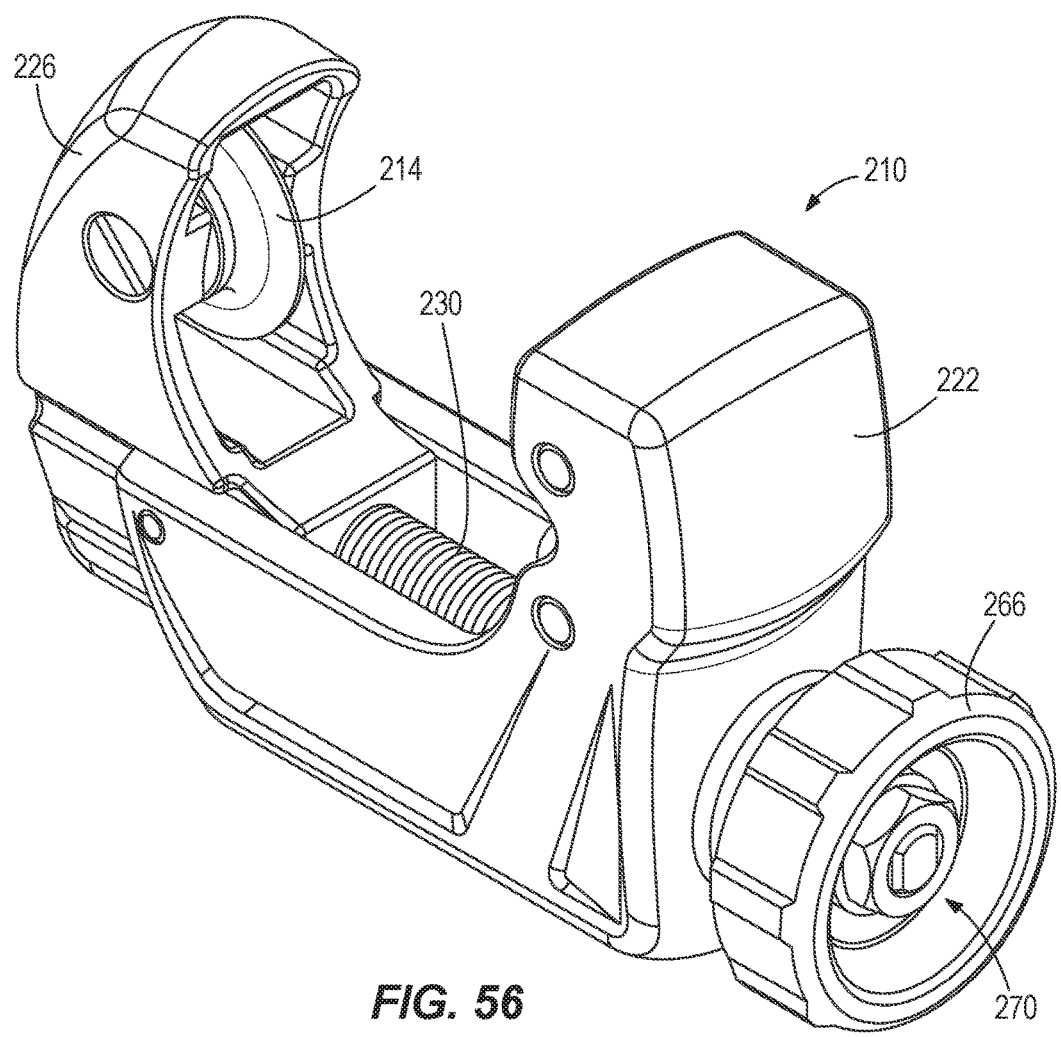
FIG. 56 is a perspective view of a further alternative construction of a cutter, such as a tubing cutter.
Figure 57:
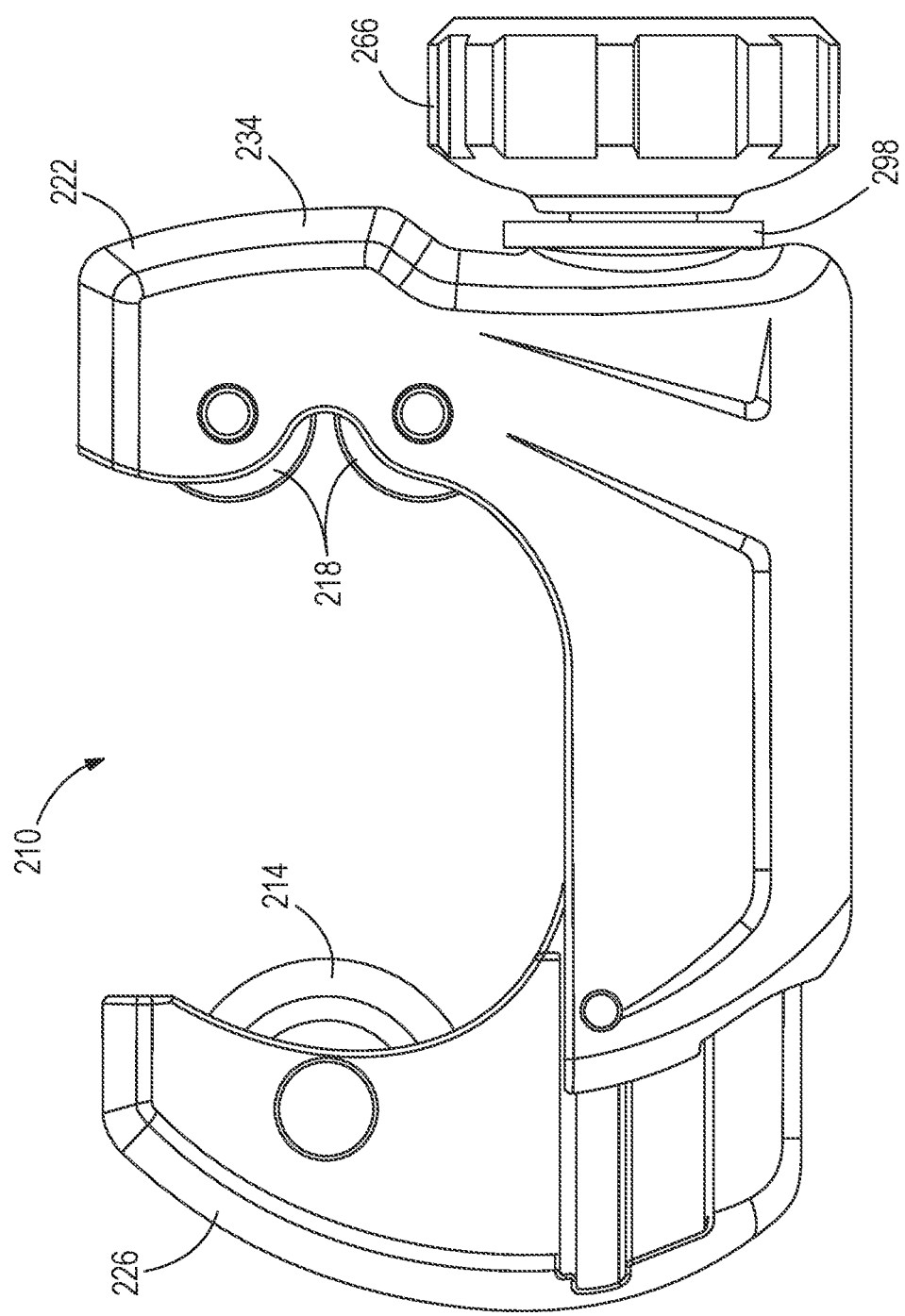
FIG. 57 is a side view of the cutter of FIG. 56.
Figure 58:
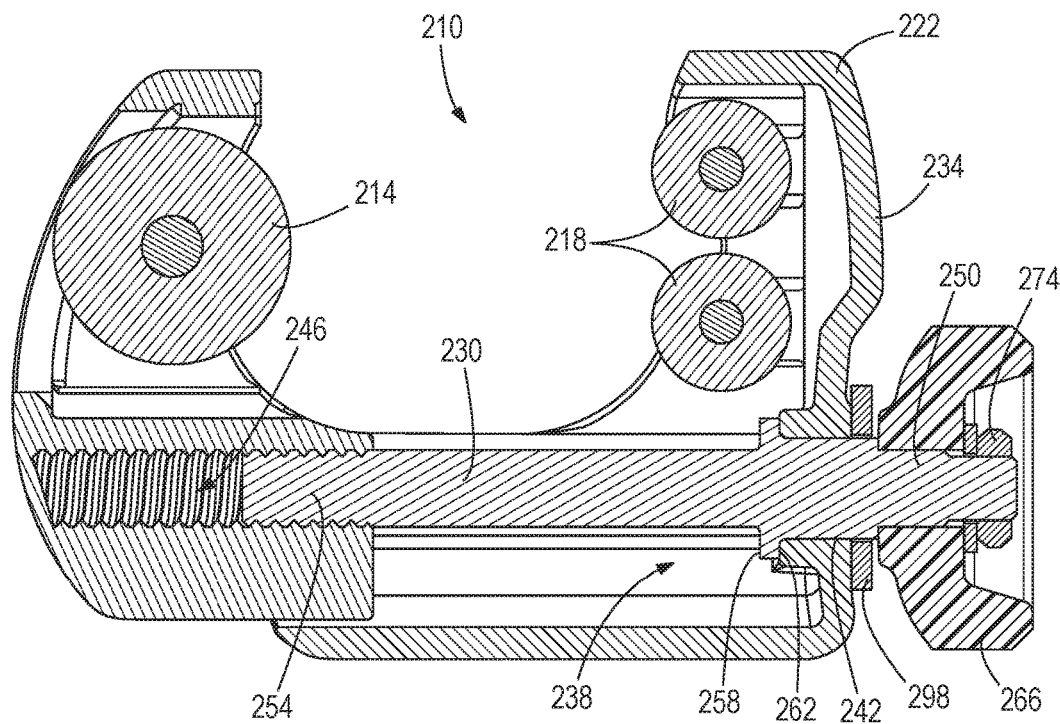
FIG. 58 is a cross-sectional side view of the cutter of FIG. 56.
Figure 59:
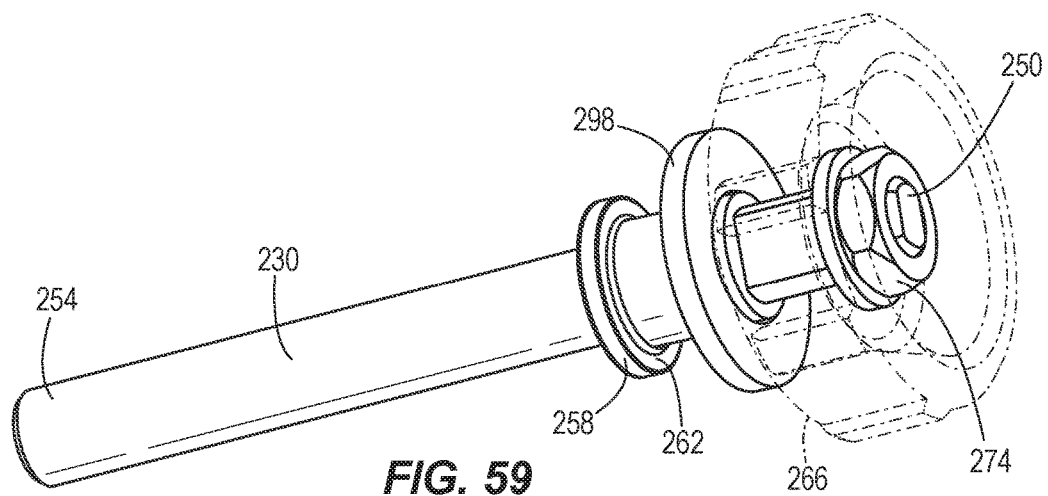
FIG. 59 is a perspective view of a shaft assembly and knob of the cutter of FIG. 56.
Figure 60:
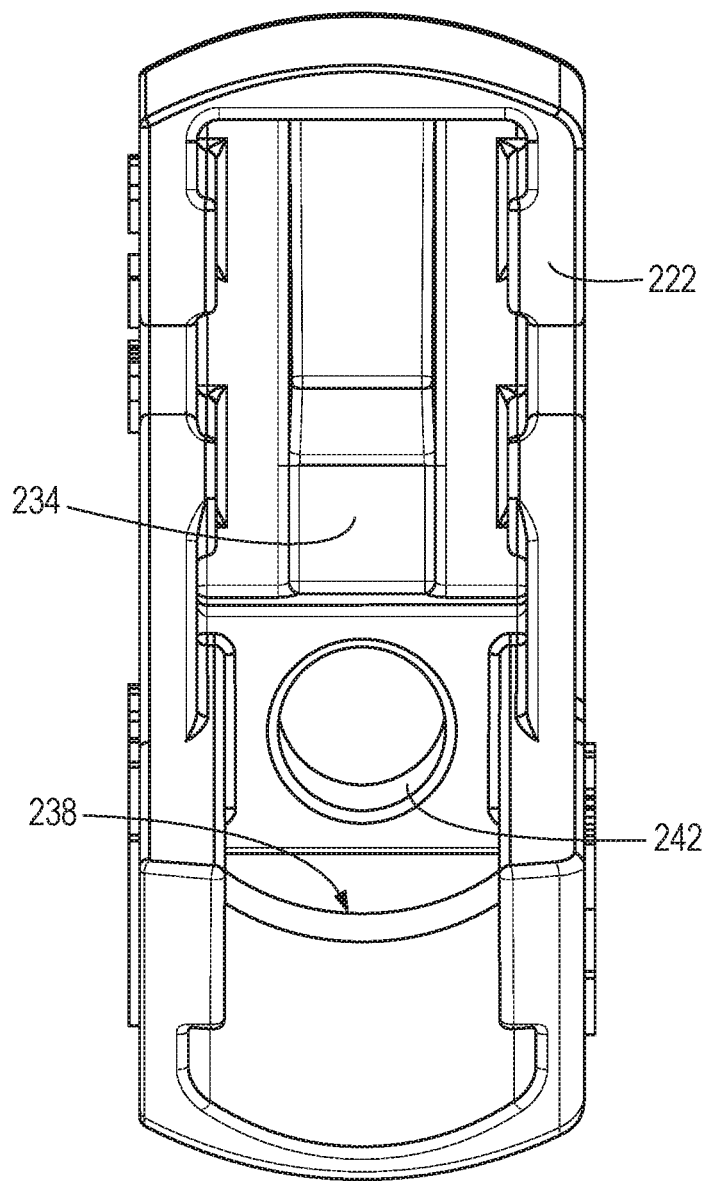
FIG. 60 is an end view of a housing portion of the cutter of FIG. 56.
Figure 61:
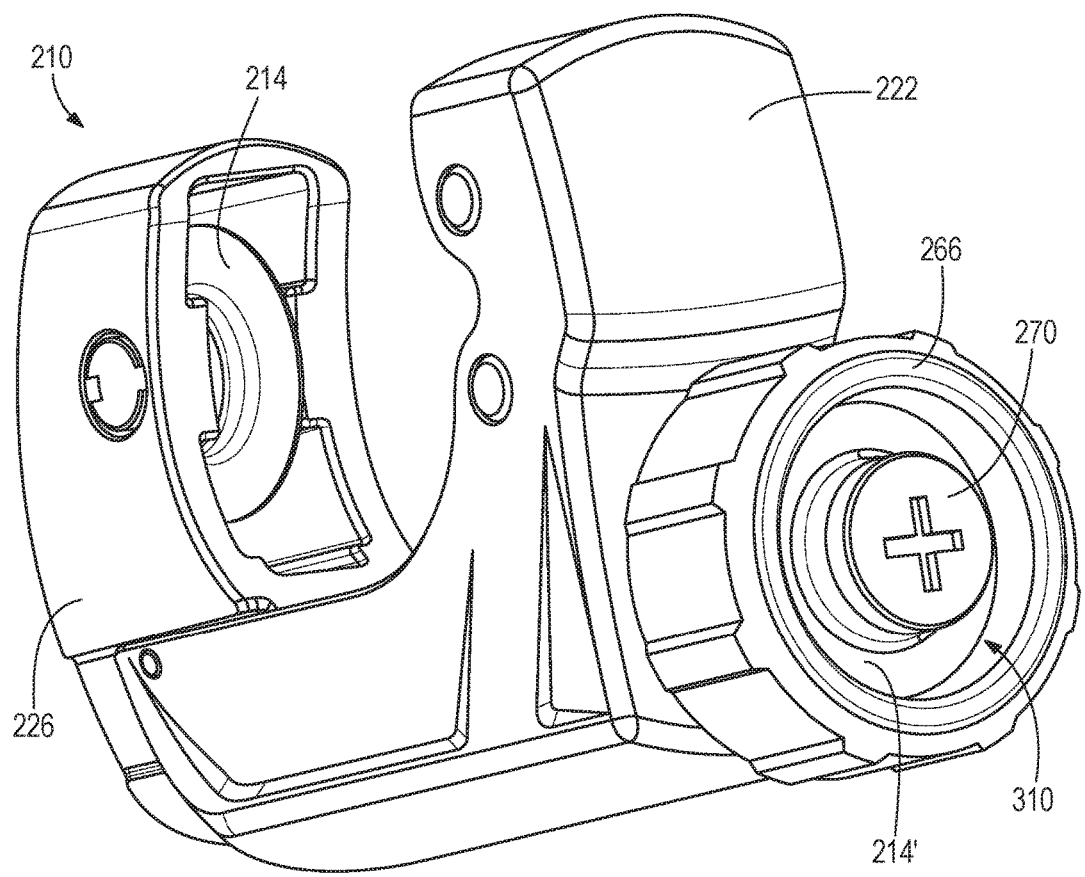
FIG. 61 is a perspective view of another alternative construction of a cutter.
Figure 62A:
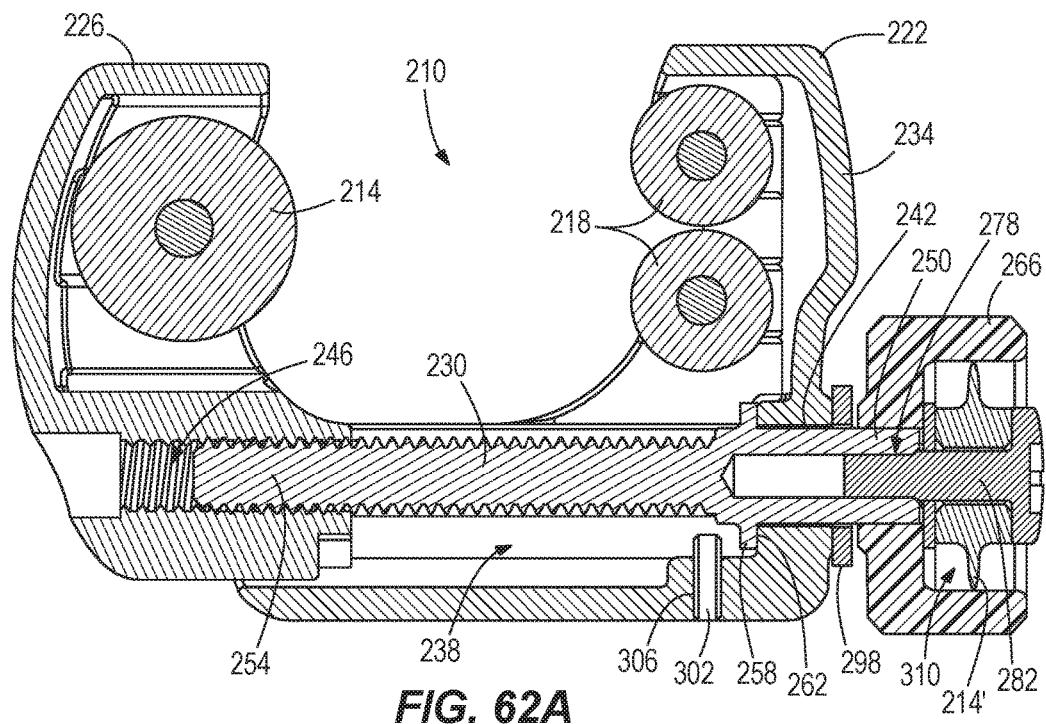
FIG. 62A is a cross-sectional side view of the cutter of FIG. 61.
Figure 62B:
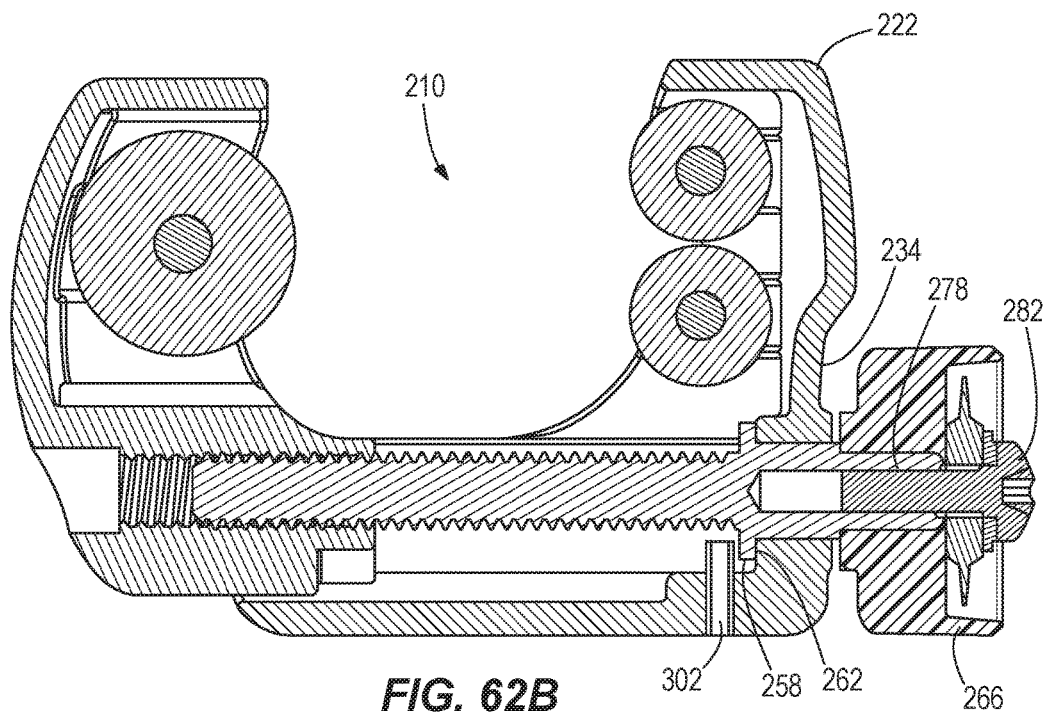
FIG. 62B is a cross-sectional side view of the cutter of FIG. 61.
Figure 63:
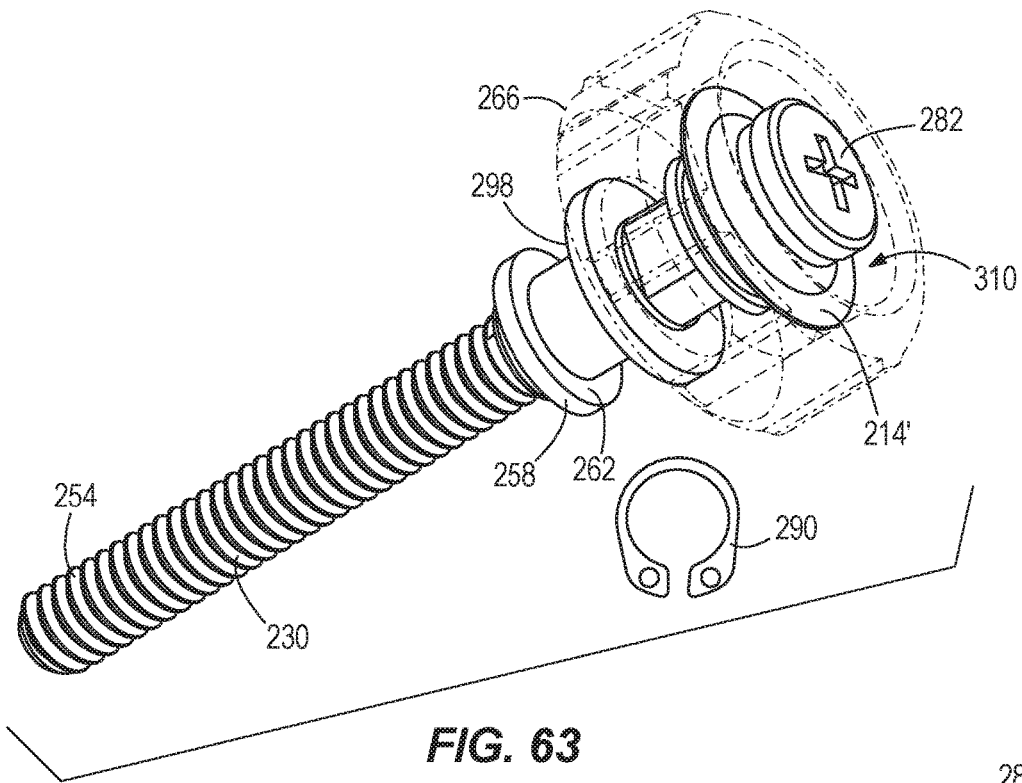
FIG. 63 is a perspective view of a shaft assembly, knob and blade storage of the cutter of FIG. 61.
Figure 64:
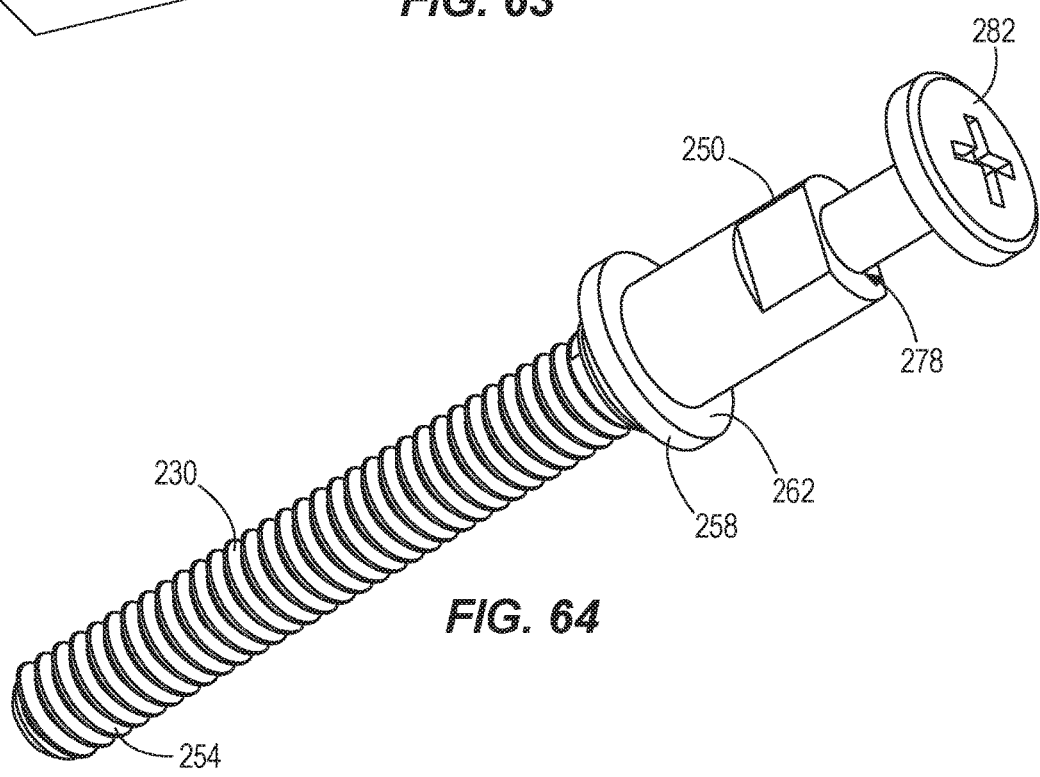
FIG. 64 is a perspective view of the shaft and threaded member of the cutter of FIG. 61.
Figure 65:
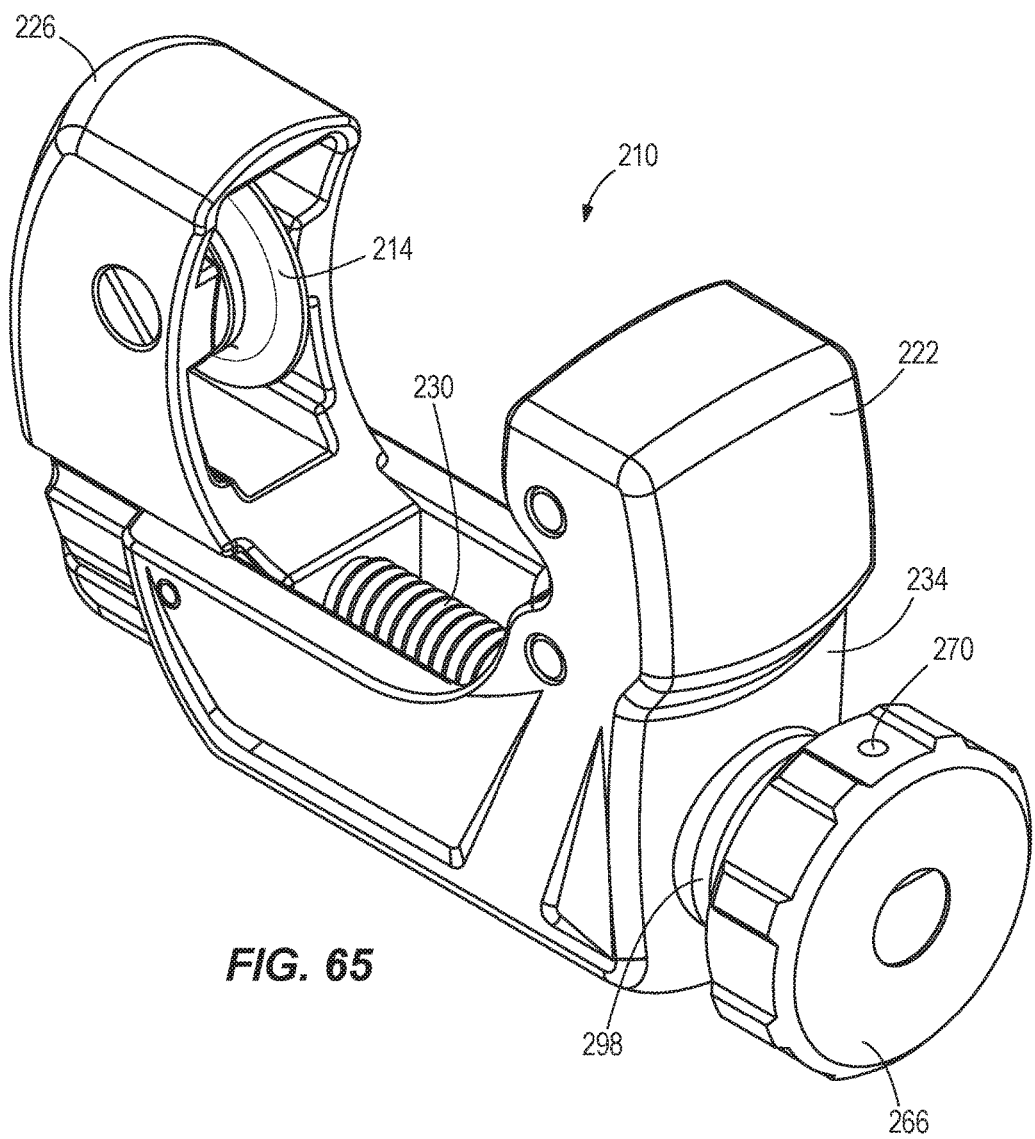
FIG. 65 is a perspective view of yet another alternative construction of a cutter.
Figure 66A:
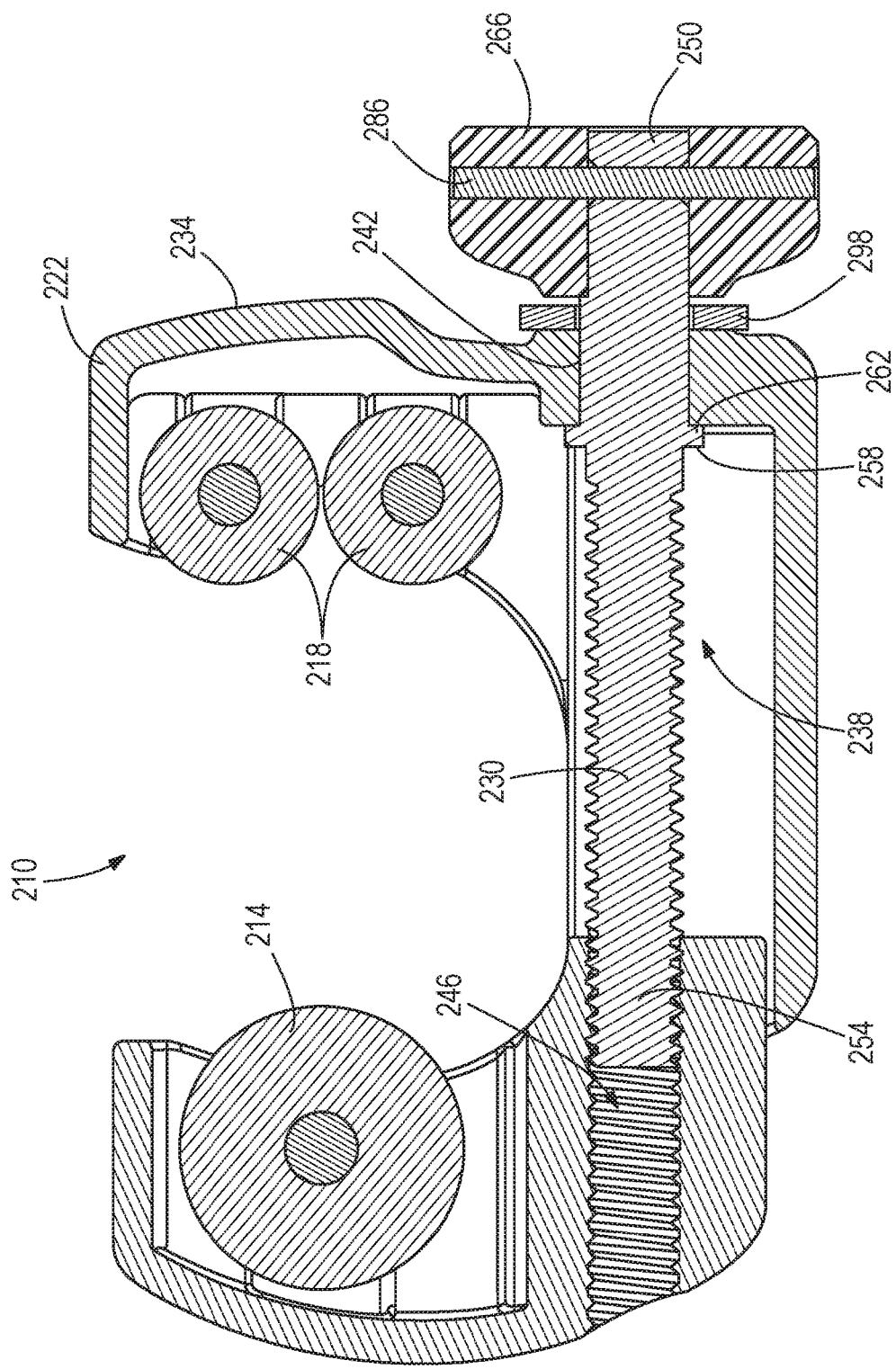
FIG. 66A is a cross-sectional side view of the cutter of FIG. 65.
Figure 66B:
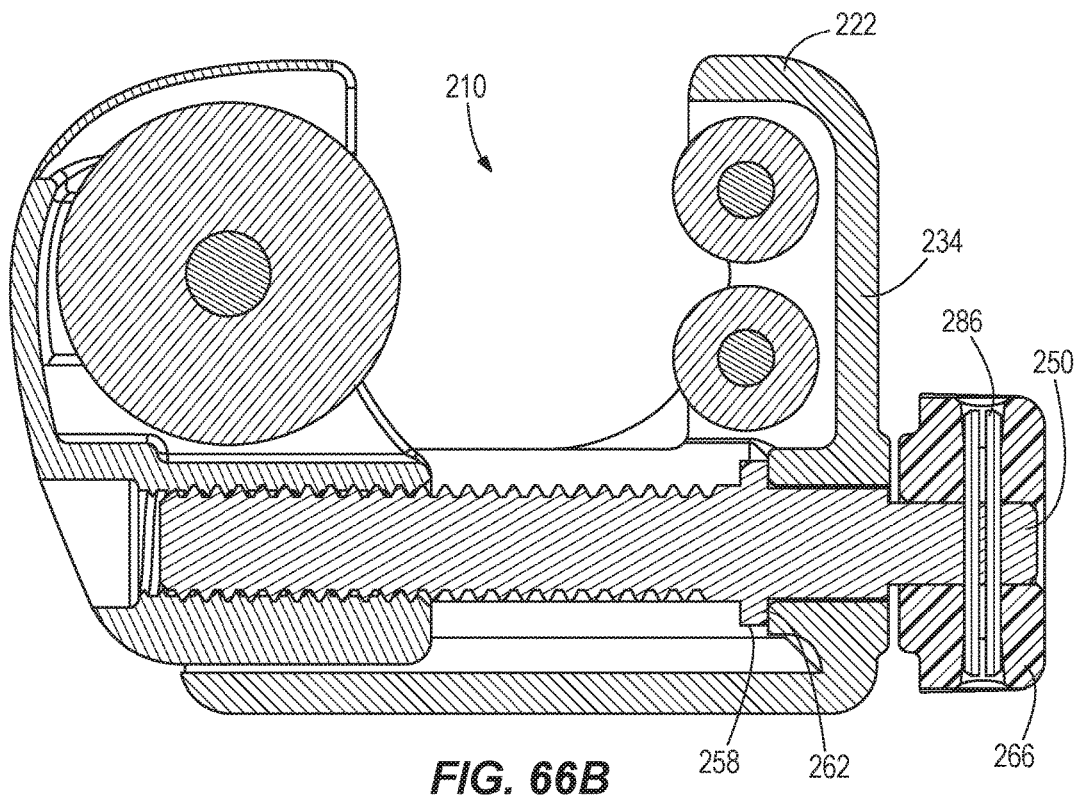
FIG. 66B is a cross-sectional side view of the cutter of FIG. 65.
Figure 67:
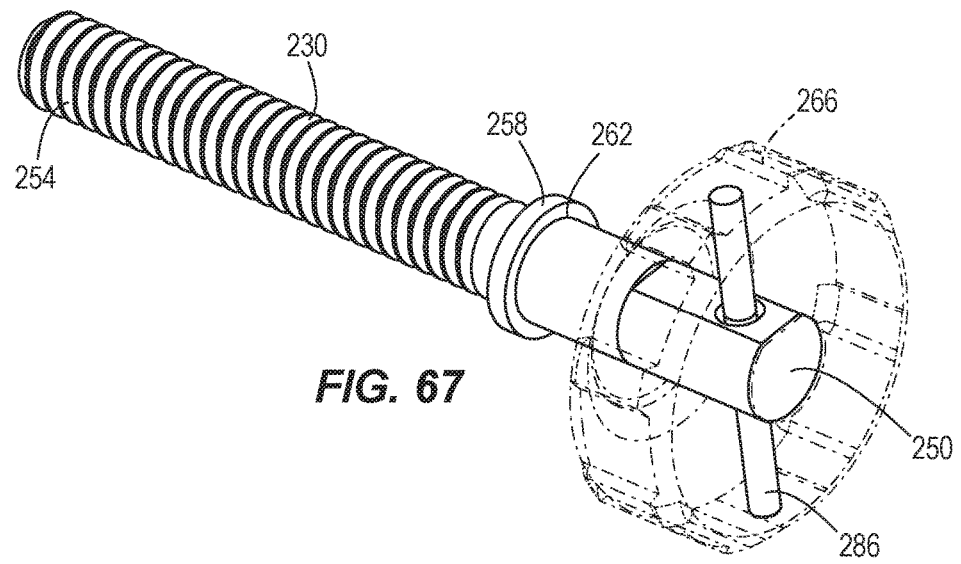
FIG. 67 is a perspective view of a shaft assembly and knob of the cutter of FIG. 65.
Figure 68:
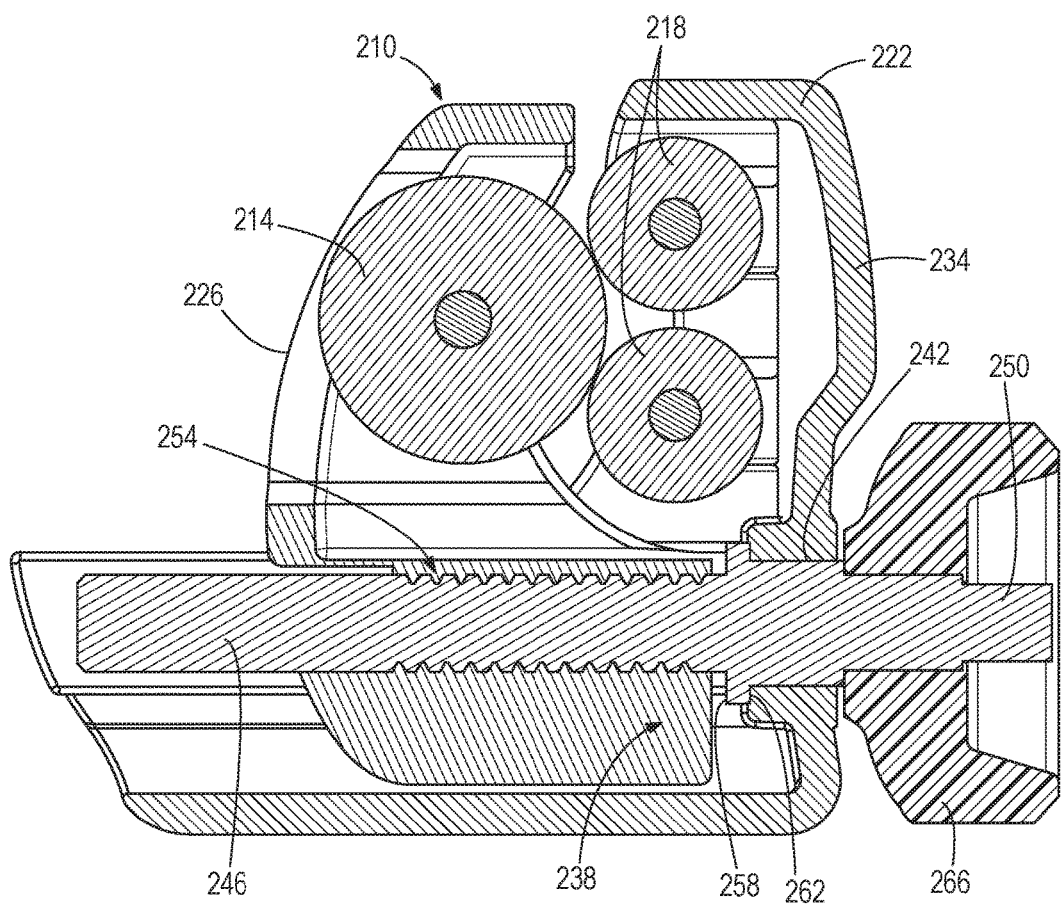
FIG. 68 is a cross-sectional side view of yet another alternative construction of a cutter.

FIGS. 56-70 illustrate constructions of a cutter 210, such as a swing cutter or a tubing cutter, including (see FIGS. 56-57) a cutting wheel 214, one or more rollers 218, and a housing assembly including one housing portion 222 supporting the roller(s) 218 and a another housing portion 226 supporting the cutting wheel 214. A shaft 230 movably connects the housing portions 222, 226 while structure of the housing portions 222, 226 limits relative pivoting movement and/or axial movement outside of a defined range of the housing portions 222, 226. The cutter 210 defines (see FIGS. 69-70) an adjustable C-shaped recess 232 to receive a tube, pipe, other substantially cylindrical work piece W to be cut by the cutting wheel 214.

The housing portion 222 has (see FIG. 58) a wall 234 defining a cavity 238 and an opening 242 communicating between the cavity 238 and the exterior of the housing portion 222. The housing portion 226 defines a threaded bore 246. The shaft 230 has a first end 250 extending through and rotatably supported in the opening 242. The shaft 230 has a threaded second end 254 received in the threaded bore 246. Rotation of the shaft 230 causes relative movement of the housing portions 222, 226 along the shaft axis 58 through engagement of the threaded portions 246, 254.

To inhibit (e.g., limit or prevent) movement of the shaft 230 from the cavity 238 through the opening 242, the shaft 230 is formed to include a radial shoulder 258. The shoulder 258 is annular and, in the illustrated construction, has a shoulder surface 262 engageable with a surface of the wall 234 to inhibit movement of the shaft 230 from the cavity 238 through the opening 242.

Figure 71:
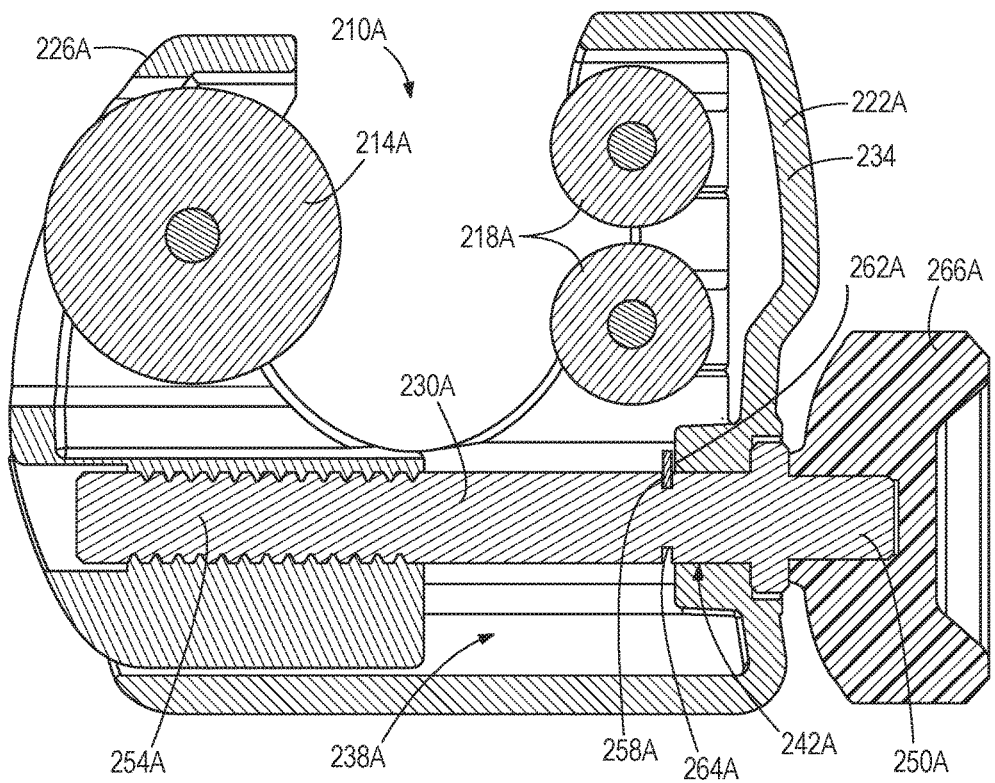
FIG. 71 is a cross-sectional side view of an existing cutter.
Figure 72:
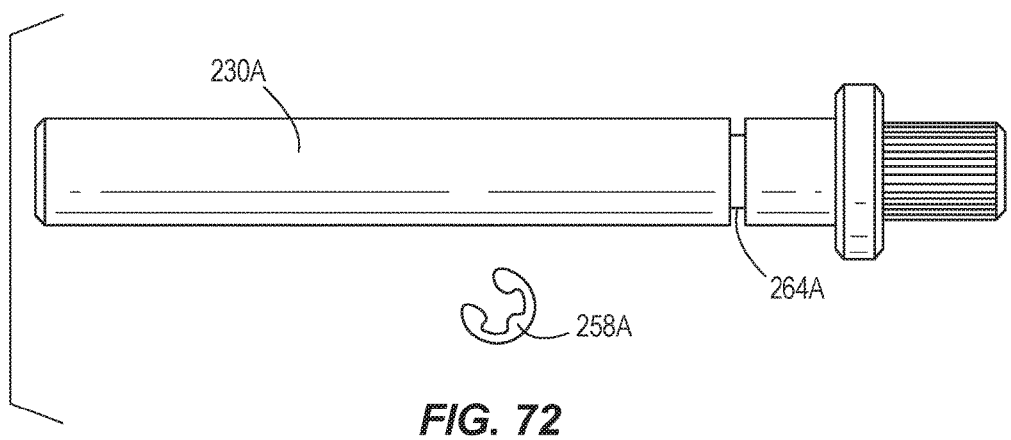
FIG. 72 is a side view of a shaft and E-clip of the cutter of FIG. 71.

The shoulder 258 replaces an e-clip 258A of existing cutters 210A (shown in FIGS. 71-72). In such cutters 210A (see FIGS. 71-72), the second end 254A of the shaft 230A is inserted into the housing portion 222A through the opening 242A and into the cavity 238A with the first end 250A remaining on the exterior of the housing portion 222A. The shaft 230A defines a groove 264A into which the e-clip 258A is received, and, once installed, the surface 262A of the e-clip 258A engages the wall 234A to inhibit movement of the shaft 230A from the cavity 238A through the opening 242A.

The e-clip 258A and/or the groove 264A into which the e-clip 258A is received may be subject to failure. For example, the e-clip 258A may break and/or separate from the shaft 230A. Also, the groove 264A may be subject to stress concentrations. The shoulder 258 thus may improve the durability, life, etc. of the shaft 230 and/or the cutter 210.

In the illustrated constructions, structure separate from the shaft 230 is engageable to inhibit movement of the first end 250 through the opening 242 into the cavity 238. The structure and the shoulder 258 cooperate to limit axial movement of the shaft 230 while allowing rotation relative to the housing portion 222.

In some constructions (see FIGS. 56-58, 61-62, 65-66 and 68-70), the structure includes an adjustment knob 266 engageable by the user to rotate the knob 266 to adjust the relative position of the housing portions 222, 226. The knob 266 is drivingly connected to the shaft 230 (e.g., by inter-engaging structure (the shape of the shaft 230 and an opening in the knob 266 (non-circular, non-coaxial, flat (see FIGS. 59, 63 and 67)), friction, etc.). As the knob 266 is rotated, engagement of the treaded second end 254 and the threaded bore 246 causes relative axial movement of the housing portions 222, 226. Depending on the direction of rotation of the knob 266 and the shaft 230, the housing portions 222, 226 move together or apart.

In some constructions, a fastener 270 is connected to the first end 250 to retain the knob 266 on the shaft 230. In one construction (see FIGS. 56 and 58-59), the first end 250 is threaded, and a nut 274 threadedly engages the threaded first end 250. In another construction (see FIGS. 61-64), the first end 250 defines a threaded bore 278, and a threaded member 282 threadedly engages the threaded bore 278.

In some constructions (see FIGS. 65-67), a pin 286 is connected between the knob 266 and the shaft 230. The pin 286 extends radially through the shaft 230 and the knob 266. In other constructions (see FIG. 70), the knob 266 may be press fit to the first end 250; however, replacing the press-fit with a threaded connection or pinned connection may reduce the frequency or likelihood of the knob 266 separating from the shaft 230 if the cutter 210 is dropped, impacted, strained, etc. In some constructions (see FIG. 63), a circlip 290 engages the first end 250 proximate the housing portion 222, and the first end 250 may define an annular groove (not shown) receiving the circlip 290.

In some constructions (see FIGS. 56-59, 62-63, 65-66 and 69-70), a washer 298 (or the circlip 290 (see FIG. 63)) is positioned on the shaft 230 between the knob 266 and the housing portion 222 and has a surface engageable with the wall 234 to inhibit movement of the first end 250 through the opening 238 into the cavity 242. In other constructions (see FIG. 68), the knob 266 has a surface engageable with the wall 234 to inhibit movement of the first end 250 through the opening 238 into the cavity 242.

In some constructions (see FIG. 62A-62B), a radial pin 302 is supported by the first housing portion 222 and is engageable (e.g., with a surface of the shoulder 258 facing away from the opening 242) to prevent movement of the first end 250 through the opening 238 into the cavity 242. The radial pin 302 may be a rolled pin or a threaded pin received in a complementary opening 306 in the housing portion 222.

The cutter 210 may provide storage for a spare or replacement cutting wheel 214'. In such constructions (see, e.g., FIGS. 61-63), the knob 266 defines a receptacle 310 receiving the spare cutting wheel 214', and a fastener (e.g., the threaded member 282) retains the spare cutting wheel 214' in the receptacle 286.

To cut a work piece, the housing portions 222, 226 are moved by rotation of the knob 266 so that the cutting wheel 214 and the roller(s) 218 engage the work piece. Further rotation of the knob 266 increases the force applied by the cutting wheel 214 to the work piece. Rotation of the cutter 210 about the work piece causes the cutting wheel 214 to cut the work piece. Until the work piece is cut, the knob 266 is rotated to increase force applied by the cutting wheel 214, and the cutter 210 is rotated about the work piece.

Figure 69:
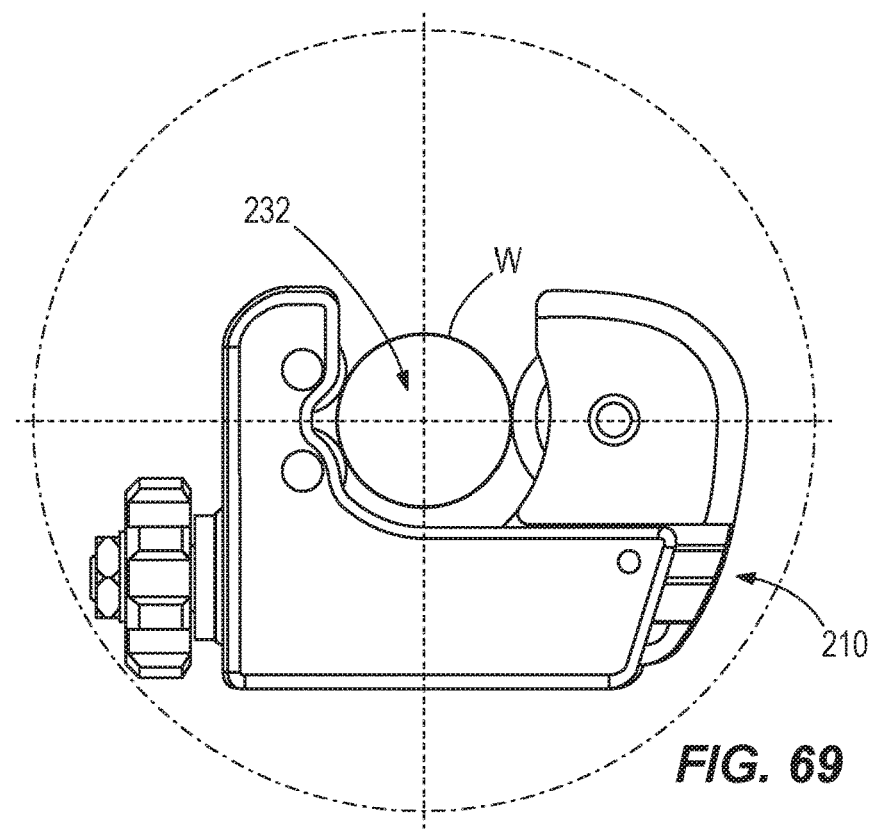
FIG. 69 is a side view of a cutter similar to the cutter of FIG. 56, illustrating a swing radius.
Figure 70:
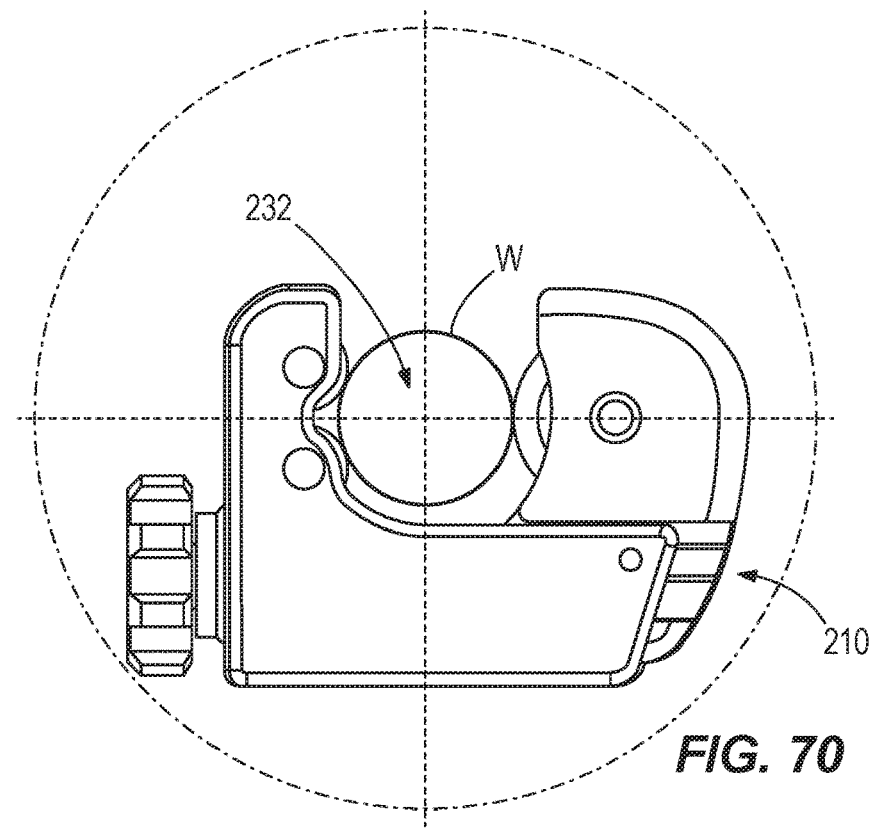
FIG. 70 is a side view of the cutter of FIG. 65, illustrating a swing radius.

FIG. 69 illustrates a swing radius of the cutter 210 when the shaft 230, the knob 266 and the nut 274 are used to couple the housing portion 222, 226. FIG. 70 illustrates a swing radius of the cutter 210 when the shaft 230, the knob 266 and the pin 286 are used to couple the housing portions 222, 226. In each construction, the swing radius is unaffected by the connecting structure.

One or more independent features and independent advantages of the invention may be set forth in the claims.

What is claimed is:

1. A tubing cutter comprising:
a cutting wheel;
a roller;
a housing assembly including a first housing portion and a second housing portion supported for relative movement, the first housing portion including a wall defining a cavity and an opening communicating between the cavity and an exterior of the first housing portion, one of the first housing portion and the second housing portion supporting the cutting wheel, the other of the first housing portion and the second housing portion supporting the roller;
a shaft connecting the first housing portion and the second housing portion for movement along a shaft axis, the shaft being formed to include a radial shoulder engageable with the wall about the opening to prevent movement of the shaft from the cavity through the opening, the shaft having a first end and an opposite second end, the shoulder being on an intermediate portion of the shaft between the first end and the second end, the first end extending through the opening to the exterior of the first housing portion;
a knob removably supported on the first end and engageable to rotate the shaft, the knob, when supported on the first end, being operable to prevent movement of the first end through the opening into the cavity; and
a radial pin separate from the shaft supported by the first housing portion and engageable with a surface of the shoulder facing away from the opening to prevent movement of the first end through the opening into the cavity when the knob is not supported on the first end, the pin being spaced from the shoulder to define a gap therebetween when the shoulder engages the wall.

2. The cutter of claim 1, wherein the shoulder is annular.

3. The cutter of claim 1, wherein the knob defines a receptacle, a spare cutting wheel being receivable in the receptacle, a threaded member retaining the spare cutting wheel in the receptacle.

4. A method of assembling a tubing cutter, the method comprising:

providing a cutting wheel;

providing a roller;

providing a housing assembly including a first housing portion and a second housing portion, the first housing portion having a wall at least partially defining a cavity and defining an opening communicating between the cavity and an exterior of the first housing portion;

providing a shaft extending along a shaft axis, having a first end and an opposite second end and formed to include a radial shoulder therebetween;

supporting the cutting wheel on the first housing portion;

supporting the roller on the second housing portion;

inserting the first end of shaft into the cavity and through the opening to the exterior of the first housing portion, the shoulder engaging the wall about the opening to inhibit further movement of the shaft through the opening;

removably supporting a knob on the first end and engageable to rotate the shaft; and when the knob is supported on the first end, engaging the knob with the first housing portion to prevent movement of the first end through the opening into the cavity;

when the knob is not supported on the first end, engaging a radial pin separate from the shaft with a surface of the shoulder facing away from the opening to inhibit movement of the first end through the opening into the cavity, the engaging including supporting the radial pin by the first housing portion with the pin being spaced from the shoulder to define a gap therebetween when the shoulder engages the wall; and connecting the second housing portion to the second end of the shaft such that the first housing portion and the second housing portion are movable along the shaft axis.

* * * * *